(12) United States Patent
Kunizawa et al.

(10) Patent No.: US 12,286,766 B2
(45) Date of Patent: Apr. 29, 2025

(54) SWIVELING WORK MACHINE

(71) Applicant: KUBOTA CORPORATION, Osaka (JP)

(72) Inventors: Teruo Kunizawa, Sakai (JP); Kiyoshi Matsui, Sakai (JP); Junki Ito, Sakai (JP); Haruhito Ikeda, Sakai (JP); Masamitsu Date, Sakai (JP); Alessandro Cecchini, Serravalle (SM); Massimo Barchi, Riofreddo di Verghereto (IT)

(73) Assignee: KUBOTA CORPORATION, Osaka (JP)

( * ) Notice: Subject to any disclaimer, the term of this patent is extended or adjusted under 35 U.S.C. 154(b) by 882 days.

(21) Appl. No.: 17/488,060

(22) Filed: Sep. 28, 2021

(65) Prior Publication Data

US 2022/0018092 A1  Jan. 20, 2022

Related U.S. Application Data

(63) Continuation of application No. PCT/JP2020/013391, filed on Mar. 25, 2020.

(30) Foreign Application Priority Data

| Mar. 29, 2019 | (JP) | 2019-067788 |
| Mar. 29, 2019 | (JP) | 2019-067789 |

(Continued)

(51) Int. Cl.
*E02F 9/08* (2006.01)
*B60K 15/063* (2006.01)
(Continued)

(52) U.S. Cl.
CPC .......... *E02F 9/0883* (2013.01); *B60K 15/063* (2013.01); *B60K 15/07* (2013.01);
(Continued)

(58) Field of Classification Search
CPC ....... E02F 9/0883; E02F 9/0891; E02F 9/121; E02F 9/163; E02F 9/166; E02F 3/325; E02F 9/267; B60K 15/063; B60K 15/07
See application file for complete search history.

(56) References Cited

U.S. PATENT DOCUMENTS

| 2015/0114363 | A1* | 4/2015 | Voss | F02M 31/20 |
| | | | | 123/541 |
| 2020/0256032 | A1* | 8/2020 | Maehara | E02F 9/0891 |

(Continued)

FOREIGN PATENT DOCUMENTS

| EP | 4 083 411 A1 | 11/2022 | |
| GB | 2625191 A * | 6/2024 | ....... B60K 15/03006 |

(Continued)

OTHER PUBLICATIONS

Extended European Search Report for European Application No. 20784554.6, dated Dec. 13, 2022.

*Primary Examiner* — Timothy Wilhelm
(74) *Attorney, Agent, or Firm* — Birch, Stewart, Kolasch & Birch, LLP

(57) ABSTRACT

A swiveling work machine includes a swivel base, a prime mover provided on the swivel base, a work device provided on the swivel base, and a support mechanism to support a fuel cylinder storing fuel for the prime mover.

13 Claims, 34 Drawing Sheets

(30) Foreign Application Priority Data

| Mar. 29, 2019 | (JP) | 2019-067790 |
| Mar. 29, 2019 | (JP) | 2019-067791 |
| Dec. 26, 2019 | (JP) | 2019-236927 |

(51) Int. Cl.
    *B60K 15/07* (2006.01)
    *E02F 3/32* (2006.01)
    *E02F 9/12* (2006.01)
    *E02F 9/16* (2006.01)
    *E02F 9/26* (2006.01)

(52) U.S. Cl.
    CPC ............ *E02F 9/0891* (2013.01); *E02F 9/121* (2013.01); *E02F 9/163* (2013.01); *E02F 9/166* (2013.01); *E02F 3/325* (2013.01); *E02F 9/267* (2013.01)

(56) References Cited

U.S. PATENT DOCUMENTS

| 2021/0164195 A1* | 6/2021 | Mathivanan | E02F 9/2033 |
| 2022/0307223 A1* | 9/2022 | Muppavarapu | B60K 15/067 |
| 2023/0114311 A1* | 4/2023 | Horii | E02F 3/325 |
| | | | 248/346.01 |
| 2023/0134855 A1* | 5/2023 | Hodel | E02F 9/2041 |
| | | | 701/50 |
| 2023/0243123 A1* | 8/2023 | Harper | E02F 9/18 |
| | | | 180/65.31 |

FOREIGN PATENT DOCUMENTS

| JP | 6-320968 A | 11/1994 |
| JP | 10-53033 A | 2/1998 |
| JP | 3103244 B2 * | 10/2000 |
| JP | 2003-118990 A | 4/2003 |
| JP | 2004-34933 A | 2/2004 |
| JP | 2006-266040 A | 10/2006 |
| JP | 2011-99412 A | 5/2011 |
| JP | 2012-30605 A | 2/2012 |
| JP | 2017-66787 A | 4/2017 |
| KR | 20110009732 U * | 10/2011 |
| WO | WO 2018/234810 A1 | 12/2018 |
| WO | WO-2024115921 A1 * | 6/2024 ....... B60K 15/03006 |

* cited by examiner

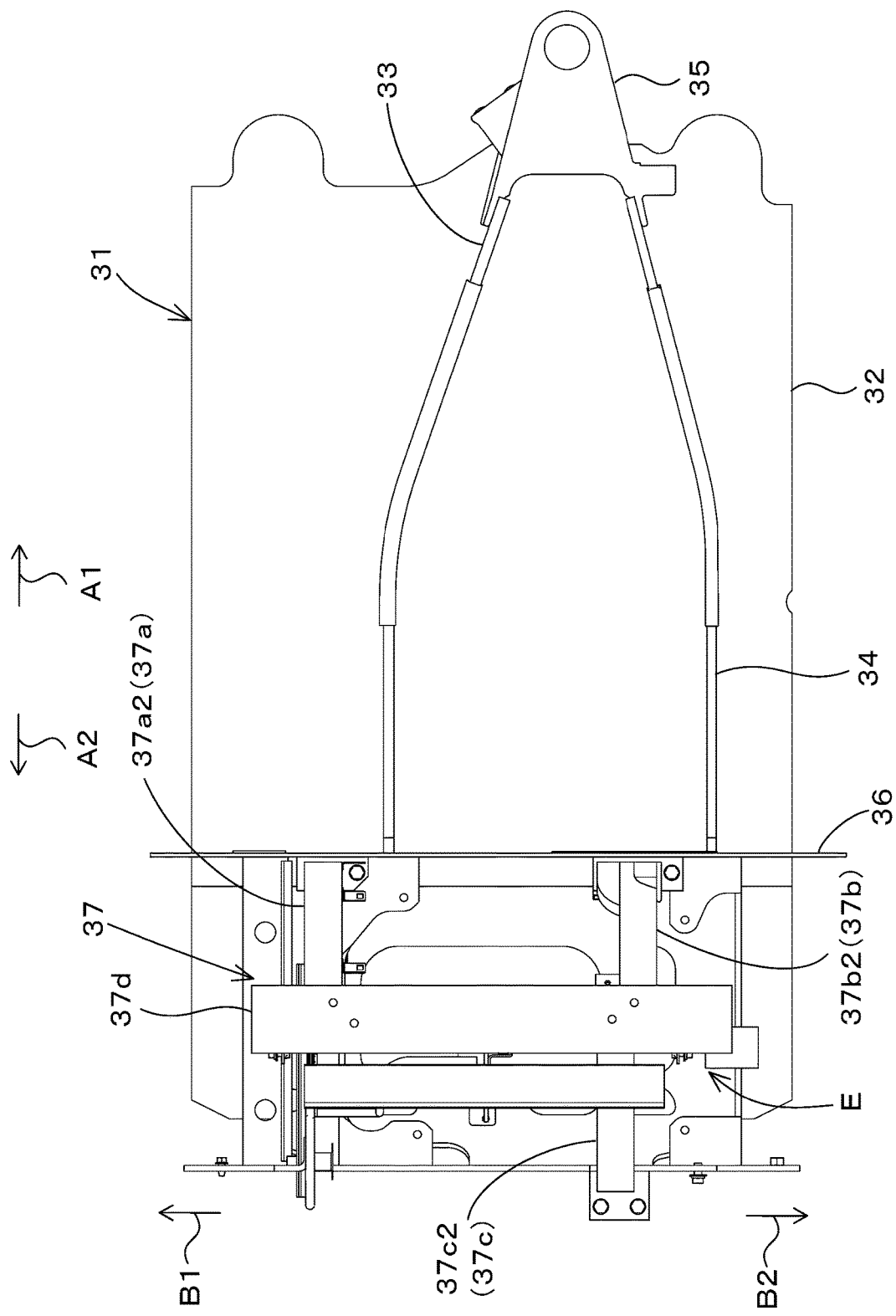

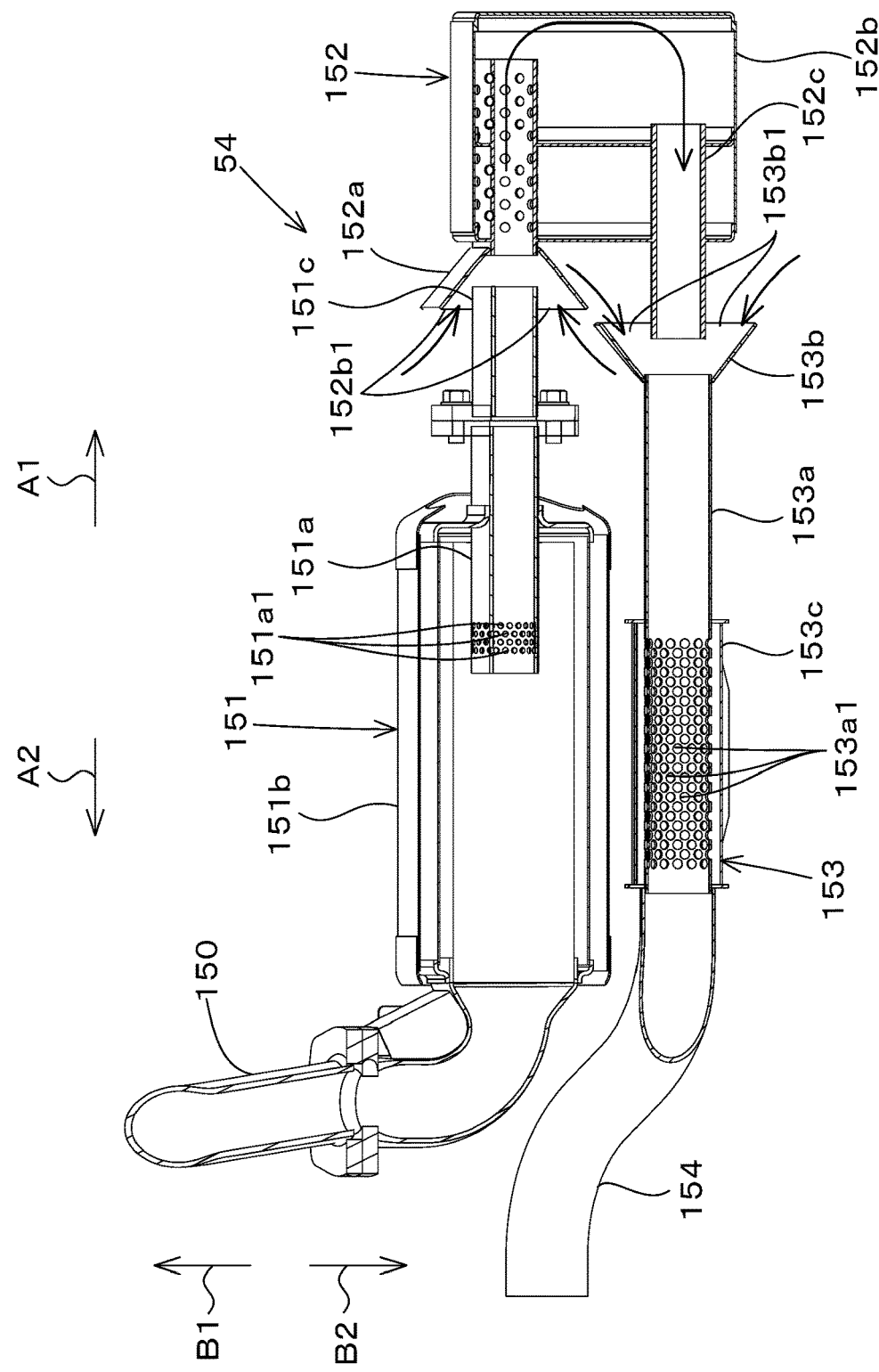

SWIVELING WORK MACHINE

CROSS REFERENCE TO RELATED APPLICATIONS

This application is a continuation application of International Application No. PCT/JP2020/013391, filed on Mar. 25, 2020, which claims the benefit of priority to Japanese Patent Application No. 2019-067788, filed on Mar. 29, 2019, to Japanese Patent Application No. 2019-067789, filed on Mar. 29, 2019, to Japanese Patent Application No. 2019-067790, filed on Mar. 29, 2019, to Japanese Patent Application No. 2019-067791, filed on Mar. 29, 2019, and to Japanese Patent Application No. 2019-236927, filed on Dec. 26, 2019. The entire contents of each of these applications are hereby incorporated herein by reference.

BACKGROUND OF THE INVENTION

Field of the Invention

The present invention relates to a swiveling work machine such as a backhoe.

Description of the Related Art

A swiveling work machine is known, the swiveling work machine including a swivel base, a diesel engine mounted on the swivel base, a work device provided on the swivel base, and a fuel tank for storing diesel oil, which is fuel for the diesel engine (see Japanese Unexamined Patent Publication No. 2017-66787, for example). In addition, a working machine is known, the working machine including a swivel base, a support frame provided on the swivel base, a hood supported on the support frame, a strut fixedly supported on the hood, and a canopy (a protection mechanism) (see Japanese Unexamined Patent Publication No. 2012-30605, for example). In addition, an exhaust structure is known, the exhaust structure including a muffler connected to an engine, a hood covering the engine, and an exhaust pipe connected to the muffler, with the exhaust pipe penetrating the rear upper portion of the hood and protruding upward (see Japanese Unexamined Patent Publication No. 2006-266040, for example).

Although diesel engines have high thermal efficiency and excellent fuel economy, in recent years, with the rise in environmental awareness, a power source with further lower environmental impact may be demanded.

In addition, depending on a size of the working machine, it may be difficult to secure sufficient space for various objects such as tools and maintenance parts.

In addition, in order to sufficiently reduce a temperature of exhaust gas and noises, it is possible to install a large muffler or multiple mufflers. However, depending on the size of the working machine, it may be difficult to secure sufficient space for installation of the mufflers.

The present invention intends to solve the problems of the conventional technique and to provide a working machine capable of being driven by fuel contained in a fuel cylinder. In addition, the present invention intends to provide a working machine capable of alternatively using multiple types of fuel. In addition, it is intended to provide a space for housing objects while ensuring strength of a protection mechanism. In addition, it is intended to provide an exhaust structure which is excellent in reducing an exhaust temperature and noises, and which can be installed in a small installation space.

In an aspect of the present invention, a swiveling work machine includes a swivel base, a prime mover provided on the swivel base, a work device provided on the swivel base, and a support mechanism to support a fuel cylinder storing fuel for the prime mover.

In addition, the swiveling work machine further includes a hood defining an engine compartment incorporating the prime mover. The support mechanism is configured to support the fuel cylinder above the hood.

In addition, the hood is openable and closable. The support mechanism is configured to support the fuel cylinder shiftably between a installation position where the fuel cylinder is supported above the hood and a retracting position where the fuel cylinder is prevented from interfering with the hood when being opened or closed.

In addition, the support mechanism includes a first pivotal shaft for pivoting the fuel cylinder horizontally rotatably.

In addition, the support mechanism is configured to support the fuel cylinder at the installation position inward from a rotating locus of the swivel base.

In addition, the support mechanism includes a second pivotal shaft for pivoting the fuel cylinder rotatably downward from the retracting position.

In addition, the support mechanism includes a base supporting the first pivotal shaft, a first pivotal bracket joining the first pivotal shaft and the second pivotal shaft to each other and being rotatable around the first pivotal shaft, and a second pivotal bracket joining the second pivotal shaft and the installation part to each other and being rotatable around the second pivotal shaft. The base is formed with a notch such that, when the first pivotal bracket is rotated around the first pivotal shaft, the second pivoting bracket is engaged to the notch so as to limit a rotation range of the first pivotal bracket.

In addition, the swiveling work machine further includes an upper member provided above the hood to cover the fuel cylinder set at the installation position from thereabove. The support mechanism includes an extended portion extending outward of the machine body from the lower portion of the fuel cylinder set at the installation position so as to face the lower portion of the fuel cylinder set at the installation position. An interval between the upper member and the extended portion is less than a diameter of the fuel cylinder.

In addition, the support mechanism includes a fastener to fix the fuel cylinder.

In addition, natural gas or petroleum gas serving as the fuel is compressed or liquefied and is stored in the fuel cylinder.

In addition, the swiveling work machine further includes a reserve cylinder to supply fuel to the prime mover when a residual quantity of fuel in the fuel cylinder is reduced and becomes a predetermined quantity or less.

vIn addition, the swiveling work machine further includes an accommodating portion to accommodate the fuel cylinder, an upper member provided above the fuel cylinder, and a lower member provided below the upper member. The fuel cylinder set in the accommodating portion is arranged inward from a virtual circle touching the upper member and the lower member.

In addition, the support mechanism includes an installation part to install the fuel cylinder thereon, and the lower member serves as the installation part.

In addition, the swivel base includes a weight opposite to the work device, and the lower member serves as the weight.

In addition, a work machine includes a swivel base on which an operator seat is provided, a working device provided on a front portion of the swivel base, a hood provided on a rear portion of the swivel base to define an engine compartment, and a protection mechanism to protect the operator seat, the protection mechanism including a strut above the hood. An accommodating portion to accommodate an accommodated object is provided between the hood and the strut.

In addition, the work machine further includes a supporter supporting the strut and forming the accommodating portion. The supporter includes a vertical member extended upward from a front portion of the hood, and an upper member extended rearward from an upper portion of the vertical member and provided above the hood. The strut is attached to the upper member. The accommodating portion is defined as a space surrounded by the hood, the vertical member and the upper member.

In addition, the strut of the protection mechanism is paired so that the pair of struts are arranged with a space therebetween in a machine-width direction. The upper member extends to have one and the other end portions in the machine-width direction. The pair of struts are attached to the one and the other end portions of the upper member, respectively.

In addition, the strut includes a first portion extended upward from a front portion of the hood, a second portion curved rearward from an upper end of the first portion and provided above the hood, and a third portion extended upward from an upper portion of the second portion. The accommodating portion is defined as a space surrounded by the hood, the first portion and the second portion.

In addition, the vertical member separates the accommodating portion from a space provided closer to the operator seat than the accommodating portion.

In addition, the work machine includes a cover covering a rear portion of an accommodating space.

In addition, the work machine includes a supporting mechanism configured to support an accommodated object. The hood is openable and closable. The supporting mechanism supports the accommodated object and moves the accommodated object between an accommodating position for accommodated the object in the accommodating portion and a retracting position for preventing the object from interfering with the hood in opening and closing the hood.

In addition, the work machine includes a prime mover mounted on a swivel base. The accommodated object is a fuel cylinder for storing the fuel for the prime mover.

In addition, a swiveling work machine includes a swivel base, a work device provided on the swivel base, a prime mover driven selectively by either first fuel or second fuel, a fuel tank storing the first fuel, a supporting mechanism to support a fuel cylinder storing the second fuel, and a fuel changer to change the fuel to be supplied to the prime mover from one of the first fuel and the second fuel to the other.

In addition, the swiveling work machine further includes an operation member operable to change the fuel to be supplied to the prime mover.

In addition, the supporting mechanism detachably supports the fuel cylinder.

In addition, the swiveling work machine includes a first indicator to indicate a remaining amount of the first fuel stored in the fuel tank, and a second indicator to indicate a remaining amount of the second fuel stored in the fuel cylinder.

In addition, the swiveling work machine includes the operator seat provided on the swivel base. The operation member is arranged at a position operable by an operator seating in an operator seat.

In addition, the swiveling work machine includes a display mechanism to display whether the fuel supplied to the prime mover is the first fuel or the second fuel.

In addition, the second fuel is compressed or liquefied and is stored in the fuel cylinder.

In addition, an exhaust structure for a work machine includes a first muffler to which exhaust gas discharged from the prime mover is introduced, a second muffler including a first receiving portion to receive the exhaust gas discharged from the first muffler, a muffler main portion through which the exhaust gas received from the first receiving portion passes, and an exhausting portion to exhaust the exhaust gas from the muffler main portion, a third muffler to which the exhaust gas discharged from the second muffler is introduced, and a tail pipe to exhaust the exhaust gas discharged from the third from the third muffler. The first receiving portion and the exhausting portion are arranged on a directional one-side relative to the muffler main portion, and is arranged at a position where at least a part of an exhaust gas passage from the prime mover to the first receiving portion via the first muffler faces at least a part of another exhaust gas passage from the exhausting portion to the tail pipe via the third muffler.

In addition, the exhaust structure for the work machine includes a first fixing bracket to fix the first muffler, the second muffler, and the third muffler to the prime mover.

In addition, the exhaust structure for the work machine includes a second fixing bracket to fix the first muffler and the third muffler to the prime mover, and a third fixing bracket to fix the second muffler to the swivel base.

In addition, the first muffler is integrated with a three way catalytic converter.

In addition, the exhausting portion includes an outlet pipe through which the exhaust gas discharged from the muffler main portion passes. The third muffler is connected to a second receiving portion to receive the exhaust gas discharged from the outlet pipe and introduce the exhaust gas to the third muffler. The second receiving portion introduces the exhaust gas discharged from the outlet pipe and the outside air into the third muffler.

In addition, the second receiving portion has an enlarged structure with a diameter being enlarged as extending toward the muffler main portion. An end portion of the outlet pipe is inserted into the enlarged structure.

In addition, the exhaust structure for the work machine includes an exhaust pipe through which the exhaust gas discharged from the first muffler passes. The first receiving portion introduces the exhaust gas discharged from the exhaust pipe and the outside air into the muffler main portion.

In addition, the first receiving portion has an enlarged structure with a diameter being enlarged as separating from the muffler main portion. An end portion of the exhaust pipe is inserted into the enlarged structure.

In addition, the prime mover includes the exhaust structure.

In addition, the prime mover is an engine employing a spark ignition system.

According to the above-mentioned swiveling work machine, the swiveling work machine can be driven by the fuel stored in the fuel cylinder. In addition, a space for an accommodated object can be provided while ensuring the strength of the protection mechanism. In addition, according to the above-mentioned swiveling work machine, multiple types of fuel can be alternatively used. In addition, according to the above-mentioned exhaust structure for the work machine, reduction effects of an exhaust temperature and noises can be improved by the first to third mufflers. In addition, the exhaust gas passage is configured to be reversed by the second muffler, and at least a part of the exhaust gas passage from the prime mover to the first receiving portion via the first muffler and at least a part of the exhaust gas passage from the outlet portion to the tail pipe via the third muffler are arranged opposed to each other, so that the first to third mufflers can be efficiently arranged in a small installation space.

The above and other elements, features, steps, characteristics and advantages of the present invention will become more apparent from the following detailed description of the preferred embodiments with reference to the attached drawings.

BRIEF DESCRIPTION OF THE DRAWINGS

A more complete appreciation of preferred embodiments of the present invention and many of the attendant advantages thereof will be readily obtained as the same becomes better understood by reference to the following detailed description when considered in connection with the accompanying drawings described below.

FIG. 2B is a plan view showing the swivel frame.

FIG. 12E is a plan cross-sectional view showing the exhaust structure.

BEST MODE FOR CARRYING OUT THE INVENTION

Figure 14:
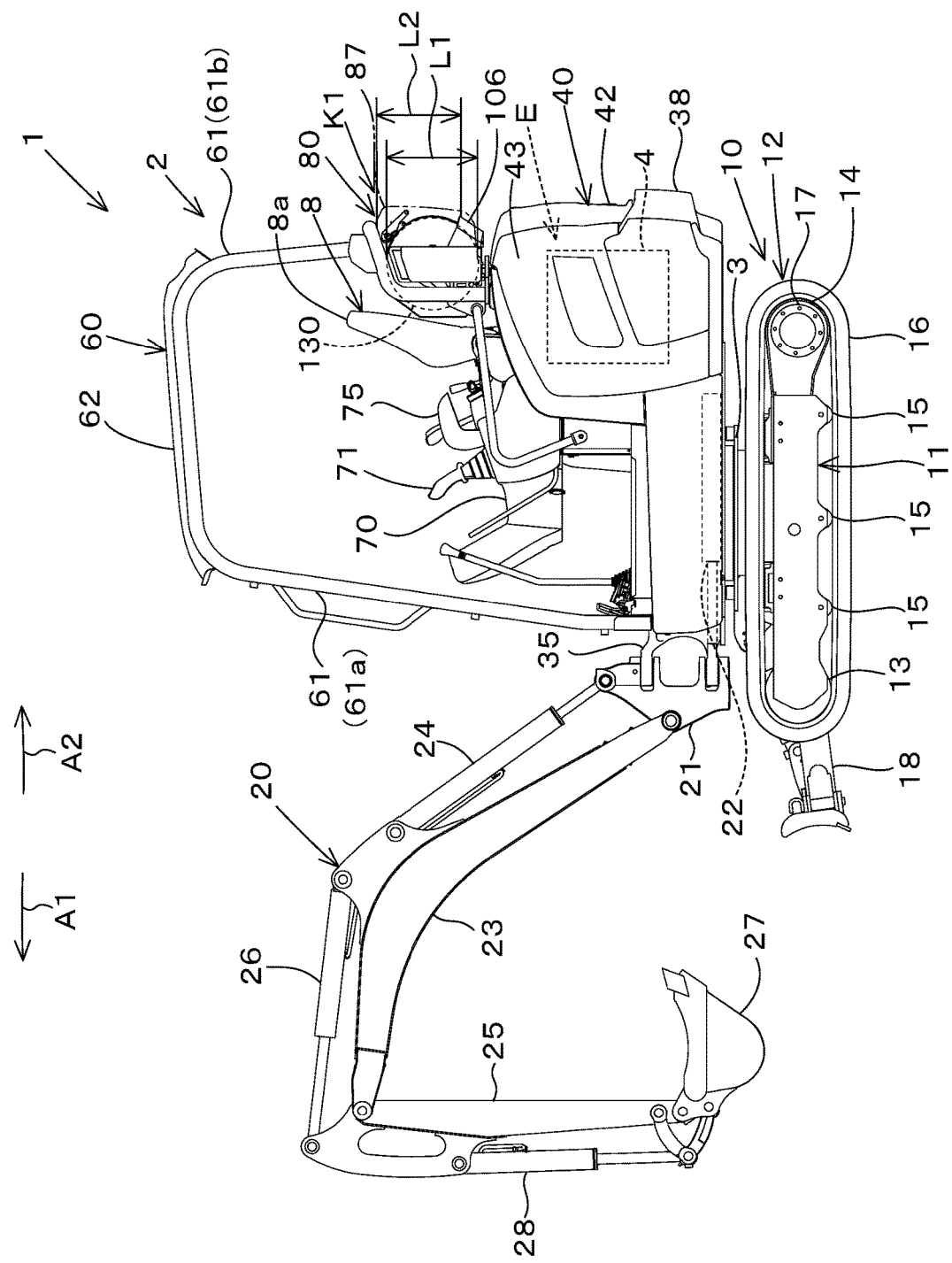
FIG. 14 is a schematic side view showing a swiveling work machine.
Figure 15:
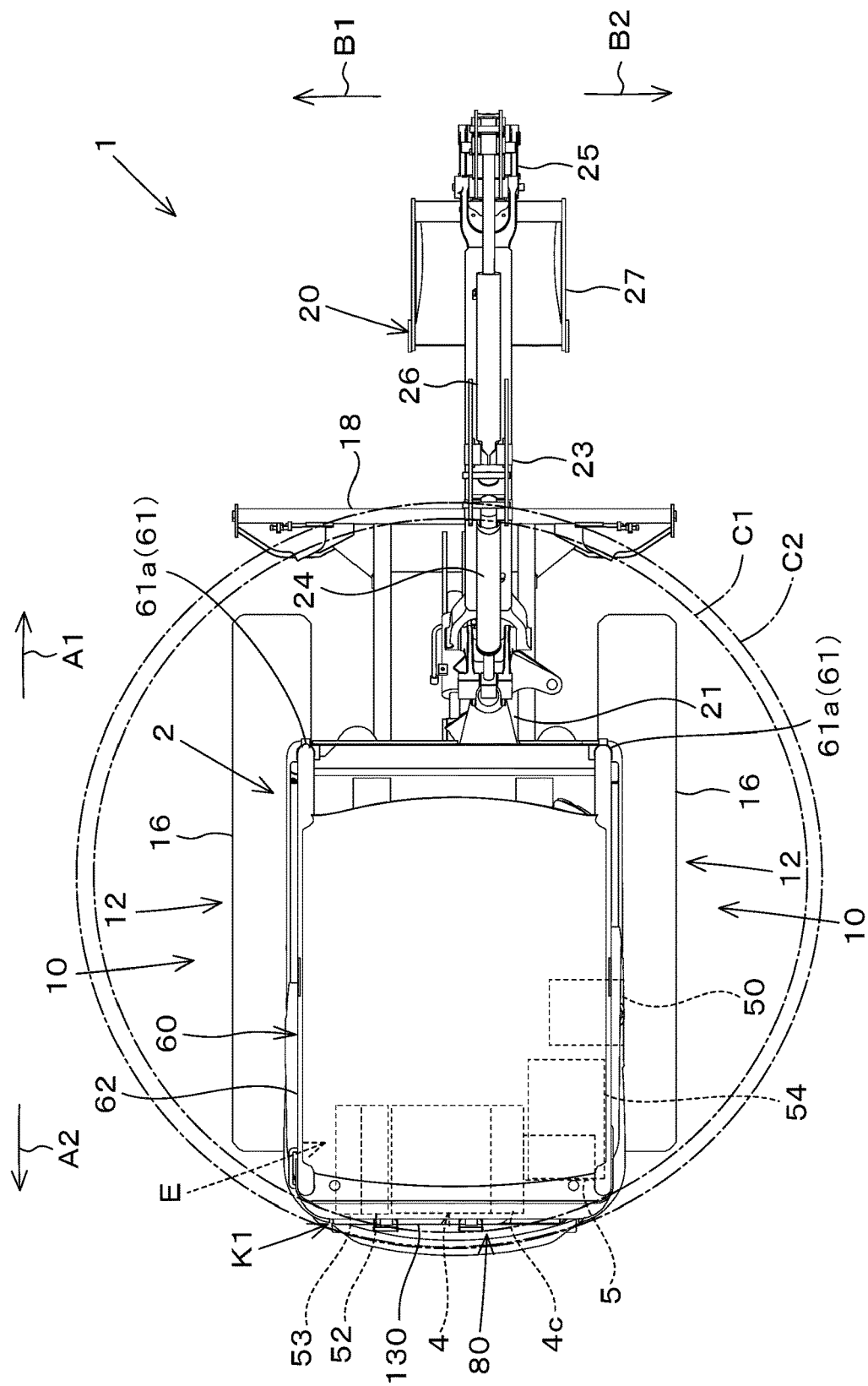
FIG. 15 is a schematic plan view showing the swiveling work machine.

With reference to the drawings, an embodiment of the present invention will be described below. FIG. 14 is a schematic side view showing the overall configuration of the backhoe that is a swiveling work machine (work machine) 1 according to the present embodiment. FIG. 15 is a schematic plan view showing the overall configuration of the swiveling work machine 1.

As shown in FIG. 14, the swiveling work machine 1 is provided with a swivel base (machine body) 2, a traveling unit 10, and a work device 20. An operator seat 8 is provided on the swivel base 2, and the operator seat 8 is covered by a protection mechanism 60. In this embodiment, a forward direction (a direction of an arrowed line A1 in FIGS. 14 and 15) of an operator seated on the operator seat 8 of the swiveling work machine 1 is described as the front, a rearward direction (a direction of an arrowed line A2 in FIGS. 14 and 15) of the operator is described as the rear, a leftward direction (a front surface side of FIG. 14, a direction of an arrowed line B1 in FIG. 15) of the operator is described as the left, and a rightward direction (a back surface side of FIG. 14, a direction of an arrowed line B2 in FIG. 15) of the operator is described as the right.

A horizontal direction orthogonal to a fore-and-aft direction is described as a machine width direction (see FIG. 15). A direction extending from a center portion of the swivel base 2 to the right or left in the machine width direction is described as an outward direction. In other words, the outward direction is the machine width direction and separates away from the center portion of the swivel base 2 in the machine width direction. A direction opposite to the outward direction is described as an inward (inner) direction. In other words, the inward direction is the machine width direction approaching the machine width directional center portion of the swivel base 2.

As shown in FIG. 14, the swivel base 2 is supported, on the traveling frame 11, rotatably (to be capable of swiveling to the left and to the right) around a vertical axis (an axal center extending in the vertical direction) via a swivel bearing 3. The center of the swivel bearing 3 serves as a swivel axial center (swivel center). A swivel motor (not shown in the drawings) consisting of a hydraulic motor is attached to the swivel base 2. This swivel motor is a motor that rotates and drives the swivel base 2 around the swivel axial center. The swivel motor is provided below the protection mechanism 60 and below the front portion of the operator seat 8, and is attached to a swivel base plate 32 to be described below.

As shown in FIG. 15, a prime mover 4 and a hydraulic pump 5 are provided on the swivel base 2. That is, the prime mover 4 is mounted on the swivel base 2 and, specifically, is located in the engine compartment E formed at a rear portion of the swivel base 2. The prime mover 4 is a spark ignition type engine that can be driven with fuel. The other-side portion (a right portion) of the prime mover 4 in the machine width direction has a flywheel 4c, and the hydraulic pump 5 is provided on the right side of the flywheel 4c. The hydraulic pump 5 is driven by a driving force of the prime mover 4 and delivers operation fluid (a hydraulic pressure) to drive hydraulic actuators such as hydraulic motors and hydraulic cylinders provided in the swiveling work machine 1.

As shown in FIG. 14, the traveling device 10 has a traveling frame 11 and traveling mechanisms 12. Each of the traveling mechanisms 12 is, for example, a crawler type. As shown in FIG. 15, the traveling mechanisms 12 are provided on one-side portion (the left portion) and the other-side portion (the right portions) of the traveling frame 11 in the machine width direction, respectively. As shown in FIG. 14, each of the traveling mechanisms 12 has an idler 13, a drive wheel 14, a plurality of rolling wheels 15, an endless crawler belt 16, and a traveling motor 17 constituted of a hydraulic motor. Each of the idlers 13 is arranged at a front portion of the traveling frame 11, and each of the drive wheels 14 is located at a rear portion of the traveling frame 11. A plurality of rolling wheels 15 are provided between the idler 13 and the drive wheel 14. Each of the crawler belts 16 is wound over the idler 13, drive wheels 14, and rolling wheels 15. The traveling motors 17 drive the drive wheels 14 to turn the crawler belt 16 in a circumferential direction. A dozer device 18 is attached to the front portion of the traveling device 10.

The work device 20 is provided on the swivel base 2, in detail, at a front portion of the swivel base 2, and is operably driven by the prime mover 4. As shown in FIGS. 14 and 15, the work device 20 has a boom 23, an arm 25, and a bucket (a work tool) 27. A base end of the boom 23 is attached to the swing bracket 21 pivotably around a lateral axis (an axial center extending in the machine width direction). This allows the boom 23 to swing up and down (in the vertical direction). The arm 25 is attached to a tip end of the boom 23 pivotably around the lateral axis. This allows the boom 23 to swing in the fore-and-aft direction or in vertical direction. The bucket 27 is provided on a tip end of the arm 25 and capable of performing a scooping operation and a dumping operation. The swiveling work machine 1 can be provided with an alternative or additional work tool (hydraulic attachment) configured to be driven by hydraulic actuators in place of or in addition to the bucket 27. For example, a hydraulic breaker, a hydraulic crusher, an angle broom, an earth auger, a pallet fork, a sweeper, a mower, a snow blower, or the like may serve as the alternative or additional work tool.

As shown in FIG. 14, the swing bracket 21 can be swung by extending and retracting the swing cylinder 22 provided on the right portion of the swivel base 2. The boom 23 can be swung by extending and retracting the boom cylinder 24. The arm 25 can be swung by extending and retracting the arm cylinder 26. The bucket 27 can be moved by extending and retracting a bucket cylinder (work tool cylinder) 28 for the scooping operation and the dumping operation. The swing cylinder 22, the boom cylinder 24, the arm cylinder 26, and the bucket cylinder 28 are constituted of hydraulic cylinders (hydraulic actuators) and are driven by the operation fluid delivered from the hydraulic pump 5, that is, by driving the prime mover 4.

Figure 2A:
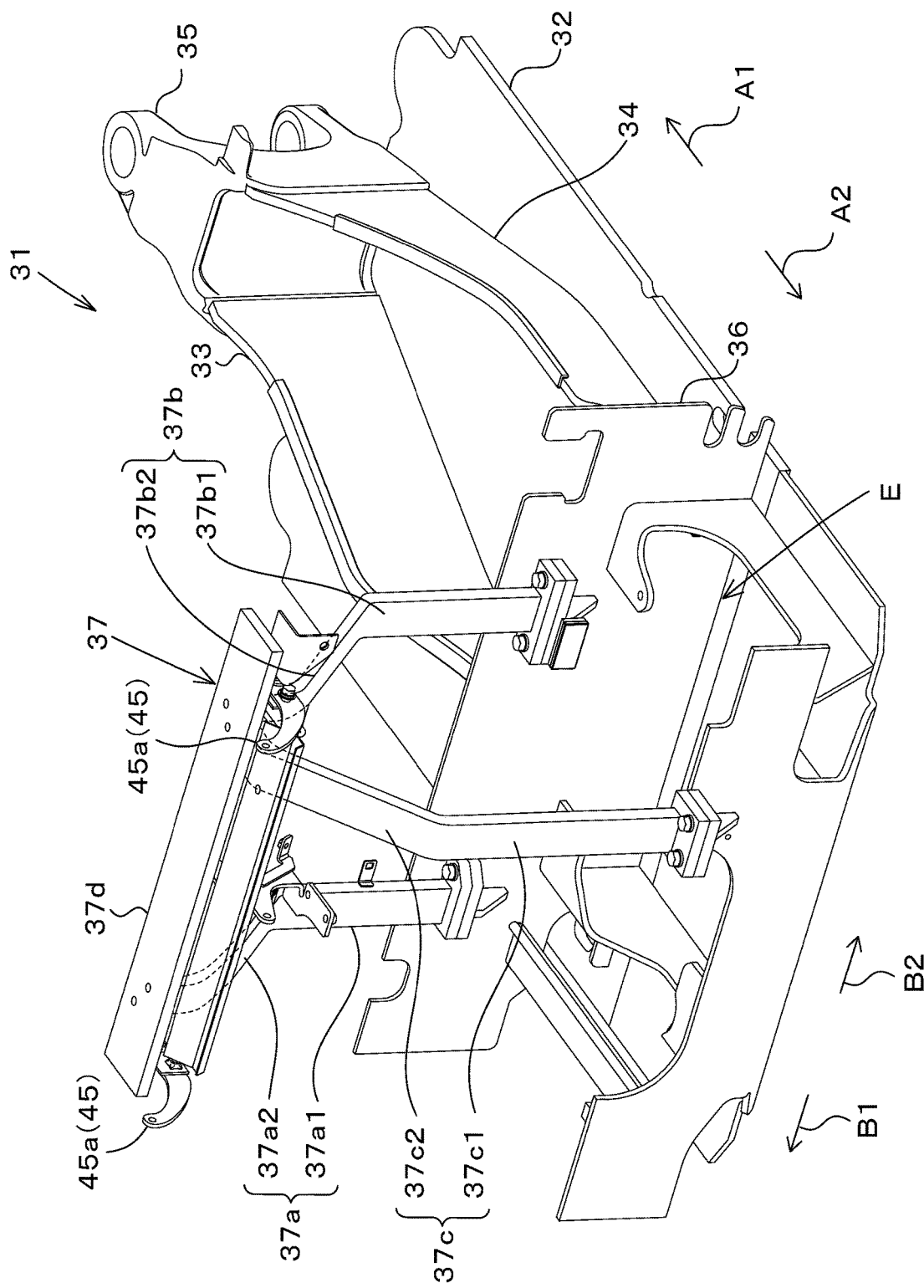
FIG. 2A is a right-rear perspective view showing a swivel frame.

The swivel base 2 is described below. The swivel base 2 has a swivel frame 31 and a weight 38 attached to a rear portion of the swivel frame 31. As shown in FIGS. 2A and 2B, the swivel frame 31 has a swivel base plate (base plate) 32, a plurality of longitudinal ribs (first and second longitudinal ribs 33 and 34), a support bracket 35, a partition plate 36, and a support frame 37. In addition, the swivel frame 31 is provided with brackets, stays, and the like for attachment of equipment, tanks, and other parts mounted on the swivel base 2.

The swivel base plate 32 is formed of a thick steel plate or the like, and is arranged so that its plate surfaces face up and down. The swivel base plate 32 is supported rotatably around the swivel axial center on the traveling unit 10 via the swivel bearing 3.

As shown in FIGS. 2A and 2B, the first longitudinal rib 33 and the second longitudinal rib 34 are members extending from a front portion of the swivel base plate 32 to a rear portion of the swivel base plate 32 so as to reinforce the swivel base plate 32. The first longitudinal ribs 33 and the second longitudinal ribs 34 are erected on the swivel base plate 32 and are spaced from one another in the machine width direction. The first longitudinal rib 33 is arranged on a left portion of the swivel base plate 32, and the second longitudinal rib 34 is arranged on a right portion of the swivel base plate 32.

As shown in FIGS. 2A and 2B, the support bracket 35 is provided at the front portions of the first and second longitudinal ribs 33 and 34. The support bracket 35 and the front portions of the first and second longitudinal ribs 33 and 34 are offset rightward from the center portion of the swing board 32 in the machine width direction. As shown in FIG. 14, a swing bracket 21 is attached to the support bracket 35 pivotally around a vertical axis (an axial center extending in the vertical direction), and the work device 20 is attached to the swing bracket 21.

The partition plate 36 is a member that partitions a front lower portion of the engine compartment E. As shown in FIGS. 2A and 2B, the partition plate 36 has a plate surface facing in the fore-and-aft direction and is arranged at the rear portion of the swing board 32 to extend from one side (the left side) to the other side (the right side) in the machine width direction.

As shown in FIGS. 2A and 2B, the support frame 37 stands at a rear portion of the swivel base plate 32 and behind the partition plate 36. The support frame 37 is located inside the hood 40 (engine compartment E) and supports the hood 40 and peripheral parts of the prime mover 4. The support frame 37 has a plurality of legs (first leg 37a, second leg 37b, and third leg 37c) erected on the swivel base plate 32, and a bar 37d fixed to the upper portions of these plurality of legs.

The first leg 37a has a first support strut 37a1 and a first extension 37a2. As shown in FIGS. 2A and 2B, the first strut 37a1 is erected to extend vertically at the left-front portion of the engine compartment E. Specifically, a lower end of the first strut 37a1 is attached to the left-rear portion of the partition plate 36. The first extension 37a2 is extended rearwardly upward from an upper end of the first strut 37a1, and bends at an intermediate portion thereof to extend substantially upward.

The second leg 37b has a second support strut 37b1 and a second extension 37b2. As shown in FIGS. 2A and 2B, the second strut 37b1 is erected to extend vertically at the right-front portion of the engine compartment E. Specifically, a lower end of the second strut 37b1 is attached to the left-rear portion of the partition plate 36. The second extension 37b2 is extended rearwardly upward from an upper end of the second strut 37b1 and bends at an intermediate portion thereof to extend substantially upward.

The third leg 37c has a third strut 37c1 and a third extension 37c2. As shown in FIGS. 2A and 2B, the third strut 37c1 is erected to extend vertically at the rear portion of the engine compartment E. The third extension portion 37c2 is extended forward upwardly from an upper end of the third strut 37c1 and bends at an intermediate portion thereof to extend forward.

As shown in FIG. 2A, the bar 37d is extended in the machine width direction so that its plate surfaces face up and down, and is placed over the upper end of the first extension 37a2, the upper end of the second extension 37b2, and the upper end of the third extension 37c2, and is fixed to each of these extensions.

Figure 1A:
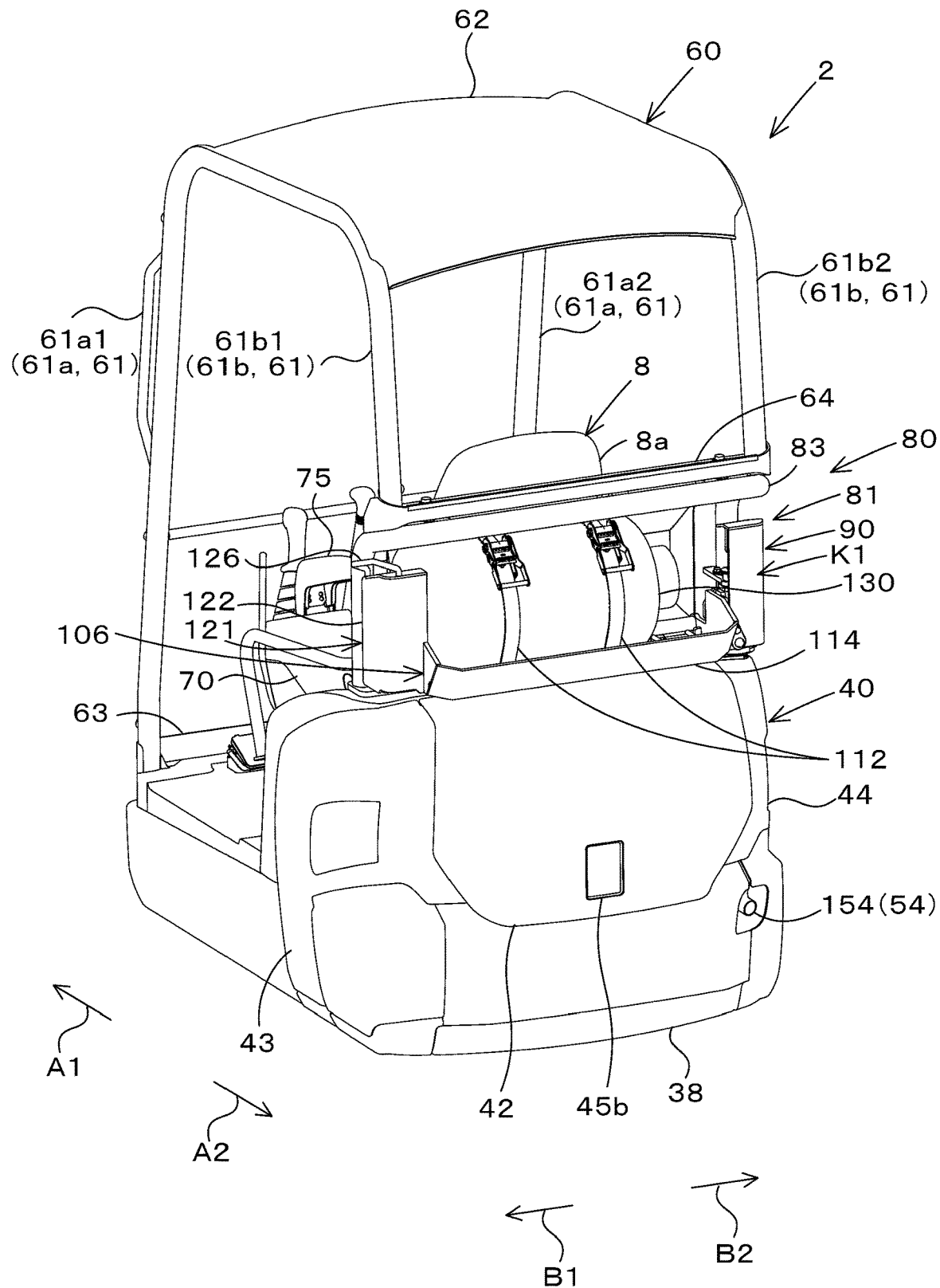
FIG. 1A is a left-rear perspective view showing a swivel base, a hood, and a protection mechanism.
Figure 1B:
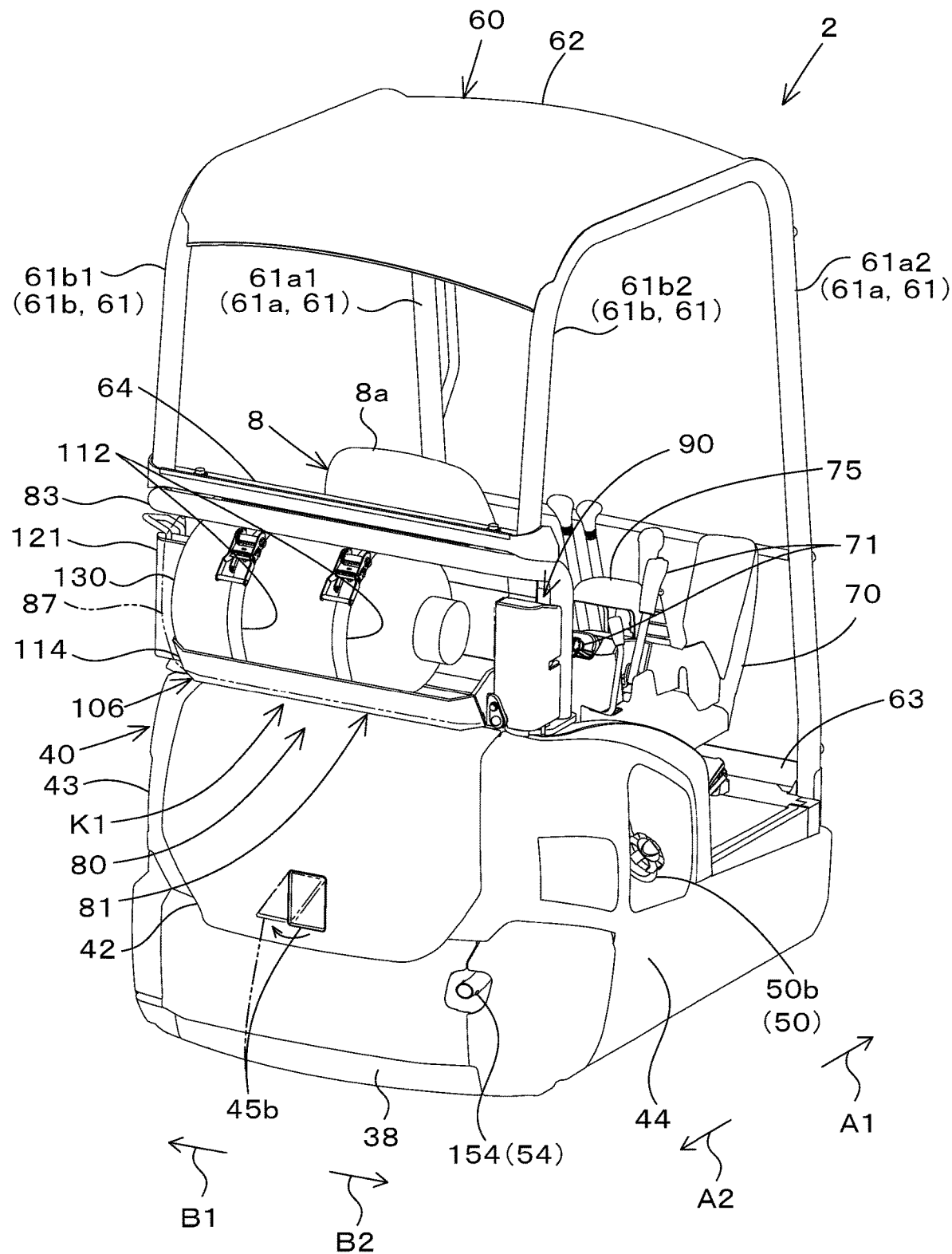
FIG. 1B is a right-rear perspective view showing the swivel base, the hood, and the protection mechanism.

As shown in FIGS. 1A and 1B, the weight 38 defines a lower left side, a lower right side, and a lower back side of the engine compartment E.

Figure 3A:
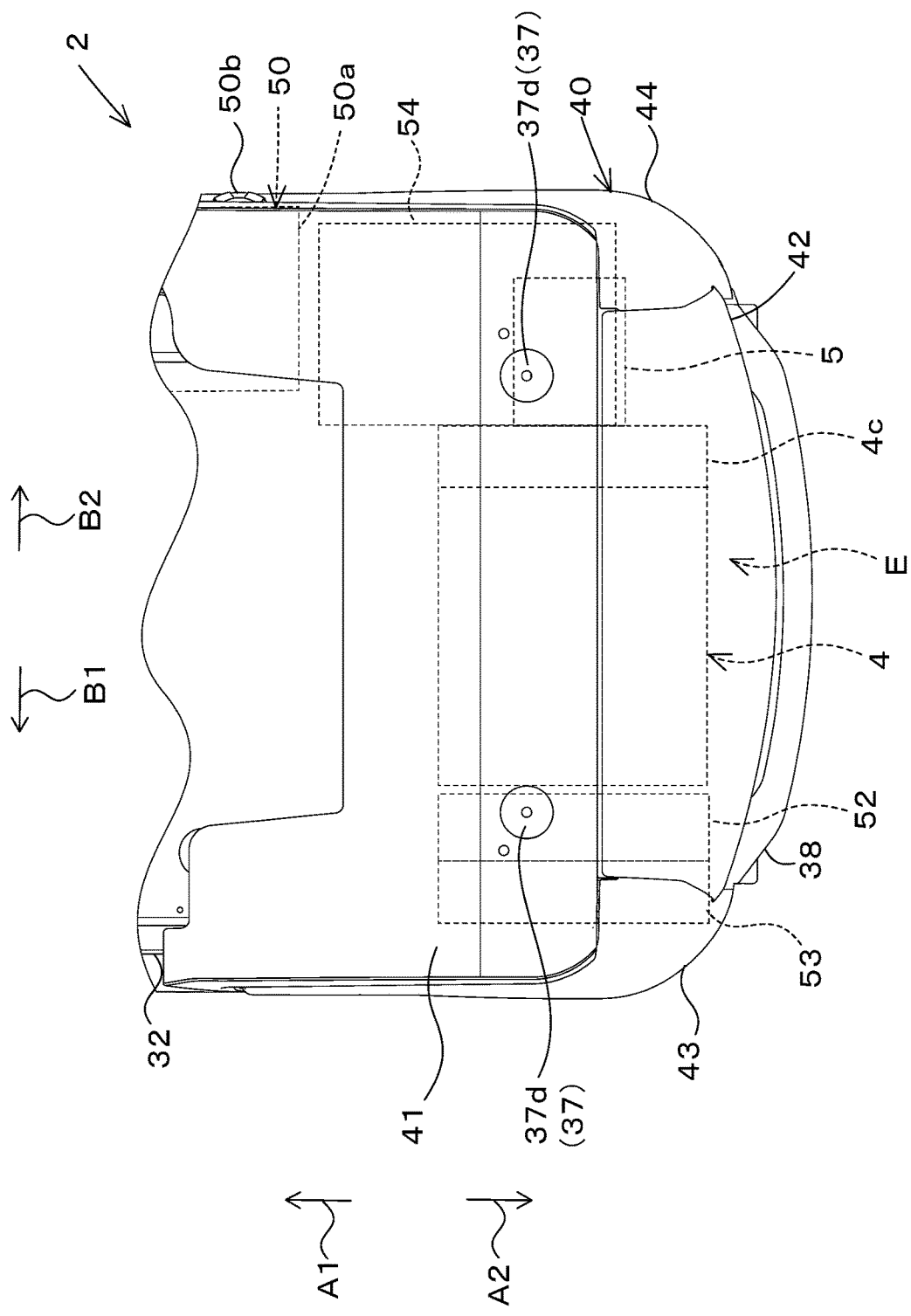
FIG. 3A is a plan view showing a hood.

The equipment mounted on the rear portion of the swivel base 2 will be described below. As shown in FIG. 3A or the like, a fuel tank 50, a radiator 52, an oil cooler 53, and an exhaust structure 54 are mounted on the swivel base 2. The fuel tank 50 is a tank for storing fuel (gasoline, that is, first fuel in this embodiment) to be supplied to the prime mover 4. The fuel tank 50 is arranged on the other side (the right side) of the swivel base 2 in the machine width direction, and in detail, on the right side of the operator seat 8. The fuel tank 50 includes a tank body 50a and a refueling port 50b that is open into the tank body 50a. The fuel tank 50 is a resin product with a hollow structure formed in the blow molding, rotational molding, or the like. The fuel tank 50 is not limited to a resin product, but may be made of metal. The refueling port 50bb extends rightwardly upward from the upper portion of the tank body 50a. The refueling port 50b has a rightwardly upward open end openably closed with a fuel cap.

The radiator 52 is a device that cools the coolant of prime mover 4. The oil cooler 53 is a device that cools the operation fluid that is returning to the operation fluid tank. As shown in FIG. 3A, the radiator 52 and the oil cooler 53 are arranged leftward of the prime mover 4 and are arranged side by side in the machine width direction. Specifically, the radiator 52 is located closer to the prime mover 4 than the oil cooler 53. That is, the radiator 52 is located leftward of the prime mover 4, and the oil cooler 53 is located leftward of the radiator 52. The oil cooler 53 is opposed to the radiator 52. A cooling fan to be driven by the driving force of the prime mover 4 is interposed between the radiator 52 and the prime mover 4. This cooling fan is a suction fan that sucks air from the left side of the oil cooler 53 and supplies the air toward the prime mover 4.

As shown in FIG. 3A, the exhaust structure 54 is arranged on the other side of the swivel base 2 in the machine width direction and is connected to an exhaust manifold (not shown in the drawings) of the prime mover 4. The exhaust structure 54 lowers the temperature and noise of exhaust gas from the prime mover 4 and removes harmful substances from the exhaust gas, and discharges the exhaust gas outside.

Figure 3B:
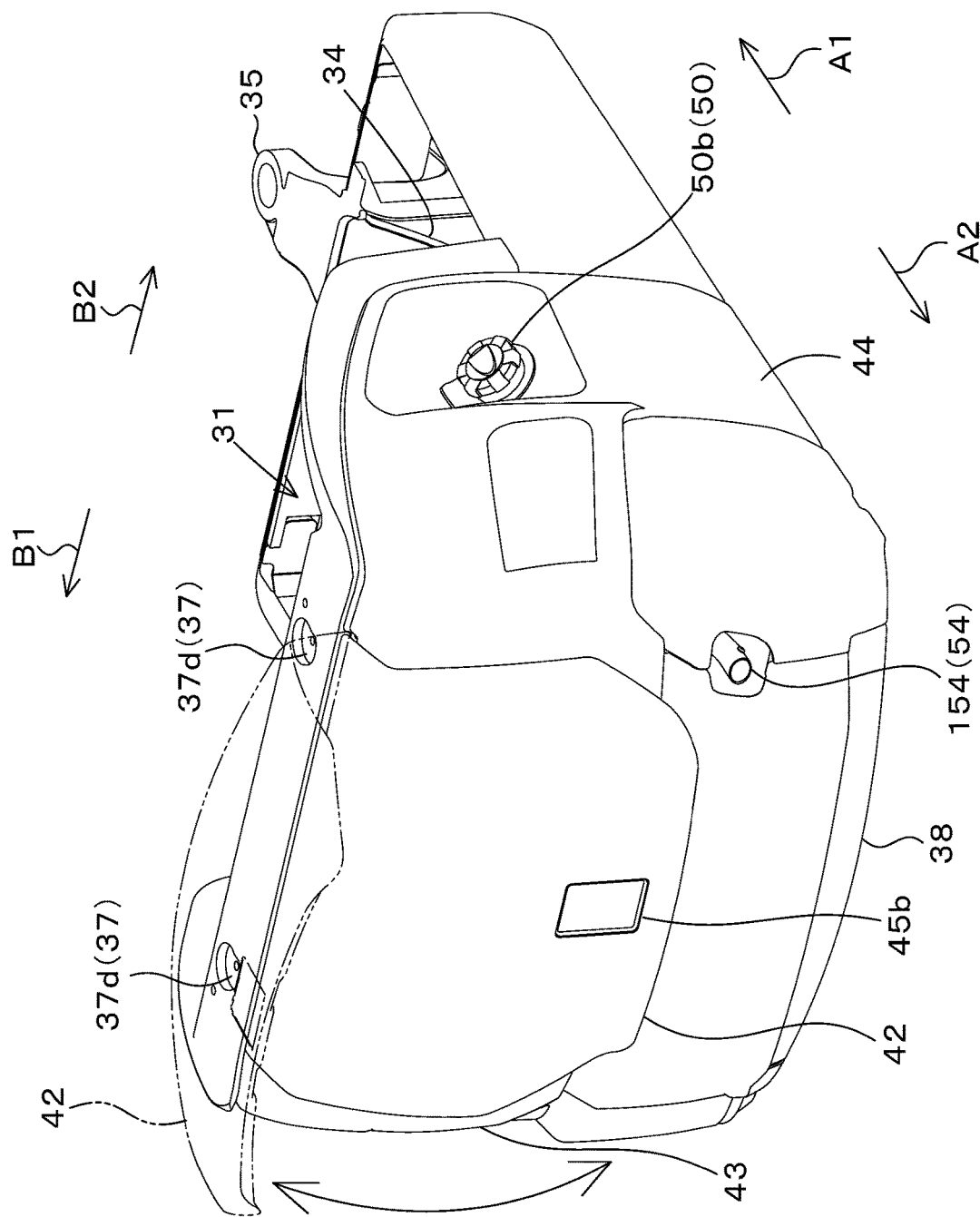
FIG. 3B is a left-rear perspective view of the swivel base showing opening and closing of the hood.

The following is a description of an exterior cover provided on the swivel base 2 and covering the prime mover 4, the hydraulic pump 5, the fuel tank 50, a battery, the operation fluid tank, the radiator 52, and the oil cooler 53. The exterior cover has the hood 40. As shown in FIGS. 3A and 3B, the hood 40 is a cover that mainly covers the prime mover 4 and forms the engine compartment E that houses the prime mover 4. The hood 40 includes a hood center 41, a rear hood 42, a first side hood 43, and a second side hood 44.

As shown in FIG. 3A, the hood center 41 is a cover that covers a space above and forward of the prime mover 4, and shields the interior of the protection mechanism 60 from the engine compartment E. The hood center 41 is fastened to the upper portion of the bar 37d by bolts or other fastening members, and the lower portion of the hood center 41 is attached to the upper portion of the partition plate 36.

The rear hood 42 is a cover that covers a space rearward of the prime mover 4, is pivotably connected to the support frame 37, and can be opened and closed as shown in FIG. 3B. Specifically, the front portion of the rear hood 42 is pivotably connected to the support frame 37 by a hinge structure 45, and can be opened and closed pivotally around the pivotal axis of the hinge. In other words, the hood 40 is openable and closable.

As shown in FIG. 3B, the first side hood 43 is a cover that covers the left sides of the prime mover 4 and the hydraulic pump 5. The second side hood 44 is a cover that covers the right sides of the prime mover 4, radiator 52 and oil cooler 53. The second side hood 44 has an opening for taking air into the engine compartment E (hood 40).

Next, the hinge structure 45 that supports the rear hood 42 will be described. The hinge structure 45 is arranged inside the rear hood 42 in the machine width direction, and the hinge structure 45 includes fixed hinges 45a. As shown in FIG. 2A, the fixed hinges 45a are fixed to the support frame 37 which is fixed to the upper portion of the bar 37d. The fixed hinge 45a is formed of a thick steel plate, and is fixed to the inner side of the support frame 37 in the machine width direction and fixed on one side (the left side) and the other side (the right side). The fixed hinge 45a extends rearward from the lower portion of the support frame 37. A hinge shaft (not shown in the drawings) extending in the machine width direction is provided at a tip end (rear) portion of the fixed hinge 45a, and the fixed hinge 45a pivotably supports the rear hood 42 via the hinge shaft. That is, the rear hood 42 is shiftable between an opening state in which the rear hood 42 is swung upward around the hinge shaft to open the interior of the engine compartment E to the exterior, and a closed state in which the rear hood 42 is swung downward around the hinge shaft to shut off the interior of the engine compartment E from the exterior.

As shown in FIGS. 1A, 1B, and 3B, a lock lever 45B is provided on the rear hood 42. Specifically, for example, the lock lever 45b for keeping the rear hood 42 in the closed state is provided at a lower portion of the rear hood 42. The lock lever 45b is vertically pivotable and can be selectively engaged with or disengaged from an engaged member (not shown in the drawings) such as a striker provided inside the engine compartment E. When the rear hood 42 is to be opened, an operator pulls up the lock lever 45*b* to disengage the lock lever 45*b* from the engaged member, and then pulls up the rear hood 42. The only requirement is that the hinge structure 45 supports the rear hood 42 shiftable between the opening state and the closing state. Therefore, the hinge structure 45 may employ a conventional technique and is not limited to the above-mentioned configuration.

The protection mechanism 60 provided on the swivel base 2 and covering the operator seat 8 will be described below. As shown in FIGS. 1A, 1B, 14 and 15, the protection mechanism 60 is mounted on a rearward portion of the swivel base 2 and protects the operator seat 8. As shown in FIGS. 1A and 1B, the protection mechanism 60 has struts 61 and a roof 62. The struts 61 are arranged at least above the hood 40, and are spaced from each other in the machine width direction. In this embodiment, the protection mechanism 60 is a four-strut structure canopy having a pair of struts 61 provided at the front portion of the swivel base 2 and another pair of struts 61 provided above the hood 40. That is, the protection mechanism 60 can be a canopy with a two-strut or three-strut structure, or a cabin, as long as it has at least the first rear strut 61*b*1 and the second rear strut 61*b*2 to be described later. The struts 61 include a pair of front struts 61*a* that support the front portion of the roof 62 and a pair of rear struts 61*b* that support the rear portion of the roof 62.

As shown in FIGS. 1A and 1B, the pair of front struts 61*a* include the first front strut 61*a*1 arranged on one side (the left side) of the swivel base 2 in the machine width direction, and a second front strut 61*a*2 arranged on the other side (the right side). The first front strut 61*a*1 and the second front strut 61*a*2 are spaced apart from each other in the machine width direction at the front portion of the swivel base 2 and extend in the vertical direction. The first front strut 61*a*1 and the second front strut 61*a*2 are located at the front corner portions of the protection mechanism 60 and support the front corner portions of the roof 62.

As shown in FIGS. 1A and 1B, the pair of rear struts 61*b* include a first rear strut 61*b*1 arranged on one side (the left side) of the swivel base 2 in the machine width direction and a second rear strut 61*b*2 arranged on the other side (the right side). The first rear strut 61*b*1 and the second rear strut 61*b*2 are spaced apart from each other in the machine width direction at the rear portion of the swivel base 2 and extend in the vertical direction. The first rear strut 61*b*1 and the second rear strut 61*b*2 are located at the rear corner portions of the protection mechanism 60 and support the rear corner portions of the roof 62.

As shown in FIGS. 1A, 1B, 14, and 15, the roof 62 is an substantially plate-shaped structure covering the upper portion of the operator seat 8, and is supported on the upper portion of each of the struts 61 so that its plate surfaces face up and down. The roof 62 extends to cover the front and rear portions of the swivel base 2 and extends to cover one (left) and the other (right) sides of the swivel base 2 in the machine width direction.

Figure 4A:
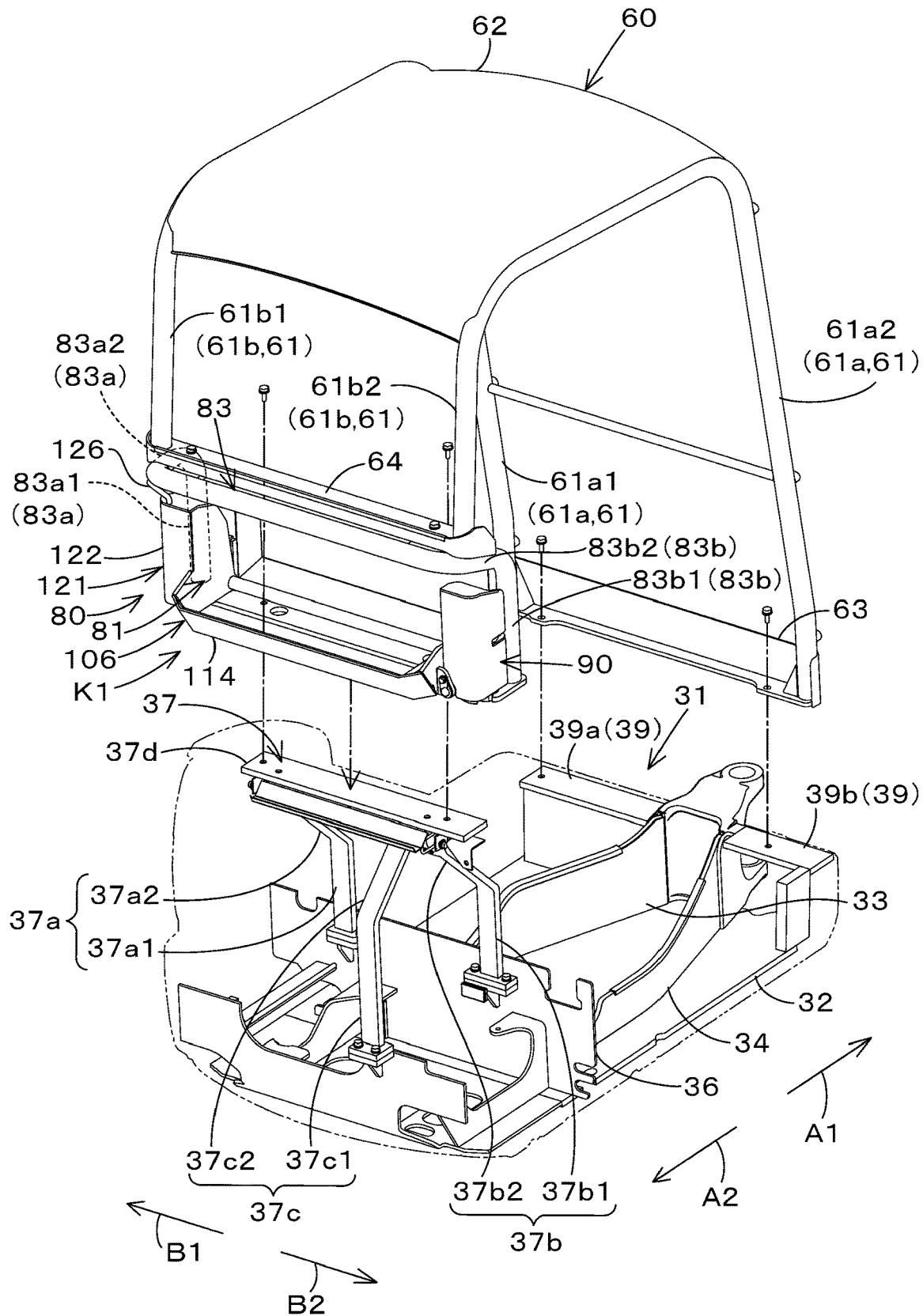
FIG. 4A is a right-rear perspective view showing attachment of the protection mechanism.

As shown in FIGS. 1A, 1B, and 4A, a front lower frame 63 is provided at the front lower end portion of the protection mechanism 60. The front lower frame 63 extends between the lower end portion of the first front strut 61*a*1 and the lower end portion of the second front strut 61*a*2. That is, the front lower frame 63 extends in the machine width direction, and the first front strut 61*a*1, the second front strut 61*a*2, the roof 62, and the front lower frame 63 form a window at the front portion of the protection mechanism 60 through which the interior of the protection mechanism 60 is open forward of the protection mechanism 60.

As shown in FIGS. 1A, 1B and 4A, a rear lower frame 64 is provided at the rear lower end portion of the protection mechanism 60. The rear lower frame 64 extends between the lower end portion of the first rear strut 61*b*1 and the lower end portion of the second rear strut 61*b*2. The rear lower frame 64 is provided at a higher position than the front lower frame 63. The rear lower frame 64 extends in the machine width direction, and the first rear strut 61*b*1, the second rear strut 61*b*2, the roof 62, and the rear lower frame 64 form a window at the rear portion of the protection mechanism 60 through which the interior of the protection mechanism 60 is open rearward of the protection mechanism 60.

The structure supporting the front portion of the protection mechanism 60 will be described below. As shown in FIG. 4A, the swivel base 2 is provided with front mount members 39 (including a first front mount 39*a* and a second front mount 39*b*) that support the front lower frame 63. The first front mount 39*a* is provided on one machine width directional side (left side) front portion of the swivel base 2, specifically, leftward of the swing bracket 21. The first front mount 39*a* is assembled with the left portion of the front lower frame 63 by bolts or other fastening members.

On the other hand, the second front mount 39*b* is provided on the other machine width directional side (right side) front portion of the swivel base 2, specifically, rightward of the swing bracket 21. The second front mount 39*b* is assembled with the right portion of the front lower frame 63 by bolts or other fastening members.

The structure supporting the front portion of the protection mechanism 60 may employ a conventional technique, and this support structure may have anti-vibration rubbers serving as the first front mount 39*a* and the second front mount 39*b* supporting the front portion of the protection mechanism 60 such as to prevent vibration against the swivel base 2, and is not limited to the above-mentioned configuration.

Figure 4B:
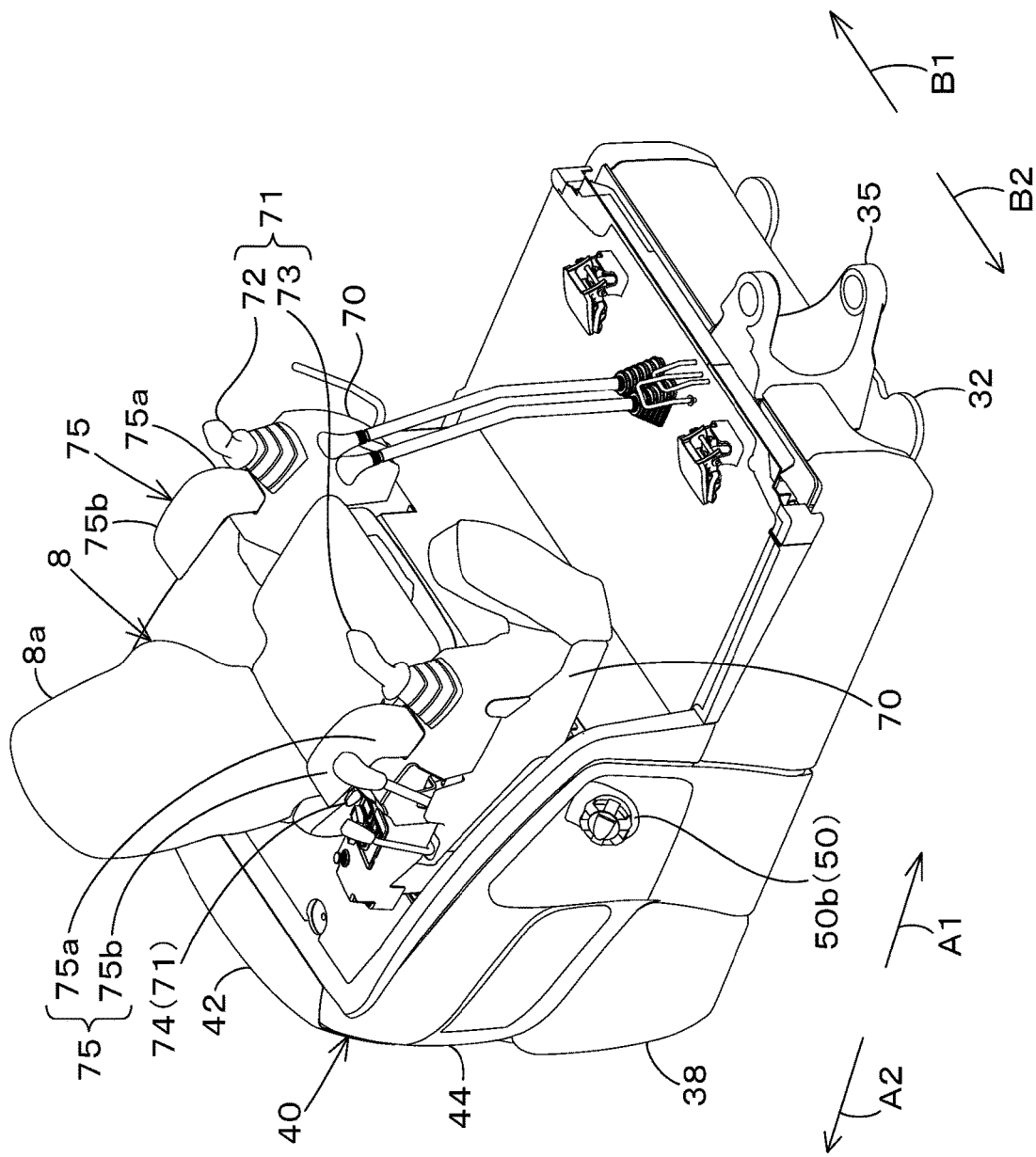
FIG. 4B is a right-front perspective view showing an operator seat, a console box, an operation device, and an armrest.

The surroundings of the operator seat 8 inside the protection mechanism 60 will be described below. As shown in FIG. 4B, a console box (operation platform) 70, an operation device 71 for operating the swiveling work machine 1, and an armrest 75 are provided around the operator seat 8. A pair of console boxes 70 are arranged on both side-portions of the operator seat 8, that is, on both sides in the machine width direction, and extend from the front portion to the rear portion of the operator seat 8. The rear portions of the console boxes 70 arranged on the other side (the right side) in the machine width direction overlap a backrest portion 8*a* of the operator seat 8 in the fore-and-aft direction.

The operation device 71 is a device that can be operated by the operator to control the swiveling work machine 1. As shown in FIG. 4B, the operation device 71 includes a first control lever 72, a second control lever 73, and a setting dial 74. The first control lever 72, the second control lever 73, and the setting dial 74 are provided at upper portions of the console boxes 70.

The first control lever 72 is located on a front upper portion of the console box 70 on one side (the left side) in the machine width direction and is a device configured to operate the boom 23 and the bucket 27.

The second control lever 73 is located at the upper portion of the console box 70 on the other side (the right side) in the machine width direction and is a device configured to operating the swiveling and the arm 25.

The setting dial 74 is arranged at the rear upper portion of the console box 70 on the other side (the right side) of the operator seat 8, for example. The setting dial 74 is a dial switch, such as a selector switch having a plurality of switching positions, and is capable of setting a rotation speed of the prime mover 4.

As shown in FIG. 4B, armrests 75 are provided on opposite side portions of the operator seat 8, that is, on one (left) and the other (right) machine width directional sides of the operator seat 8, respectively. Each of the armrests 75 is a member on which an operator seated on the operator seat 8 places his elbow or arm while holding any one of the control levers. For example, the armrest 75 on one machine-width directional side (the left side) is located at the upper portion of the console box 70 and behind the first control lever 72. The armrest 75 on the other machine-width directional side (the right side) is located on the upper portion of the console box 70 between the second control lever 73 and the setting dial 74.

Each of the armrests 75 has a rising portion 75a and a loading portion 75b. The rising portion 75a is a portion that rises upward from the upper portion of one of the console box 70 and supports the loading portion 75b. The loading portion 75b is a portion on which the operator places his elbow or arm, and is extended rearward from the upper portion of the rising portion 75a.

As shown in FIGS. 1, 2, 10 and 14, and the like, the swiveling work machine 1 is provided with a fuel cylinder 130 (accommodated object) that contains fuel (gaseous fuel, that is, second fuel). The fuel cylinder 130 is, for example, a bottomed cylindrical container, and contains compressed second fuel therein in the form of compressed gas or liquid. That is, the fuel cylinder 130 is a high-pressure gas container. The second fuel is a fuel for driving the prime mover 4, for example, compressed natural gas (CNG), liquefied natural gas (LNG), compressed petroleum gas (CPG), and liquefied petroleum gas (LPG). The second fuel contained in the fuel cylinder 130 is supplied to the prime mover 4 via a hose connected to the fuel cylinder 130.

As shown in FIGS. 1A, 1B, 4A and the like, the swiveling work machine 1 is provided with an accommodating portion 81 that is formed between the hood 40 and the struts 61 and houses the fuel cylinder 130 (accommodated object). This allows the swiveling work machine 1 to effectively utilize a space between the hood 40 and the struts 61 to provide a space to accommodate the fuel cylinder 130. In addition, the swiveling work machine 1 is provided with a supporter 80 that supports the struts 61 and forms the accommodating portion 81. The supporter 80 is provided on the swivel base 2 and supports the struts 61 of the protection mechanism 60 that are arranged above the hood 40. For example, the supporter 80 is arranged at the rear portion of the swivel base 2 and supports the rear struts 61b.

Figure 5A:
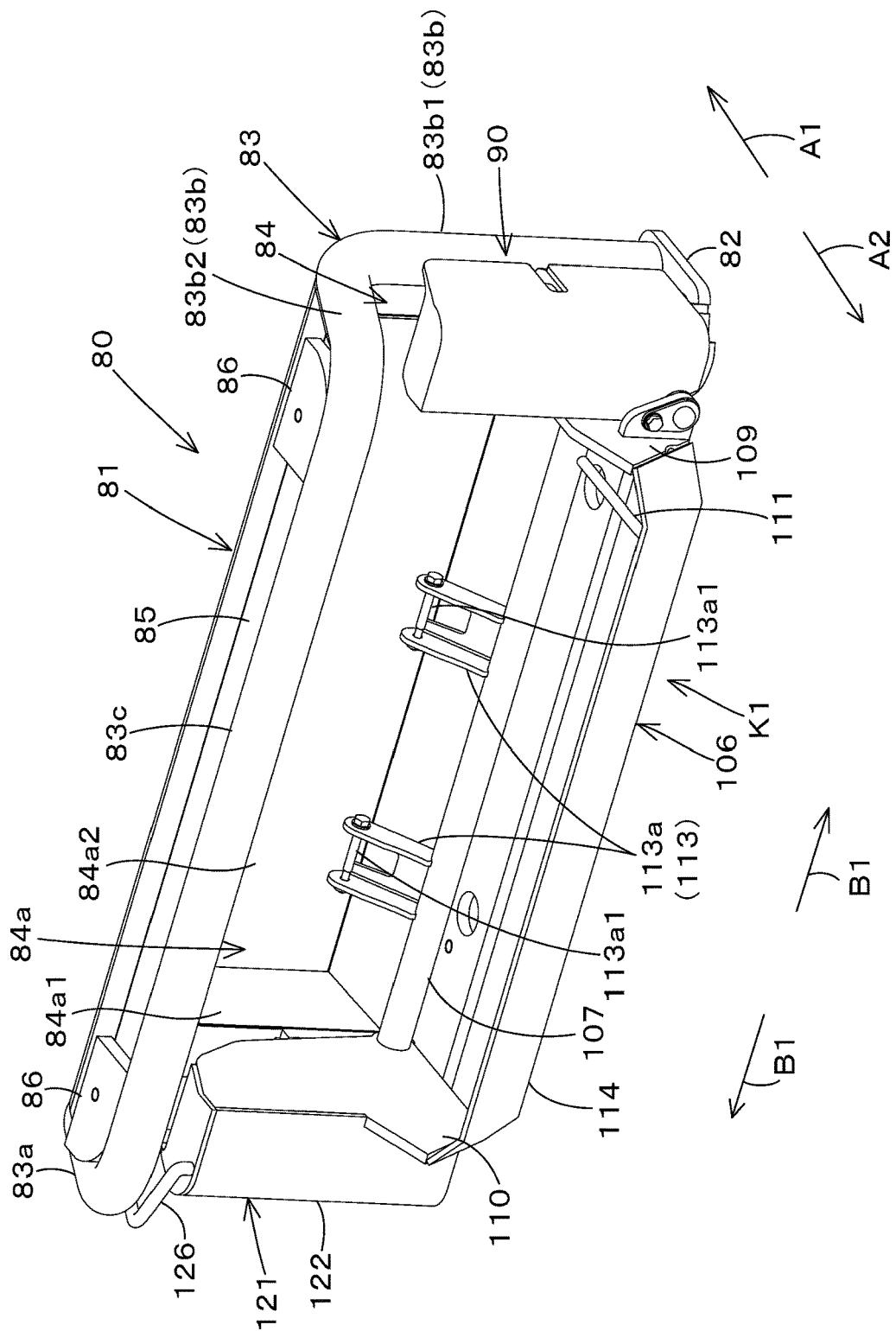
FIG. 5A is a right-rear perspective view showing a supporter.

As shown in FIG. 5A, the supporter 80 has a bottom member 82, a frame body 83, a vertical member 84, and an upper member 85. The bottom member 82 is a part defining a lower portion of the supporter 80, and is a plate-like portion arranged so that the plate surfaces thereof face up and down, and the length in the machine width direction and the length in the fore-and-aft direction are longer than the length thereof in the vertical direction. The bottom member 82 is located above the hood center 41 (hood 40) and is fastened to the upper portion of the rod member 37d (support frame 37) via the hood center 41 by a fastening member such as a bolt.

Figure 5B:
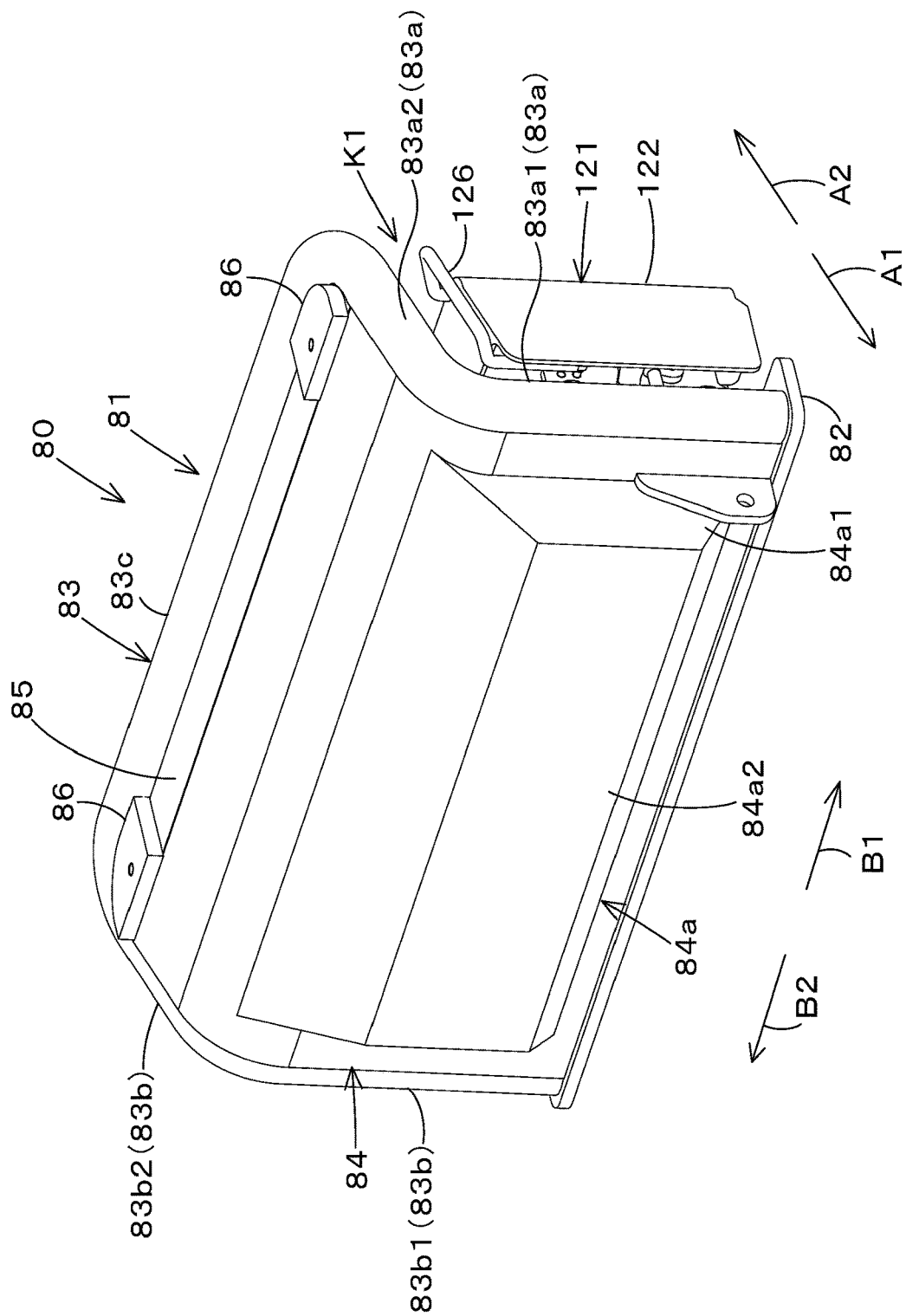
FIG. 5B is a left-front perspective view showing the supporter.
Figure 6A:
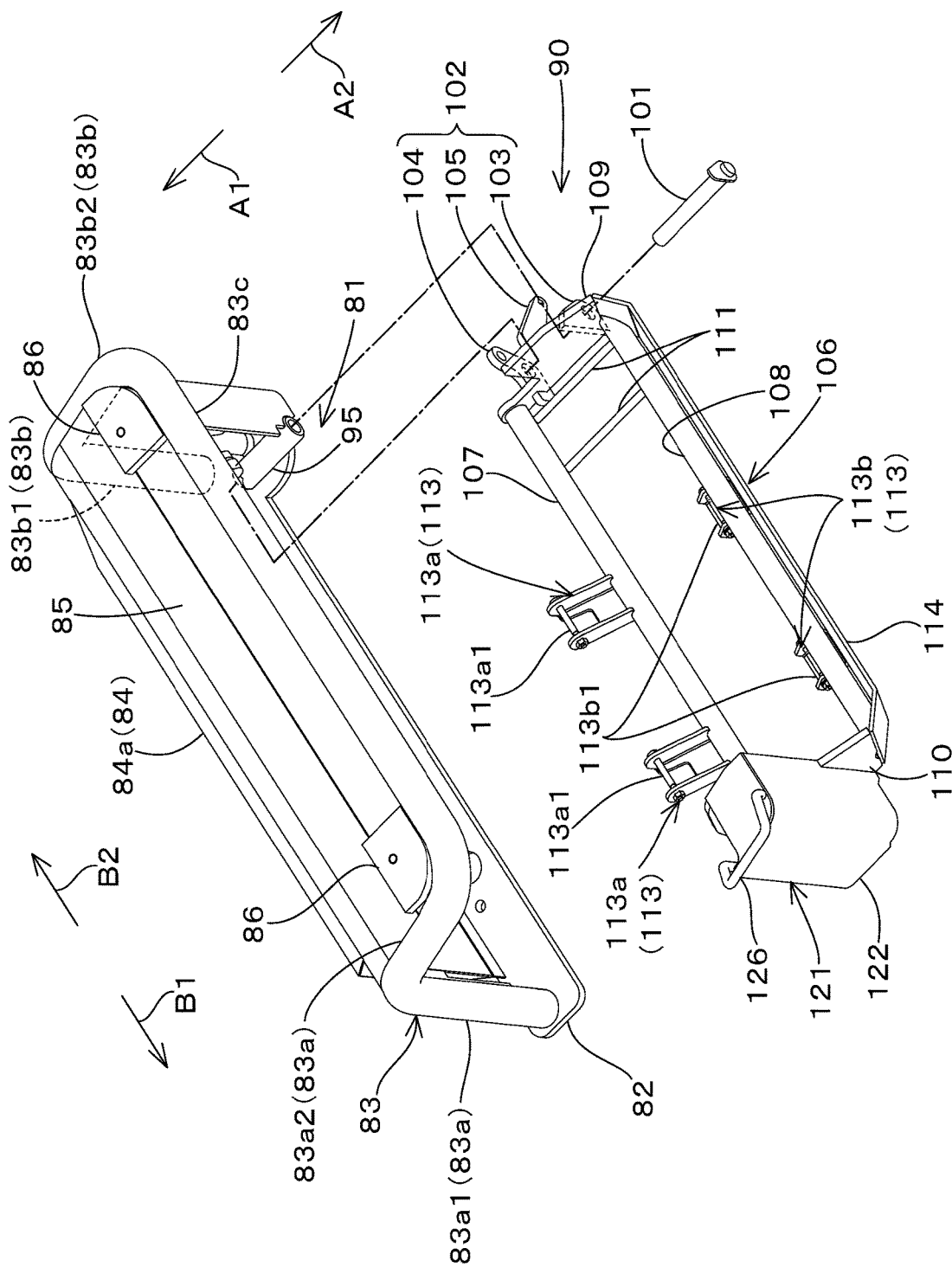
FIG. 6A is a left-rear perspective view showing an accommodating portion and an installation portion.

As shown in FIGS. 5A, 5B, and 6A, the frame body 83 is provided at the upper portion of the bottom member 82 and supports the attachment portion 86, which will be described later, against the swivel base 2. The frame body 83 is formed, for example, by bending a hollow pipe member, and includes a first strut 83a, a second strut 83b, and a connecting rod 83c. The first strut 83a defines one side (the left side) of the frame body 83, and the second strut 83b defines the other side (the right side) of the frame body 83. The first strut 83a and the second strut 83b are extended upright and spaced from each other in the machine width direction at the upper portion of the bottom member 82.

As shown in FIGS. 5B and 6A, the first strut 83a has a first portion 83a1 extending upwardly from the front portion of the hood 40 and a second portion 83a2 curving backwardly from the upper end portion of the first portion 83a1. The first portion 83a1 extends upwardly from the upper portion of the left end of the bottom member 82. The rear end portion of the second portion 83a2 is curved rightward. The second strut 83b has a first portion 83b1 extending upward from the front portion of the hood 40, and a second portion 83b2 curving backward from the upper end portion of the first portion 83b1. The first portion 83b1 extends upwardly from the upper portion of the left end of the bottom member 82. The rear end portion of the second portion 83b2 is curved leftward. That is, the hood 40 (rear hood 42), the first portions 83a1 and 83b1, and the second portions 83a2 and 83b2 surrounds the space above the hood 40 to form the accommodating portion 81.

As shown in FIGS. 5A, 5B, and 6A, the connecting rod 83c extends between an upper end of the first strut 83a and an upper end of the second strut 83b, and connects the first strut 83a and the second strut 83b.

As shown in FIGS. 5A, 5B, and 6A, the vertical member 84 extends upwardly from the front portion of the hood 40. That is, the vertical member 84 is arranged between the front portion of the hood 40 and the rear portion of the backrest 8a of the operator seat 8, and separates the operator seat 8 from the fuel cylinder 130. The vertical member 84 connects the front portion of the lower end of the first strut 83a of the frame body 83 and the front portion of the lower end of the second strut 83b of the frame body 83, and is a plate-shaped member whose lengths in the vertical direction and in the machine width direction are longer than the length thereof in the fore-and-aft direction, and whose plate surfaces are arranged to face back and forth.

As shown in FIGS. 5A, 5B, and 6A, the vertical member 84 includes a central portion formed with a recessed portion 84a that is recessed forwardly. The recessed portion 84a has a pair of side portions 84a1 and an inclined portion 84a2. The side portions 84a1 are arranged apart from each other in the machine width direction, and each of the side portions 84a1 is a plate-shaped portion having lengths in the fore-and-aft direction and in the vertical direction that are longer than the length thereof in the machine width direction, for example, having a trapezoidal shape in a side view.

As shown in FIG. 5B, the inclined portion 84a2 is bent along the front edges of the pair of side portions 84a1. Specifically, one side (the left side) edge of the inclined portion 84a2 is joined to the edge of the left side portion 84a1, and the other side (the right side) edge is joined to the edge of the right side portion 84a1.

The upper member 85 extends rearward from the upper portion of the vertical member 84, extends from one side (the left side) to the other side (the right side) in the machine width direction, and is located above the hood 40. As shown in FIG. 5B, the upper member 85 connects the upper end portion of the first strut 83a and the upper end portion of the second strut 83b to each other, extends to the connecting rod 83c, and curves rearwardly upward from the upper end portion of the vertical member 84 along intermediate portions of the first strut 83a and the second strut 83b. The upper member 85, together with the vertical member 84, covers the upper portion of the hood 40. In this manner, the hood 40, the vertical member 84, and the upper member 85 surround the space above the hood 40 to form the accommodating portion 81.

The attachment portions 86 are portions to which the struts 61b of the protection mechanism 60 are attached. As shown in FIGS. 5A and 5B, the attachment portions 86 are joined to the upper portion of the supporter 80, specifically, are joined to the frame body 83, and are plate-like members provided on one (left) and the other (right) machine-width directional side portions of the upper member 85 so that its plate surfaces face up and down. That is, the attachment portion 86 are joined to the rear lower frame 64 of the protection mechanism 60, thereby supporting the rear strut 61b. The rear struts 61b (of the struts 61) are joined, via the attachment portion 86, to the first strut 83a, the second strut 83b, and the one (left) and the other (right) machine-width directional side portions of the upper member 85. The attachment portion 86 and the rear lower frame 64 are fastened by bolts or other fastening members. Thus, the protection mechanism 60 is supported on the swivel base 2 via the attachment portion 86, that is, via the supporter 80. This allows the weight applied by the roof 62 to be distributed to the one (left) and the other (right) machine-width directional side portions of the upper member 85. The attachment portion 86 may be configured to have anti-vibration rubbers and support the rear portion of the protection mechanism 60 against the swivel base 2 to prevent the vibrations, and the support structure thereof is not limited to the above-mentioned configuration, as conventional techniques can be employed.

In the above-described embodiment, the rear struts 61b (of the struts 61) are supported by the first strut 83a and the second strut 83b of the supporter 80. However, the accommodating portion 81 need only be formed between the hood 40 and the struts 61, and the first strut 83a and the strut 61 (first rear strut 61b1) may be formed integrally with each other, and the second strut 83b and the strut 61 (the second rear strut 61b2) may be formed integrally with each other, so that the hood 40, the first portions 83a1 and 83b1 of the struts 61, and the second portions 83a2 and 83b2 of the struts 61 enclose a space to form the accommodating portion 81. In this case, the struts 61 may include the first portions 83a1 and 83b1 extending upward from the front portion of the hood 40, the second portions 83a2 and 83b2 curved backward from the upper ends of the first portions 83a1 and 83b1 and arranged above the hood 40, and the third portion (a rear strut) 61b extending upward from the upper portions of the second portions 83a2 and 83b2.

Figure 5C:
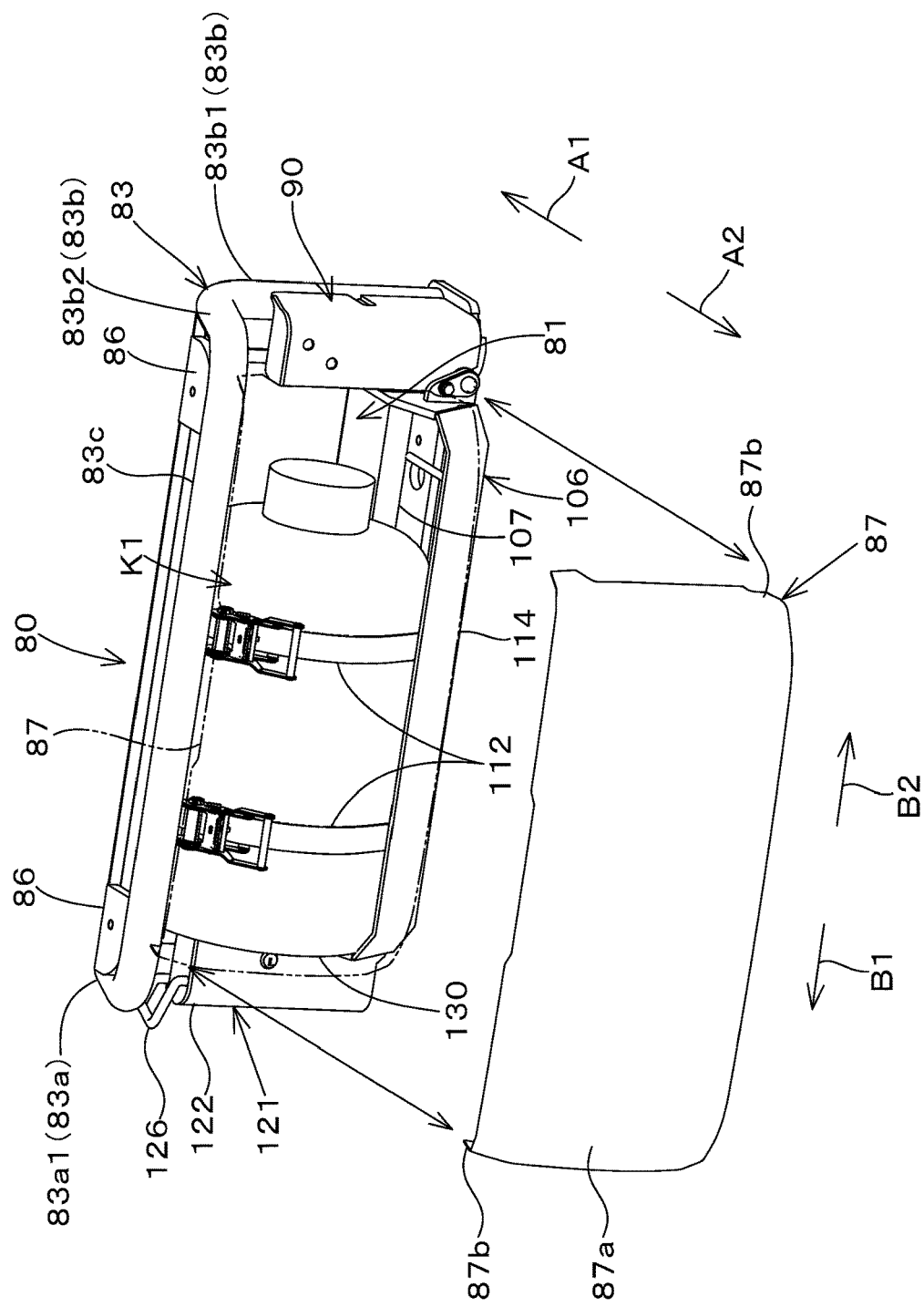
FIG. 5C is a view showing attachment and detachment of a cover to the supporter.

As shown in FIGS. 1B, 5C, and 14, the accommodating portion 81 may include a cover 87 that covers the rear portion of its accommodating space. As shown in FIG. 5C, the cover 87 has a rear wall portion 87a and a circumferential wall portion 87b. The rear wall portion 87a is an substantially rectangular-shaped plate portion whose plate surfaces are arranged to face back and forth, whose length in the machine width direction is longer than the length thereof in the vertical direction, and whose length in the fore-and-aft directions is shorter than the lengths thereof in the machine width direction and in the vertical direction. The circumferential wall portion 87b extends forward from at least a part of the circumference of the rear wall portion 87a, and surrounds a space in front of the rear wall portion 87a. For example, the circumferential wall portion 87b is extended from one side (the left side) and the other side (the right side) of the rear wall portion 87a. The cover 87 may be attached to the frame body 83 by bolts or other fastening members, or may be attached by being engaged with the frame body 83, and the attachment method thereof is not limited. The cover 87 may be openably attached to the supporter 80. For example, the cover 87 may be attached to the extension part 114 to be described below, or to a hinge provided on the connecting rod 83c.

As shown in FIGS. 1A, 1B, 5A and others, the supporter 80 is provided with a support mechanism 90 that supports the fuel cylinder 130. In other words, the swiveling work machine 1 is provided with the support mechanism 90. The support mechanism 90 is capable of supporting the fuel cylinder 130 above the hood 40. Hereinafter, a state in which the support mechanism 90 supports the fuel cylinder 130 above the hood 40 (rear hood 42), i.e., a state in which the fuel cylinder 130 is housed in the accommodating portion 81, will be referred to as an installation position (accommodating position) K1, and the support mechanism 90 will be described on an assumption that the support mechanism 90 is in the installation position K1 as an example.

Figure 6B:
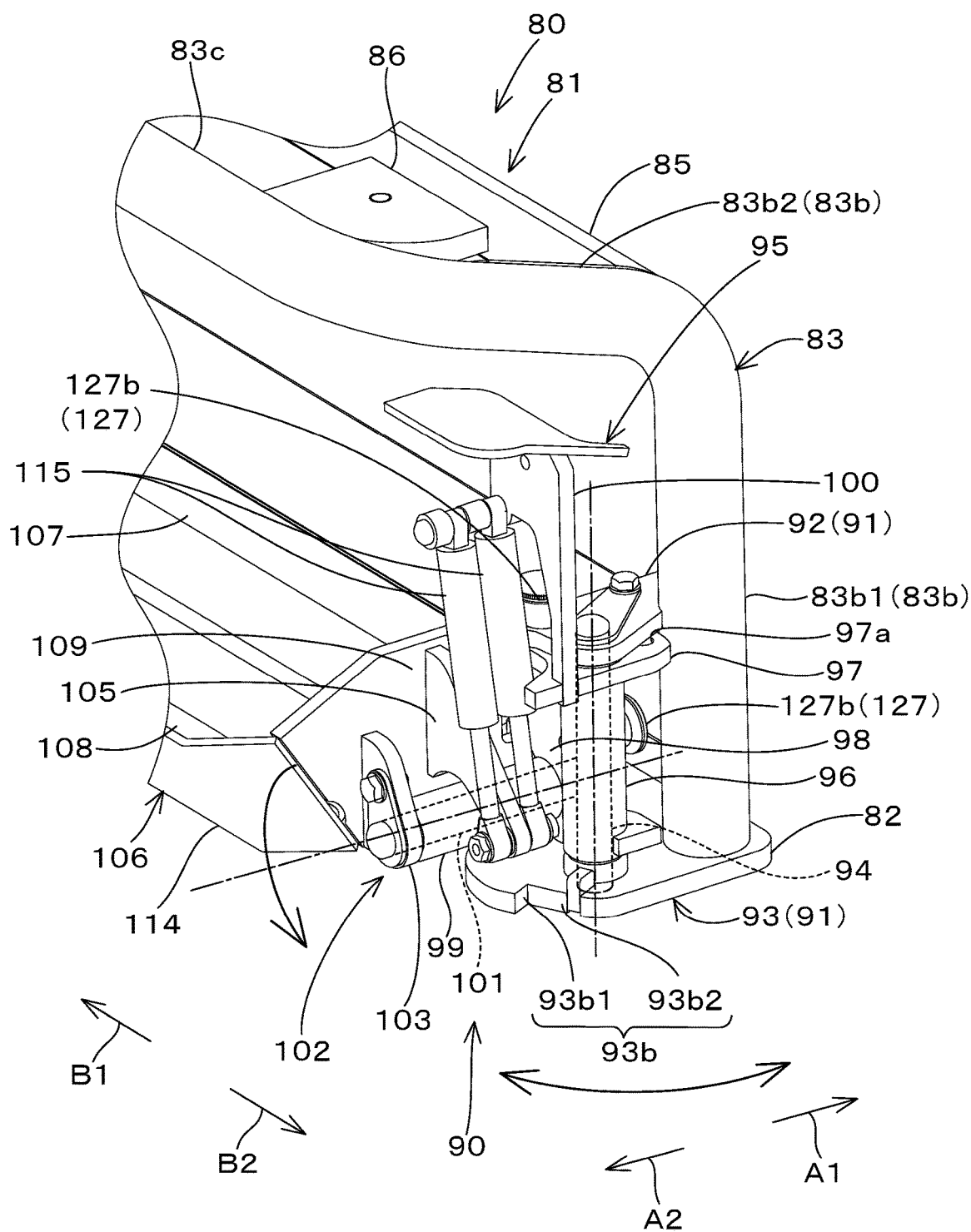
FIG. 6B is a right-rear perspective view showing a base, a first pivotal bracket, a first pivotal shaft, a second pivotal bracket, and a second pivotal shaft.
Figure 6C:
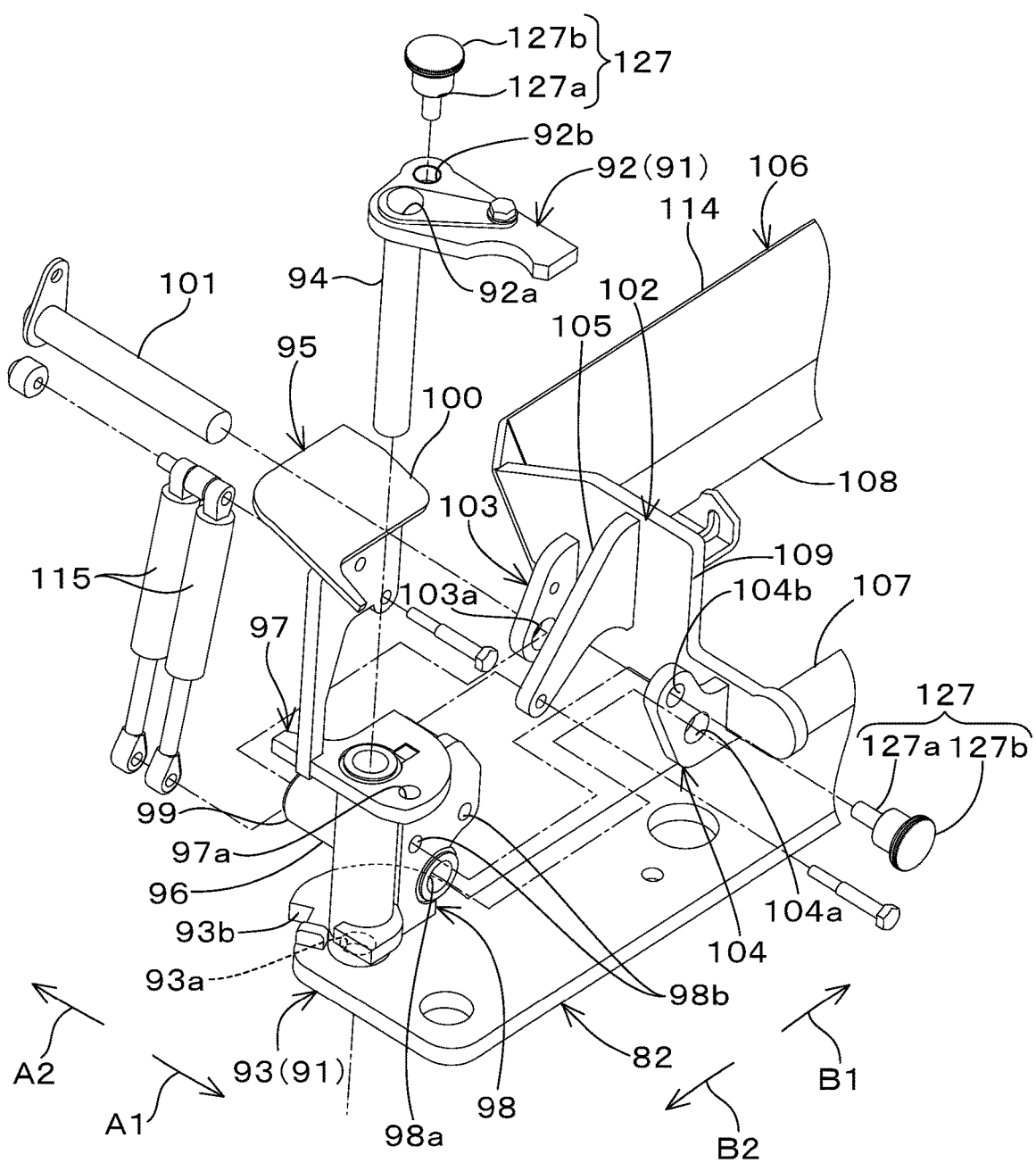
FIG. 6C is an exploded view showing attachment of the base, the first pivotal bracket, the first pivotal shaft, the second pivotal bracket, and the second pivotal shaft.

As shown in FIGS. 6A, 6B, and 6C, the support mechanism 90 has a base 91, a first pivotal shaft 94, a first pivot bracket 95, a second pivotal shaft 101, a second pivot bracket 102, and an installation part 106. The base 91 supports the first pivotal shaft 94. The first pivotal shaft 94 is an vertically axial shaft supporting the fuel cylinder 130 pivotably in the horizontal direction. The first pivot bracket 95 connects the first pivotal shaft 94 to the second pivotal shaft 101 and rotates around the first pivotal shaft 94. The second pivotal shaft 101 supports the fuel cylinder 130 pivotably in the vertical direction, and is a shaft having an axis orthogonal to the first pivotal shaft 94. The second pivot bracket 102 connects the second pivotal shaft 101 to the installation part 106, and rotates around the second pivotal shaft 101. The installation part 106 in which the fuel cylinder 130 is installed. The base 91, the first pivotal shaft 94, the first pivotal bracket 95, the second pivotal shaft 101, and the installation part 106 will be described in detail below.

As shown in FIG. 6B, the base 91 is connected to one end (the upper end) and the other end (the lower end) of the first pivotal shaft 94 in the vertical direction respectively, to support the first pivotal shaft 94. As shown in FIGS. 6B and 6C, the base 91 includes an upper pivotal support 92 supporting the upper end of the first pivotal shaft 94 and a lower pivotal support 93 supporting the lower end of the first pivotal shaft 94.

As shown in FIG. 6B, the upper pivotal support 92 protrudes rearward from a vertically intermediate portion of the second strut 83b. The upper pivotal support 92 is a plate-shaped part whose plate surfaces are arranged to face up and down, whose length in the fore-and-aft direction is longer than that in the machine width direction, and whose length in the vertical direction is shorter than those in the machine width direction and fore-and-aft direction. A vertically axial through hole 92a is formed in a rear portion of the upper pivotal support 92. The first pivotal shaft 94 is inserted through the hole 92a and an upper end of the pivotal shaft 94 in the hole 92a is fixed to the upper pivotal support 92 by welding or the like. As shown in FIG. 6C, the upper pivotal support 92 is vertically penetrated by a first locked hole 92b on one (left) side of the first pivotal shaft 94 in the upper pivotal portion 92.

As shown in FIGS. 6B and 6C, the lower pivotal support 93 is a part extending rearward from the other (right) machine-width directional side end portion of the bottom member 82. The lower pivotal support 93 is arranged so that its plate surfaces face up and down, and is a plate-like part whose length in the fore-and-aft direction is longer than that in the machine width direction and whose length in the vertical direction is shorter than that in the machine width direction. As shown in FIG. 6C, the lower pivotal support 93 has a vertically axial through hole 93a. The center of the hole 93a coincides in the horizontal direction with the center of the hole 92a of the upper pivotal support 92. The first pivotal shaft 94 is inserted through the hole 93a, and the lower end portion of the first pivotal shaft 94 in the hole 93a is fixed to the lower pivotal support 93 by welding or other manners. The rear edge (rear edge portion) of the lower pivotal support 93 has a substantially-circular arc concentric with the center of the hole 93a in plan view. A notch 93b is formed on the other side (the right side) of the rear edge portion of the lower pivotal support 93. The notch 93b includes a first end surface 93b1 and a second end surface 93b2. The first end surface 93b1 is a rightwardly facing surface of the notch 93b, and the second end surface 93b2 is a rearwardly facing surface of the notch 93b.

As shown in FIG. 6C, the first pivotal shaft 94 is supported by the upper pivotal support 92 and the lower pivotal support 93 of the base 91 and supports the first pivotal bracket 95 pivotably around its axial center. In this manner, the first pivotal shaft 94 supports, pivotably in the horizontal direction, the fuel cylinder 130 installed in the installation part 106.

As shown in FIGS. 6B and 6C, the first pivotal bracket 95 includes a first cylindrical portion 96, an upper pivotal supporting tab 97, a lower pivotal supporting tab 98, a second cylindrical portion 99, and a vertical pivotal supporting portion 100. The first cylindrical portion 96 has an inner diameter smaller than an outer diameter of the first pivotal shaft 94 and is a cylindrical portion through which the first pivotal shaft 94 is inserted. The first cylindrical portion 96 extends from a lower end of the upper pivotal support 92 to the upper end of the lower pivotal support 93. A vertical length of the first cylindrical portion 96 is shorter than the vertical length of the first pivotal shaft 94 so that an upper end of the first pivotal shaft 94 protrudes upward from an upper end of the first cylindrical portion 96, and a lower end of the first pivotal shaft 94 protrudes downward from a lower end of the first cylindrical portion 96.

As shown in FIGS. 6B and 6C, the upper pivotal supporting tab 97 is a plate-like portion extending from an upper portion of the first cylindrical portion 96 outward in the diameter of the first cylindrical portion 96. The upper pivotal supporting tab 97 is arranged so that its plate surfaces face up and down. As shown in FIG. 6C, a first locked hole 97a vertically penetrates a front portion of the upper pivot supporting tab 97. The first locked hole 97a is arranged on the circumference of a virtual circle concentric with the axial center of the first pivotal shaft 94.

As shown in FIGS. 6B and 6C, the lower pivotal supporting tab 98 is a plate-like portion arranged so that its plate surfaces face back and forth and is extended from the lower surface of the upper pivotal supporting tab 97 outward in the diameter of the first cylinder 96 so as to cover the lower portion of the first cylindrical portion 96. The lower pivotal supporting tab 98 is joined at an upper end thereof to a lower surface of the upper pivotal supporting tab 97, and is penetrated in the fore-and-aft direction at a lower portion thereof by a hole 98a into which the second cylindrical portion 99 is inserted and supported. As shown in FIG. 6C, the lower pivotal supporting tab 98 is penetrated at a portion thereof above the hole 98a by a plurality of second locked holes 98b having axes in a direction orthogonal to the second pivotal shaft 101 (in the fore-and-aft direction). The plurality of second locked holes 98b are aligned on the circumference of a virtual circle concentric with the axial center of the second pivotal shaft 101. In this embodiment, two second locked holes 98b are formed in the lower pivotal supporting tab 98.

The second cylindrical portion 99 into which the second pivotal shaft 101 is inserted is a cylindrical portion having end surfaces that face back and forth, and is fitted into the hole 98a so as to be supported by the lower pivotal supporting tab 98. An inner diameter of the second cylindrical portion 99 is smaller than an outer diameter of the second pivotal shaft 101. A front end of the second cylindrical portion 99 is joined to the lower pivotal supporting tab 98 at the rear end of the hole 98a, and extends backward from the hole 98a.

As shown in FIGS. 6B and 6C, the vertical pivotal supporting portion 100 extends upward from the right portion of the upper pivotal supporting tab 97 so that it is elongated in the vertical direction so as to have plate surfaces face back and forth. The upper portion of the vertical pivotal supporting portion 100 pivotably supports an upper portion (e.g., cylinder-bottom portion) of a gas damper 115.

As shown in FIG. 6B, the second pivotal shaft 101 is supported by the second cylindrical portion 99 of the first pivotal bracket 95 and supports the installation part 106 pivotably around its axial center, that is, the second pivotal shaft 101 supports the fuel cylinder 130 installed in the installation part 106 pivotably up and down. A length of the second pivotal shaft 101 in the fore-and-aft direction is longer than a length of the second cylinder portion 99 in the fore-and-aft direction, and a front end of the second pivotal shaft 101 protrudes from a front end of the second cylinder portion 99 and a rear end of the second pivotal shaft 101 protrudes from a rear end of the second cylinder portion 99.

As shown in FIGS. 6A and 6C, the second pivotal bracket 102 includes a first connecting plate 103, a second connecting plate 104, and a third connecting plate 105. The first connecting plate 103, the second connecting plate 104, and the third connecting plate 105 are separated from each other in the fore-and-aft direction and connected to the other side (the right side) of the installation part 106 in the machine width direction, and support the right side of the installation part 106. The first connecting plate 103 is a plate-like portion that protrudes rightward from a rear portion of the right side of the installation part 106 and extends downwardly rightward. As shown in FIG. 6C, a fore-and-aft axial through hole 103a is formed in a lower portion of the first connecting plate 103, and a rear end portion of the second pivotal shaft 101 is coupled through the hole 103a to the first connecting plate 103.

As shown in FIGS. 6A and 6C, the second connecting plate 104 is a plate-like portion protruding rightward from the right front portion of the installation part 106 and extending downwardly to the right. A fore-and-aft axial through hole 104a is formed in a lower portion of the second connecting plate 104, and a front end portion of the second pivotal shaft 101 is coupled through the hole 104a to the second connecting plate 104. In this manner, the installation part 106 is supported by the first connecting plate 103 and the second connecting plate 104 so that the installation part 106 can be swung about the axial center of the second pivotal shaft 101. In addition, as shown in FIG. 6C, a second locking hole 104b is formed in an upper portion of the second connecting plate 104, the second locking hole 104b penetrating the second connecting plate 104 in a direction orthogonal to the second pivotal shaft 101 (in the fore-and-aft direction).

As shown in FIGS. 6A and 6C, the third connecting plate 105 is a plate-like portion that protrudes rightward from a fore-and-aft intermediate portion of the right portion of the installation part 106 and extends downwardly rightward. A lower side (e.g., a piston-rod side) of the gas damper 115 is connected to a tip portion of the third connecting plate 105. Accordingly, the first pivotal bracket 95 and the second pivotal bracket 102 are connected to each other via the gas damper 115.

As shown in FIG. 6A, the installation part 106 detachably supports the fuel cylinder 130. The installation part 106 has a first installation rod 107, a second installation rod 108, a right side connecting wall 109, a left side connecting wall 110, and a plurality of connecting portions 111. The first installation rod 107 and the second installation rod 108 are rod-shaped portions that extend in the machine width direction and are arranged apart from each other in the fore-and-aft direction. Specifically, the first installation rod 107 defines a front portion of the installation part 106, and the second installation rod 108 defines a rear portion of the installation part 106. The first installation rod 107 and the second installation rod 108 support the fuel cylinder 130 above them.

As shown in FIG. 6A, the right side connecting wall 109 and the left side connecting wall 110 are plate-like portions whose plate surfaces are arranged to face right and left, whose lengths in the fore-and-aft direction are longer than the lengths in the vertical direction, whose lengths in the machine width direction is shorter than the lengths in the fore-and-aft direction and the vertical direction, and thus the right side connecting wall 109 and the left side connecting wall 110 are connected to the first installation rod 107 and the second installation rod 108. Specifically, the right side connecting wall 109 defines the right portion of the installation part 106, and connects the right end of the first installation rod 107 to the right end of the second installation rod 108. On the other hand, the left side connecting wall 110 defines the left portion of the installation part 106, and connects the left end of the first installation rod 107 to the left end of the second installation rod 108.

As shown in FIG. 6A, in addition to the right side connecting wall 109 and the left side connecting wall 110, the plurality of connecting portions 111 connect the first installation rod 107 and the second installation rod 108 to each other. The plurality of connecting portions 111 are, for example, rod-shaped members extending in the fore-and-aft direction, and their front portions are joined to the rear portion of the first installation rod 107 and their rear portions are joined to the front portion of the second installation rod 108. The plurality of connecting portions 111 are arranged spaced apart from each other in the machine width direction. For example, a pair of connecting portions 111 are arranged at the other (right) machine-width directional side portions of the first installation rod 107 and the second installation rod 108.

As shown in FIG. 5C, the installation part 106 has at least one fastener 112. The fastener 112 is a member that fixes the fuel cylinder 130 installed in the installation part 106. This allows the support mechanism 90 to firmly support and fix the fuel cylinder 130 by the fastener 112. The at least one fastener 112 includes, for example, belts that are wound around a rear portion of the fuel cylinder 130 and a front portion of the fuel cylinder 130 so as to fix the fuel cylinder 130 to the first installation rod 107 and the second installation rod 108. One end of the fastener 112 is provided with a hook, and the other end is formed with an unterminated loop into which a shaft 113b1 to described below can be inserted. A buckle or the like is provided at an intermediate portion of the fastener 112 to allow adjustment of the length of the fastener.

As shown in FIG. 6A, the installation part 106 has a plurality of belt attachment portions 113. Each of the belt attachment portions 113 is a portion to which one of belts serving as the fasteners 112 is attached. Two belt attachment portions 113 are provided at the front portion of the first installation rod 107 and at the rear portion of the second installation rod 108, respectively, and separated from each other in the machine width direction. The front belt attachment portion 113a is extended forward upwardly from the front portion of the first installation rod 107 and has a shaft portion 113a1 to which an end portion of one of the fasteners 112 is fixed. The shaft portion 113a1, for example, is engaged with a hook provided on one end of one of the fasteners 112. On the other hand, the rear belt attachment portion 113b is extended rearward upwardly from the rear portion of the second installation rod 108 and has a shaft portion 113b1 to which a loop of the other end of one of the fasteners 112 is attached.

As shown in FIGS. 5C, 6A, 6B and others, the installation part 106 has an extension part 114. The extension part 114 faces a lower portion of the fuel cylinder 130 arranged at the installation position K1 in the machine outward direction (in the fore-and-aft direction). Specifically, the extension part 114 extends upwardly backward from the rear edge portions of the left side connecting wall 110 and the right side connecting wall 109 to the rear of the belt attachment portion 113. The extension part 114 is a plate shaped portion arranged so that its plate surfaces face upwardly forward and backwardly downward, and is long in the machine width direction so that its length in the machine width direction is longer than the lengths thereof in the vertical direction and fore-and-aft direction. The extension part 114 surrounds the fuel cylinder 130 in cooperation with the upper member 85 when the support mechanism 90 is in the installation position K1. Specifically, as shown in FIG. 14, a length L2 between the upper member 85 and the extension part 114 is shorter than the diameter L1 of the fuel cylinder 130. This allows the fuel cylinder 130 to be surrounded with the upper member 85 and the extension part 114 and thus to stay above the hood 40.

Figure 6D:
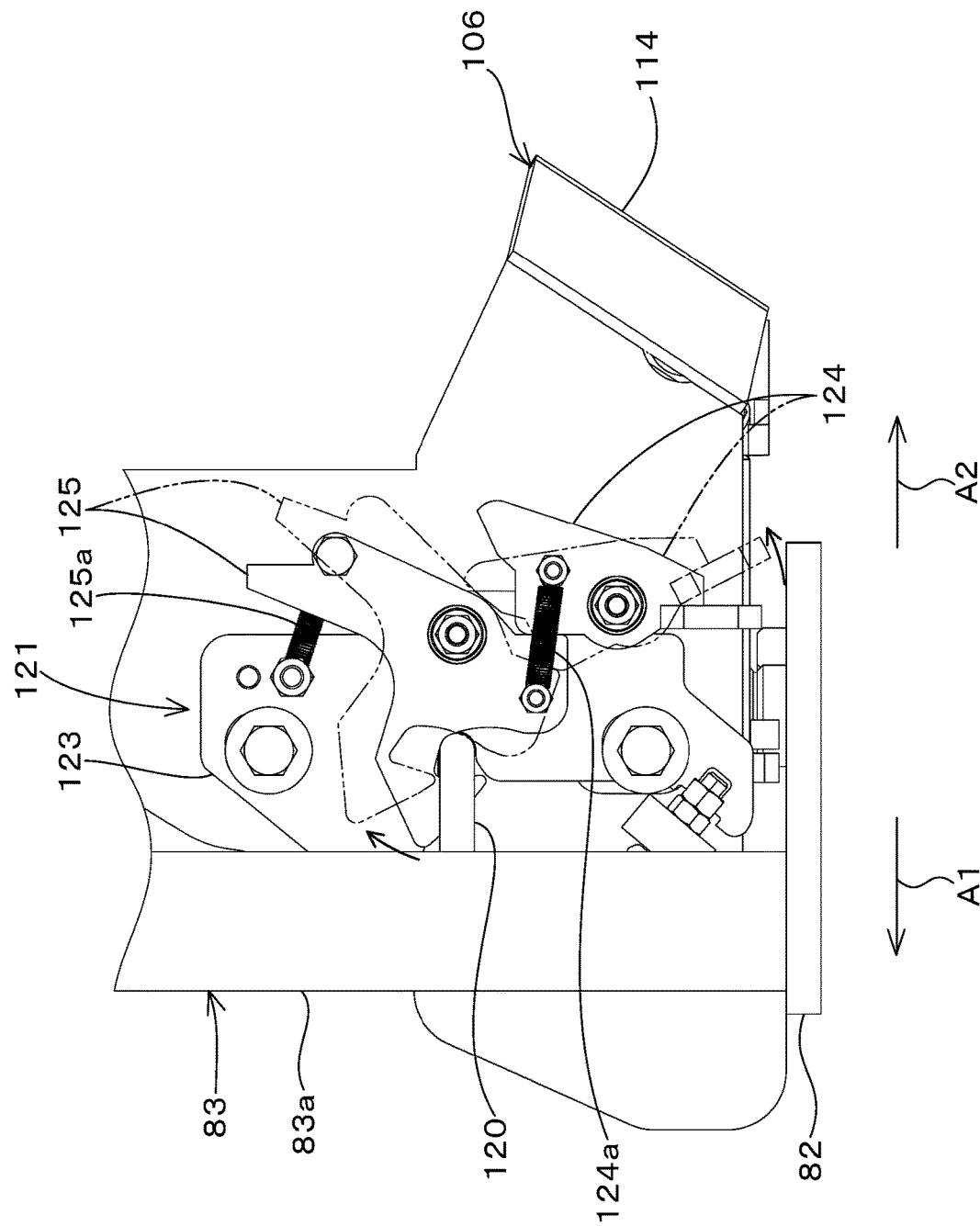
FIG. 6D is a left-side view showing a movement of an engagement mechanism.
Figure 8A:
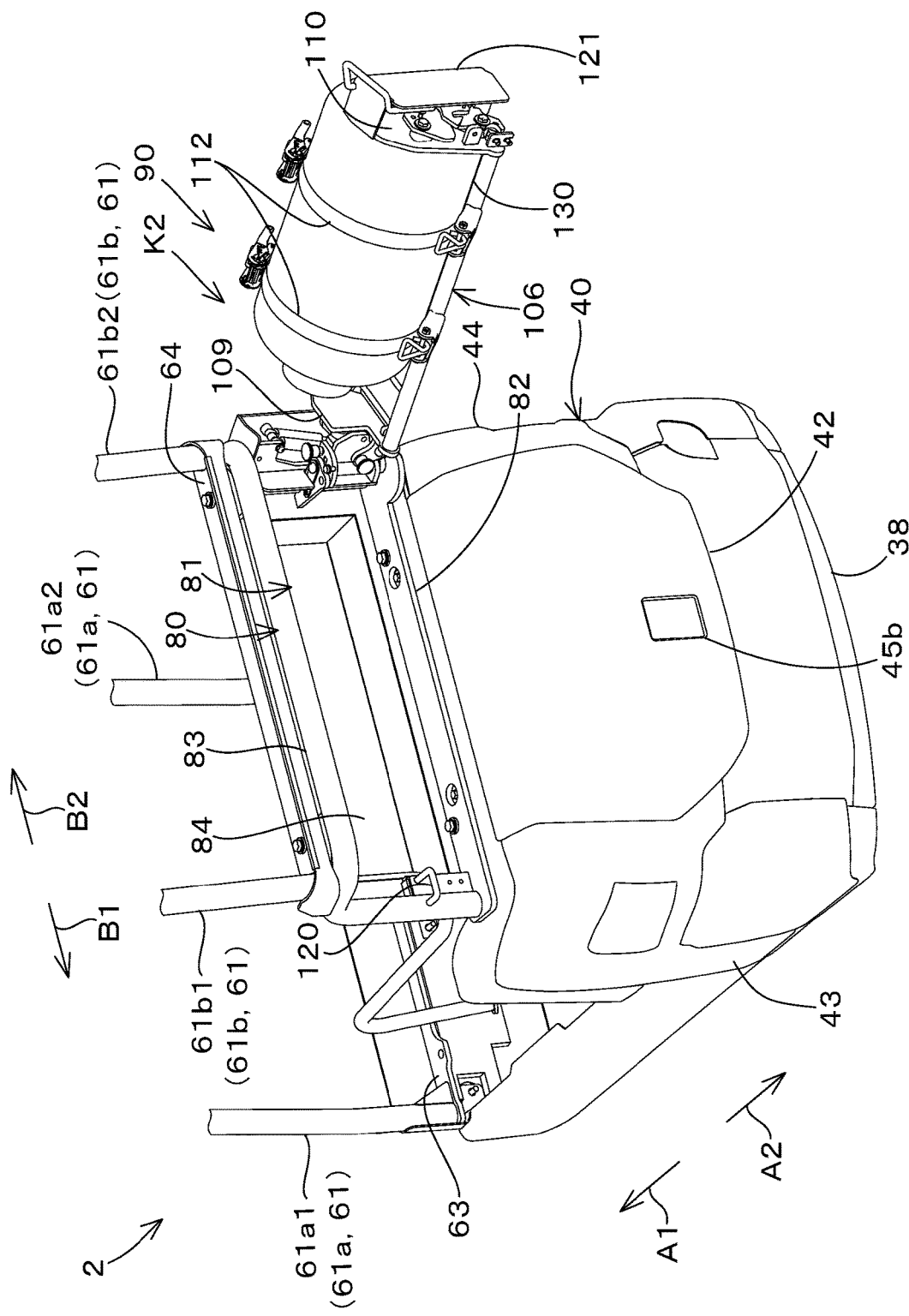
FIG. 8A is a left-rear perspective view showing the swivel base and the supporting mechanism when the supporting mechanism is at a retracting position K2.
Figure 9A:
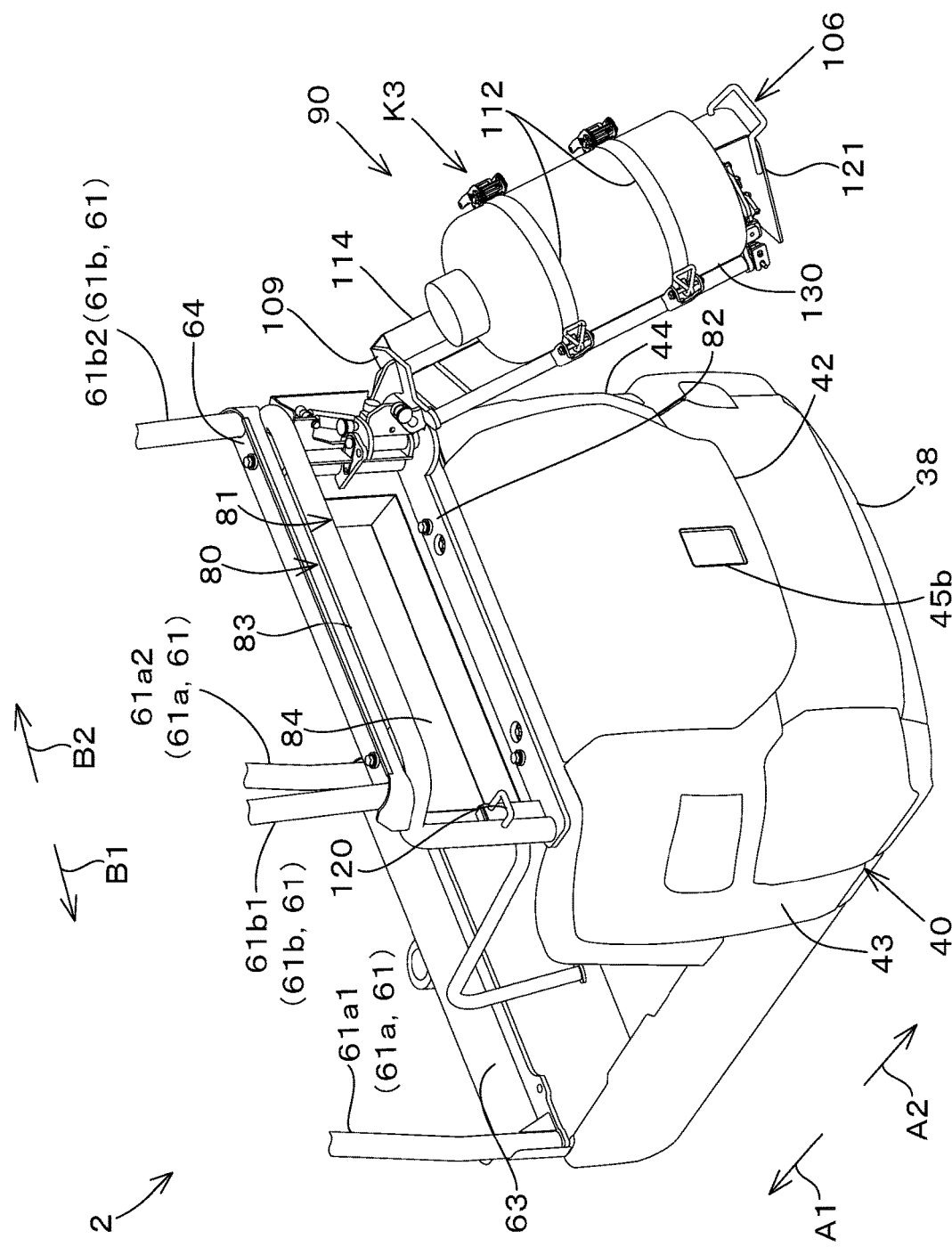
FIG. 9A is a left-rear perspective view showing the swivel base and the supporting mechanism when the supporting mechanism is at a hanging position K3.

The support mechanism 90 includes a structural body that regulates rotation around the first pivotal shaft 94 and the second pivotal shaft 101. Specifically, the support mechanism 90 includes a locked portion 120, a locking mechanism 121, and a plurality of pin assemblies 127. As shown in FIGS. 6D, 8A and 9A, the locked portion 120 is provided on one side (the left side) of the accommodating portion 81 in the machine width direction. Specifically, the locked portion 120 is a portion to which the locking mechanism 121 engages, and protrudes rearwardly from the rear portions of the vertically intermediate portions of the first strut 83a and the rear wall portion 87a. The left portion of the locked portion 120 protrudes rearwardly from the rear portion of the first strut 83a and is bent to the right at the intermediate portion, and the right portion of the locked portion 120 is bent forwardly and is joined to the rear portion of the vertical member 84, and thus has a substantially-gate shape in plan view.

As shown in FIG. 6D, the locking mechanism 121 is a mechanism capable of engaging with and disengaging from the locked portion 120. The locking mechanism 121 is provided on one side (the left side) of the installation part 106 in the machine width direction, and has an enclosure 122, a rotation support plate 123, a rotary lever 124, an engaging claw 125, and a grip 126. The enclosure 122 is formed by bending a thick steel plate and is a cover that covers the rotation support plate 123, the rotary lever 124, and the engaging claw 125.

As shown in FIG. 6D, the rotation support plate 123 rotatably supports the rotary lever 124 and the engaging claw 125. The rotation support plate 123 is a plate-shaped portion whose plate surfaces are arranged facing left and right and extending in the vertical direction, and whose lengths in the fore-and-aft direction and in the vertical direction are longer than the length thereof in the machine width direction.

As shown in FIG. 6D, the rotary lever 124 is a pivotally operable member. The engaging claw 125 is a claw member whose plate surfaces are arranged facing left and right and whose vertically intermediate portion engages with the locked portion 120. The lower portion of the engaging claw 125 is connected to the rotary lever 124 by an elastic member 124a such as a spring. The upper portion of the engaging claw 125 is given a force to turn in a direction of the engagement (counterclockwise in the left side view) by an elastic member 125a such as a spring, and when the engaging claw 125 rotates downward, the engaging claw 125 engages with the locked portion 120. The engaging claw 125 can be turned upwardly by turning in a direction opposite to the engaging direction (clockwise in the left side view, in a releasing direction) in which the rotary lever 124 is operated, thereby releasing the engagement with the locked portion 120.

As shown in FIG. 6A, the grip 126 is a substantially gate-shaped member provided at an upper portion of the enclosure 122. The grip 126 extends upwardly from the upper portion of the enclosure 122 and is bent outwardly in the machine width direction, i.e., to the left, at an intermediate portion thereof. The only requirement of the locking mechanism 121 is to restrain the fuel cylinder 130 (installation part 106) from rolling about the first pivotal shaft 94. The locking mechanism 121 may employ any conventional technology.

Each of the pin assemblies 127 is configured to lock an object rotatable around the rotation axis by inserting a pin 127a into a hole, and to allow rotation of the object by removing the pin 127a from the hole. For example, the pin assemblies 127 are index plungers. Each of the pin assemblies 127 allows the pin 127a to be inserted and removed into and from a hole by operating a knob 127b provided on a basal end of the pin 127a. Specifically, in the pin assemblies 127, the pin 127a is thrust out by a built-in elastic member such as a spring, and the pin 127a is retracted by pulling the knob 127b. The plurality of pin assemblies 127 are respectively provided in the first locking hole 92b and the second locking hole 104b.

One of the pin assemblies 127 provided in the first locking hole 92b is configured to insert or remove the corresponding pin 127a into and from the first locking hole 97a formed in the upper pivotal supporting tab 97. In this manner, the corresponding pin assemblies 127 inserts the pin 127a into the first locking hole 97a, thereby restricting the fuel cylinder 130 (installation part 106) from rolling about the first pivotal shaft 94.

On the other hand, another of the pin assemblies 127 provided in the second locking hole 104b inserts or removes the pin 127a into or from the second locked hole 98b formed in the lower pivotal supporting tab 98. In this manner, the pin assembly 127 inserts the pin 127a into any one of the plurality of second locked holes 98b, thereby restricting the fuel cylinder 130 (installation part 106) from rolling about the second pivotal shaft 101. In other words, the fuel cylinder 130 is selectively positioned at one of different positions by selectively inserting the pin 127a of the pin assembly 127 into one of the second locked holes 98b.

As shown in FIGS. 7A to 9B, the support mechanism 90 can move the fuel cylinder 130 to a position different from the installation position K1 above the hood 40 by turning the installation part 106 around the first pivotal shaft 94 and around the second pivotal shaft 101. Specifically, the support mechanism 90 can be switched (moved) from the installation position K1 to either one of the retracting position K2 and a hanging position K3. The following describes the position of the fuel cylinder 130 when the support mechanism 90 is in the installation position K1, the retracting position K2, and the hanging position K3, and the switching between the installation position K1, the retracting position K2, and the hanging position K3.

Figure 7A:
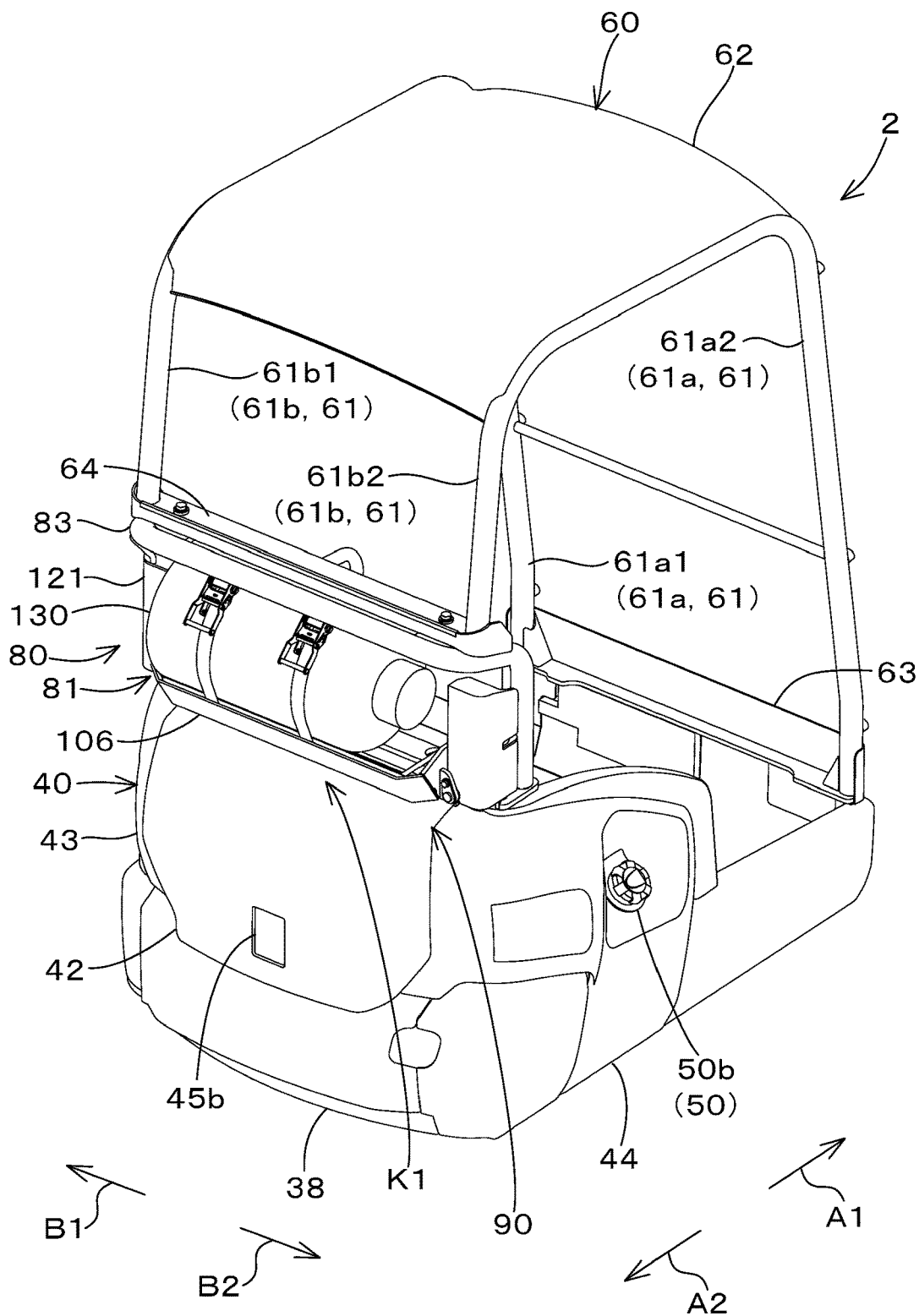
FIG. 7A is a right-rear perspective view showing the swivel base and the supporting mechanism when the supporting mechanism is at an installation position K1.
Figure 7B:
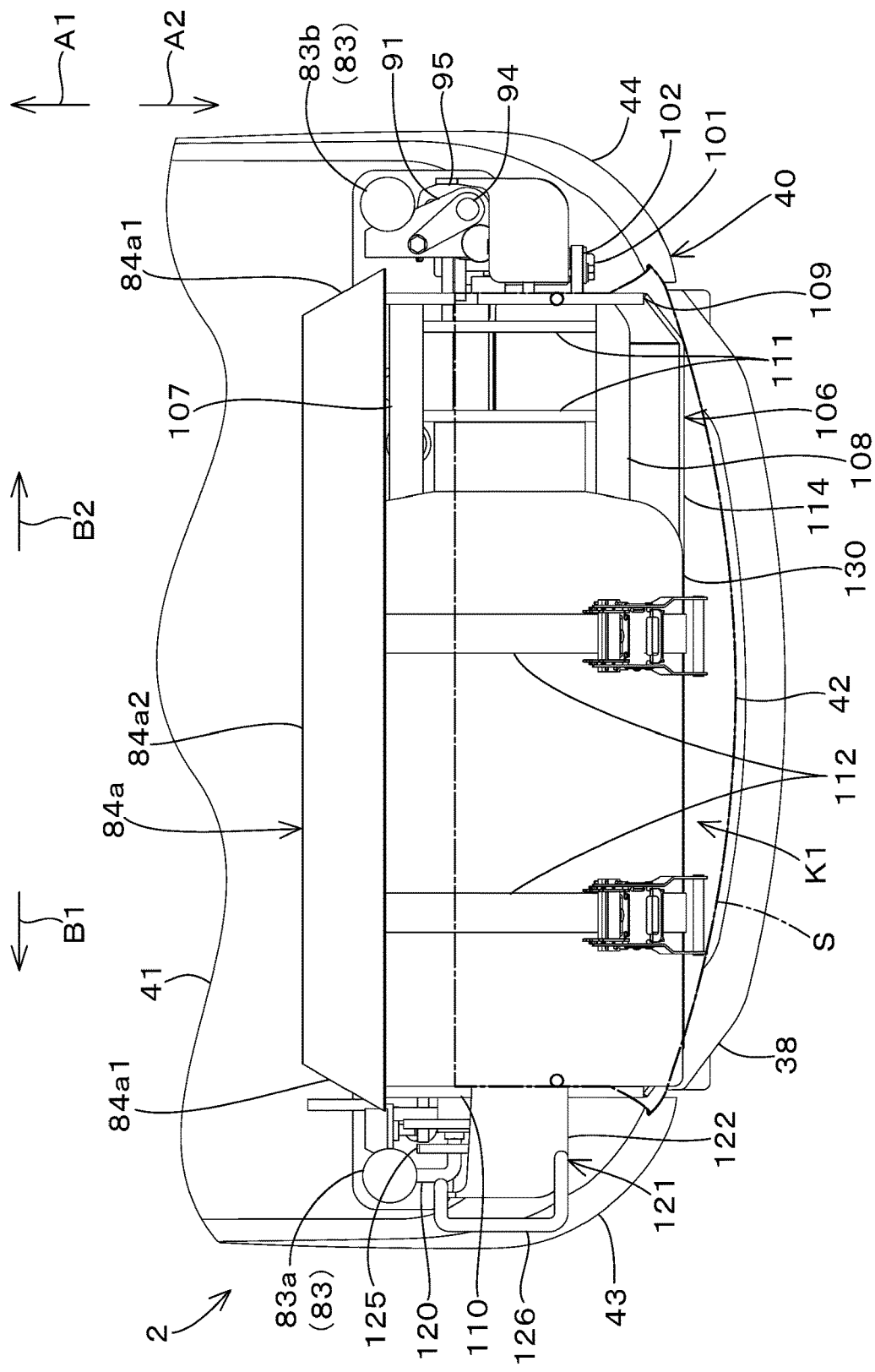
FIG. 7B is a plan view showing the hood and the supporting mechanism when the supporting mechanism is at the installation position K1.

As shown in FIGS. 7A and 7B, when the support mechanism 90 is in the installation position K1, the fuel cylinder 130 (installation part 106) is positioned above the hood 40 (rear hood 42), that is, the fuel cylinder 130 is housed in the accommodating portion 81. Accordingly, by arranging the fuel cylinder 130 above the hood 40, the space above the hood 40 can be effectively utilized. In addition, as shown in FIG. 15, the support mechanism 90 can support the fuel cylinder 130, at the installation position K1, inside a rotating locus C2 of the swivel base 2, and a rotating locus C1 of the fuel cylinder 130 around its rotational axial center is inside the rotating locus C2 of the swivel base 2. Accordingly, when the swivel base 2 swivels, the fuel cylinder 130 is within the swivel locus of the swivel base 2, and can be prevented from contacting surrounding obstacles. When the support mechanism 90 is in the installation position K1, the front of the fuel cylinder 130 is covered by the vertical member 84, and the upper portion of the fuel cylinder 130 is covered by the upper member 85. As shown in FIG. 7B, the fuel cylinder 130 is located in the movement range S of the hood 40 being opened and closed. When the support mechanism 90 is in the installation position K1, the installation part 106 restricts the opening operation of the hood 40. The support mechanism 90 can be switched from the installation position K1 to the retracting position K2. Moreover, as shown in FIG. 14, the fuel cylinder 130 is located in the fore-and-aft direction above the rear end of the crawler belt 16.

Figure 8B:
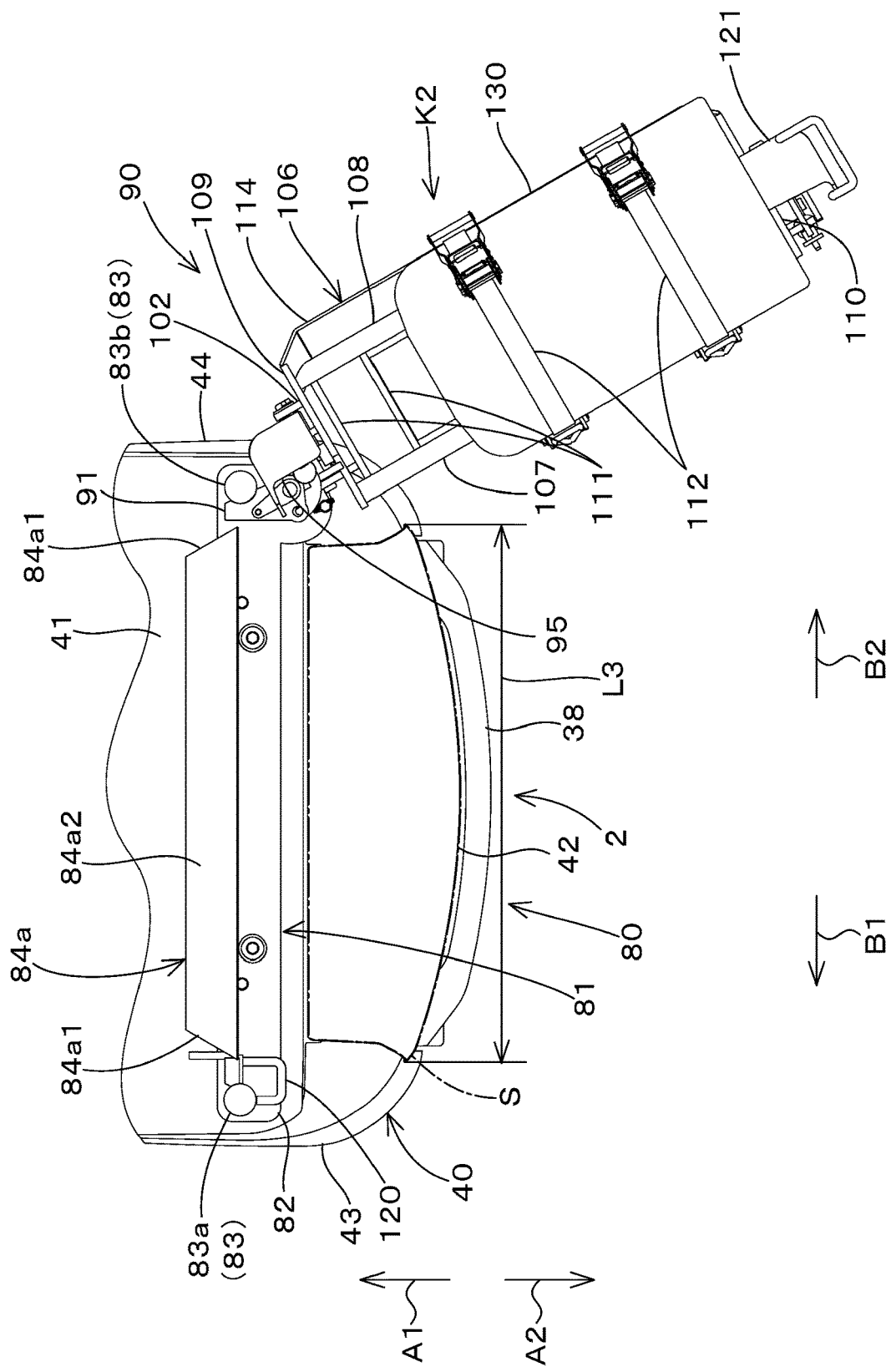
FIG. 8B is a plan view showing the hood and the supporting mechanism when the supporting mechanism is at the retracting position K2.

As shown in FIG. 8B, the retracted position K2 is a position to prevent an object thereat from interfering with the hood 40 (rear hood 42) moving to be opened or closed. Specifically, the retracting position K2 is a position where the fuel cylinder 130 is horizontally evacuated from the movement range S of the hood 40 being opened and closed, and the fuel cylinder 130 is retracted to the other side (the right side) in the machine width direction. That is, the support mechanism 90 retracts the fuel cylinder 130 from the installation position K1 to the retracting position K2 set on the same side as the side on which the refueling port 50b of the fuel tank 50 is located. In this case, the fuel cylinder 130 is supported by inclining backwardly to the right in plan view. This enables both effective use of the space above the hood 40 and convenience in opening and closing the hood 40. In addition, since the support mechanism 90 retracts the fuel cylinder 130 from the installation position K1 to the retracting position K2 set on the same side as the side on which the refueling port 50b of the fuel tank 50 is provided, the replacement of the fuel cylinder 130 and the refueling to the fuel tank 50 can be performed in succession. Accordingly, the work efficiency can be improved without need to swivel the swivel base 2 or the swiveling work machine 1 itself depending on the replacement work and the refueling work, or need for an operator to carry the filled fuel cylinder 130, a polyethylene tank containing the fuel, or the like. The support mechanism 90 is switched from the installation position K1 to the retracting position K2 by rotating the installation part 106 (first pivotal bracket 95) around the first pivotal shaft 94. The switching operation of the support mechanism 90 from the installation position K1 to the retracting position K2 will be described below.

When the operator pulls the rotary lever 124, the engaging claw 125 is disengaged from the locked portion 120. When the engaging claw 125 is disengaged from the locked portion 120, an operator holding the grip 126 pulls the grip 126 backward around the first pivotal shaft 94 to rotate the first pivotal bracket 95 around the first pivotal shaft 94, as shown in FIGS. 8A and 8B. In the first pivotal bracket 95, a lower end of the lower pivotal supporting tab 98 slides on an upper surface of the lower pivotal support 93, and the fuel cylinder 130 (installation part 106) rotates in the horizontal direction (backward).

When the first pivotal bracket 95 rotates around the first pivotal shaft 94, one of the corresponding pin assemblies 127 inserts its pin 127a into the first locking hole 97a so as to restrict the first pivotal bracket 95 from rotating around the first pivotal shaft 94. While the pin assembly 127 restricts the first pivotal bracket 95 from rotating around the first pivotal shaft 94, the installation part 106 is rotated downward around the second pivotal shaft 101, and a lower end of the second pivotal bracket 102 (second connecting plate 104) is engaged into the notch 93b of the lower pivotal supporting portion 93. Specifically, a lower end of the second connecting plate 104 is fitted to the first end face 93b1. This prevents the installation part 106 from rotating to release the fuel cylinder 130 from the installation part 106 when the fuel cylinder 130 is removed or installed from and into the installation part 106.

When the lower end of the second connecting plate 104 engages with the notch 93b of the lower pivotal portion 93, the pin assemblies 127 insert the pins 127a into the second locked holes 98b with the engagement, and the pin assemblies 127 and the notch 93b regulate the rotation of the installation part 106 around the second pivotal shaft 101. In this manner, one of the pin assemblies 127 and the notch 93b regulate the rotation of the first pivotal bracket 95 around the first pivotal shaft 94, and one of the pin assemblies 127 regulates the rotation of the installation part 106 around the second pivotal shaft 101, and the support mechanism 90 is switched to the retracted position K2.

As shown in FIG. 8B, when the support mechanism 90 is in the retracting position K2, the space (the space above the rear hood 42) defined when the support mechanism 90 is in the installation position K1 is opened. That is, an area longer than the length L3 of the rear hood 42 in the machine width direction is opened, and when the support mechanism 90 is in the retracted position K2, a part of the rear hood 42 can enter the area, so that the rear hood 42 can be widely opened.

The switching operation from the retracting position K2 to the installation position K1 is performed in the reverse of the above-described procedure. That is, the operator pulls the knob 127b of the pin assembly 127, removes one of the pins 127a from the second locked hole 98b to release the restriction on the rotation of the installation part 106 around the second pivotal shaft 101, and then grasps the grip 126 to rotate the installation part 106 upward. By rotating the installation part 106 upward, the engagement between the second connecting plate 104 and the notch 93b is released. With the engagement between the second connecting plate 104 and the notch 93b released, the operator pulls the knob 127b of the pin assembly 127, removes the pin 127a from the first locking hole 97a to release the restriction on the rotation of the first pivotal bracket 95 around the first pivotal shaft 94. Then, the operator rotates the installation part 106 in the horizontal direction (forward) around the first pivotal shaft 94. When the operator rotates the installation part 106 forward around the first pivotal shaft 94, the engaging claw 125 engages with the locked portion 120, and the support mechanism 90 moves to the installation position K1.

Figure 9B:
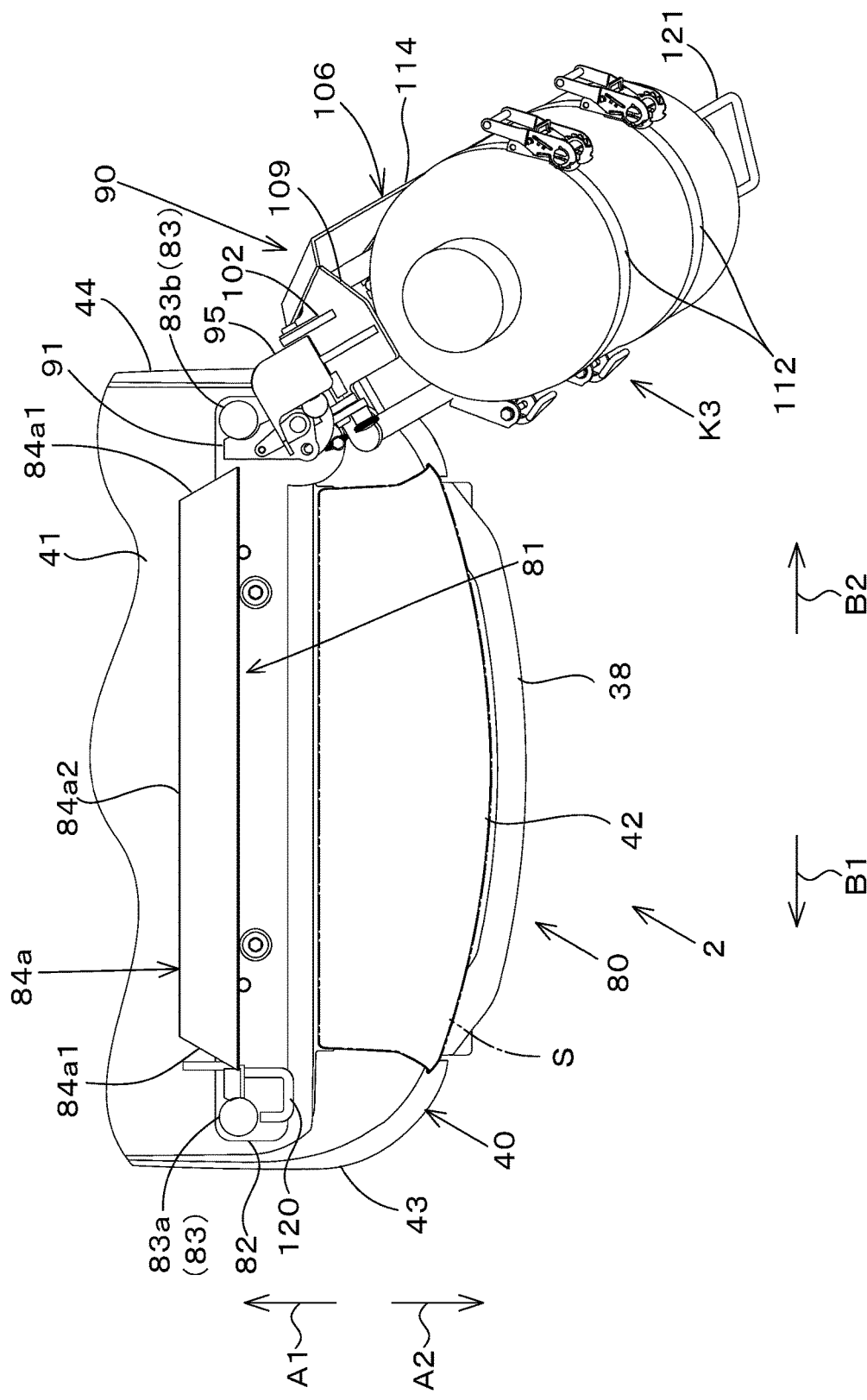
FIG. 9B is a plan view showing the hood and the supporting mechanism when the supporting mechanism is at the hanging position K3.

The support mechanism 90 is shiftable from the retracted position K2 to the hanging position K3. As shown in FIGS. 9A and 9B, the hanging position K3 is a position in which the fuel cylinder 130 (installation part 106) is positioned lower than the retracted position K2 and the installation part 106 is hung. Thus, the support mechanism 90 can hang the installation part 106 to a position lower than the upper portion of the hood 40. When the support mechanism 90 is in the hanging position K3, the fuel cylinder 130 installed in the installation part 106 is inclined downward from its front end to its rear end. In other words, the lower portion of the fuel cylinder 130 is located distally from the upper portion thereof. This allows the operator to easily detach the fuel cylinder 130 from the installation part 106 because the installation part 106 in which the fuel cylinder 130 is installed is positioned lower than the hood 40. In addition, the operator can easily install another fuel cylinder 130 filled with the second fuel in the installation part 106. Moreover, when the support mechanism 90 is switched to the hanging position K3, the inclined fuel cylinder 130 can be raised from the installation part 106 and then the fuel cylinder 130 can be easily detached.

The switching of the support mechanism 90 from the retracting position K2 to the hanging position K3 is performed by rotating the fuel cylinder 130 downwardly from the retracting position K2 around the second pivotal shaft 101. The switching operation of the support mechanism 90 from the retracting position K2 to the hanging position K3 will be described below.

When the operator pulls the knob 127b of the pin assembly 127, the pin 127a is removed from the second locked hole 98b, and the restriction of the rotation of the installation part 106 around the second pivotal shaft 101 is released. With the pin 127a removed from the second locked hole 98b, the operator grasps the grip 126 and moves the installation part 106 downward to rotate the installation part 106 downward around the second pivotal shaft 101. When the installation part 106 is rotated around the second pivotal shaft 101, the gas dampers 115 contract, and the second pivotal bracket 102 (installation part 106) rotates relatively gently around the second pivotal shaft 101. When the installation part 106 is rotated downward around the second pivotal shaft 101, the lower end of the second connecting plate 104 engages with the second end surface 93b2 of the notch 93b, and the pin 127a of the corresponding pin assembly 127 is inserted into the second locked hole 98b, thereby restricting the installation part 106 from rotating around the second pivotal shaft 101, and the support mechanism 90 is moved to the hanging position K3.

The shift from the hanging position K3 to the retracting position K2 is performed by operation processes in order reverse to the above-described processes. That is, an operator pulls the knobs 127b of the pin assemblies 127, removes the pin 127a from the second locked hole 98b to release the restriction on the rotation of the installation part 106 around the second pivotal shaft 101, and grasps the grip 126 to rotate the installation part 106 upward around the second pivotal shaft 101. When the installation part 106 is rotated upward, the gas dampers 115 are extended and the installation part 106 rotates upward around the second pivotal shaft 101 relatively gently. When the installation part 106 is rotated upward around the second pivotal shaft 101, the pin 127a of the pin assembly 127 is inserted into the second locked hole 98b, thereby restricting the rotation of the installation part 106 around the second pivotal shaft 101, and the support mechanism 90 is switched to the retracted position K2.

The prime mover 4 is a bi-fuel engine (multi-fuel engine) that is driven by selectively using either the first fuel or the second fuel, and the swiveling work machine 1 can exchange the fuel for driving the prime mover 4 between the first fuel and the second fuel. Accordingly, in general, in an environment where the temperature is relatively low, such as in winter or extremely cold regions, the startability of the prime mover 4 can be secured by using gasoline to start the prime mover 4, although the startability of the prime mover 4 by using the second fuel, such as liquefied petroleum gas, is lower than that of the first fuel, such as gasoline. In addition, the fuel can be selected between the first fuel and the second fuel according to the remaining amounts of fuel in the fuel tank 50 and the fuel cylinder 130.

Figure 10:
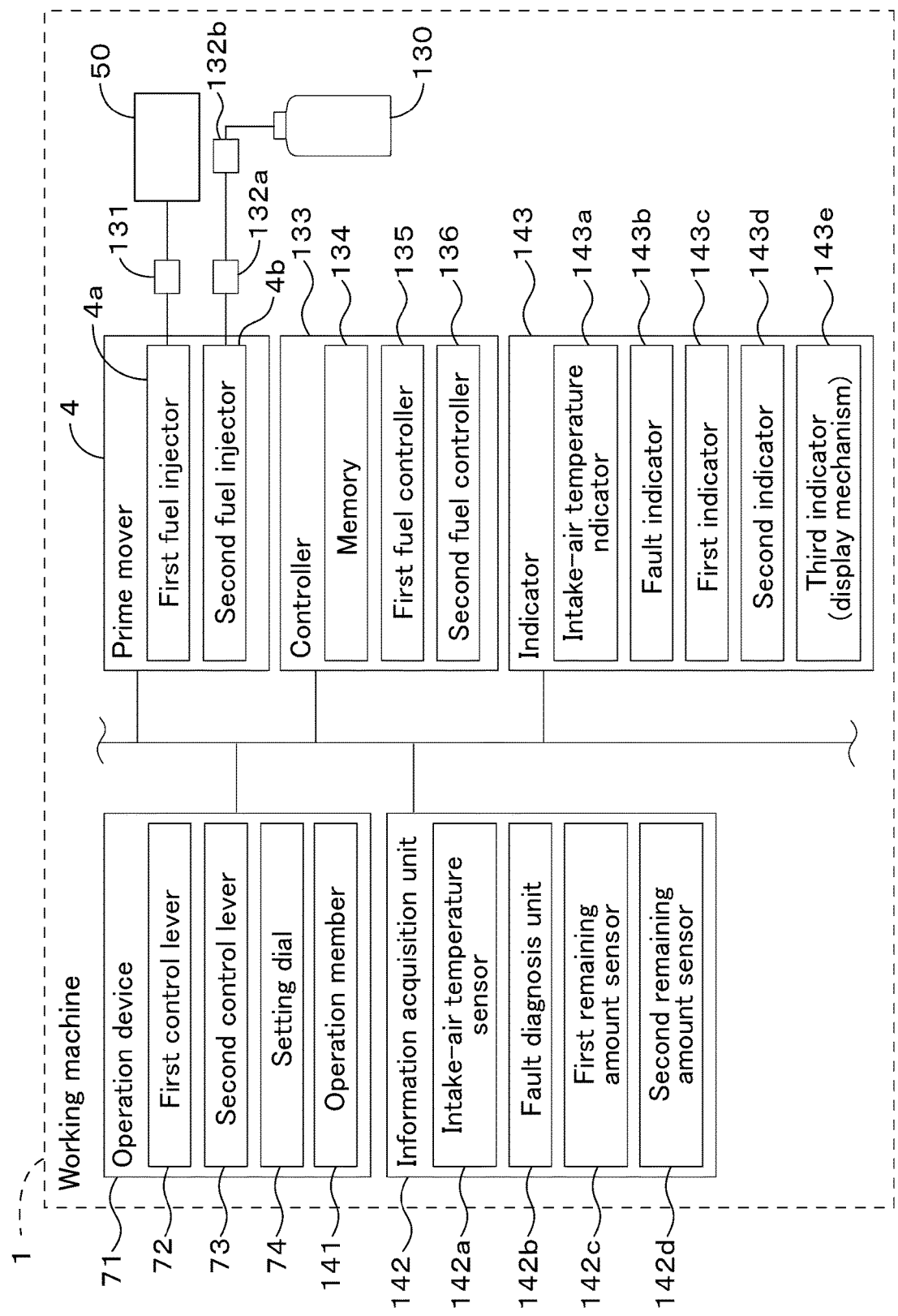
FIG. 10 is a schematic diagram showing a system of a swiveling working mechanism.

As shown in FIG. 10, the prime mover 4 mounted on the swiveling work machine 1 has a first fuel injector 4a that injects the first fuel into cylinders (not shown in the drawings) of the prime mover 4, and a second fuel injector 4b that injects the second fuel into the cylinders. In addition, the swiveling work machine 1 is provided with a fuel pump 131 and a control valve 132a. The first fuel injector 4a is connected to the fuel tank 50 via the fuel pump 131.

As shown in FIG. 10, the fuel pump 131 connects the first fuel injector 4a to the fuel tank 50 and supplies, to the first fuel injector 4a, the first fuel in the fuel tank 50. For example, the fuel pump 131 has a driving unit, such as an electric motor, which supplies the first fuel stored in the fuel tank 50 to the first fuel injector 4a when it is driven.

As shown in FIG. 10, the control valve 132a connects the second fuel injector 4b to the fuel cylinder 130 and supplies the second fuel in the fuel cylinder 130 to the second fuel injector 4b. The control valve 132a is capable of changing an opening degree and adjusting an amount of the second fuel supplied from the fuel cylinder 130 to the second fuel injector 4b. When the second fuel in the fuel cylinder 130 is liquefied by compressing the second fuel, that is, when natural gas is compressed and stored in the fuel cylinder 130 as liquefied natural gas, or when petroleum gas is compressed and stored in the fuel cylinder 130 as liquefied petroleum gas, the swiveling work machine 1 includes a vaporizer to transfer in phase the second fuel to gas. The vaporizer is provided between the control valve 132a and the second fuel injector 4b. The vaporizer vaporizes the liquefied second fuel under reduced pressure, and supplies the vaporized second fuel to the second fuel injector 4b.

The swiveling work machine 1 may be provided with a reserve fuel cylinder 132b that supplies the fuel to the prime mover 4 when the remaining amount of fuel in the fuel cylinder 130 falls below a predetermined amount. The reserve fuel cylinder 132b is, for example, a reserve tank that stores the second fuel between the fuel cylinder 130 and the control valve 132a. The reserve fuel cylinder 132b stores the second fuel supplied from the fuel cylinder 130, and supplies the stored second fuel to the control valve 132a. That is, when the second fuel in the fuel cylinder 130 becomes empty, the swiveling work machine 1 continues to be driven using the second fuel in the reserve fuel cylinder 132b. When the swiveling work machine 1 is provided with the reserve fuel cylinder 132b, the reserve fuel cylinder 132b is housed in the accommodating portion 81 and is attached, for example, to a back surface of the vertical member 84. This allows the swiveling work machine 1 to continue working without immediately stopping the work even when the remaining fuel in the fuel cylinder 130 becomes low.

As shown in FIG. 10, the swiveling work machine 1 is provided with a fuel changer 133. The fuel changer 133 is constituted of, for example, a CPU or electronic circuits, and controls changing of the fuel to be supplied to the prime mover 4 to either the first fuel or the second fuel. In this embodiment, the fuel changer 133 controls the exchanging of the fuel to be supplied to the prime mover 4 between the first fuel and the second fuel under an electrical and/or electronic control. However, the only requirement of the fuel changer 133 is exchangeability of fuel to be supplied to the prime mover 4. The fuel changer 133 is not limited to the above-described configuration, as the fuel changer 133 may be configured to mechanically exchange the fuel supplied to the prime mover 4.

The fuel changer 133 has a memory 134, a first fuel controller 135, and a second fuel controller 136. The memory 134 is a non-volatile memory or the like, and stores various information. For example, the memory 134 stores computer programs (application software).

The first fuel controller 135 includes a CPU or the like and is configured to perform various controls relating to the supply of the first fuel to the prime mover 4. The first fuel controller 135 is connected to the first fuel injector 4a and the fuel pump 131, and is capable of controlling the first fuel injector 4a and the fuel pump 131 based on the operation of the operation device 71 and the information stored in the memory 134.

The second fuel controller 136 includes a CPU or the like and performs various controls relating to the supply of the second fuel to the prime mover 4. The second fuel controller 136 is connected to the second fuel injector 4b and the control valve 132a, and is capable of controlling the second fuel injector 4b and the control valve 132a based on the operation of the operation device 71 and the information stored in the memory 134.

As shown in FIG. 10, the operation device 71 includes an operation member 141. In other words, the swiveling work machine 1 is provided with the operation member 141, which is a changeover switch for changing the fuel to be supplied to the prime mover 4 and can be operated, for example, to a first position and a second position. An operation signal of the operation member 141 is input to the fuel changer 133, and the fuel changer 133 controls the changing of the fuel to be supplied to the prime mover 4 to either the first fuel or the second fuel based on the operation signal. Specifically, when the operation member 141 is set at the first position, the first fuel controller 135 of the fuel changer 133 controls the first fuel injector 4a and the fuel pump 131 to supply the first fuel to the prime mover 4. On the other hand, when the operation member 141 is set at the second position, the second fuel controller 136 of the fuel changer 133 controls the second fuel injector 4b and the control valve 132a to supply the second fuel to the prime mover 4. This allows the prime mover 4 to be driven using the exchanged fuel when the remaining amount of fuel in one of the fuel tank 50 and the fuel cylinder 130 is low, so that work can be continued. In addition, an operator can easily change the fuel to drive the prime mover 4 according to the work scene, environment, or the like.

As shown in FIG. 10, the swiveling work machine 1 is provided with an information acquisition unit 142 that acquires information of the swiveling work machine 1, and a plurality of indicators 143 that indicate the information acquired by the information acquisition unit 142. The information acquisition unit 142 uses various signals (detection signals, switching signals, command signals, and the like) to detect information such as faults or abnormalities of electrical/electric components, faults or abnormalities of the work device 20, and the remaining amount of the fuel tank 50 and the fuel cylinder 130. The information acquisition unit 142 includes an intake-air temperature sensor 142a that detects a intake air temperature, a fault diagnosis unit 142b that diagnoses faults and abnormalities of the electrical components, a first remaining amount sensor 142c that detects a remaining amount of the first fuel contained in the fuel tank 50, and a second remaining amount sensor 142d that detects a remaining amount of the second fuel contained in the fuel cylinder 130.

The intake air temperature sensor 142a is, for example, a thermistor attached to the intake manifold of the prime mover 4. The fault diagnosis unit 142b diagnoses faults or abnormalities in electrical components, for example, based on the operating status of the electrical components and the work device 20.

The first remaining amount sensor 142c is, for example, a potentiometer that detects the vertical movement of a float provided in the fuel tank 50.

The second remaining amount sensor 142d is, for example, a pressure sensor that detects the pressure of the second fuel to be supplied from the fuel cylinder 130, and is provided between the fuel cylinder 130 and the control valve 132a. When the swiveling work machine 1 is provided with a reserve fuel cylinder 132b, the second remaining amount sensor 142d may be provided between the fuel cylinder 130 and the control valve 132a, may be provided in the reserve fuel cylinder 132b to detect the pressure of the second fuel in the reserve fuel cylinder 132b, or respective second remaining amount sensors 142d may be provided at both of the positions. When the second remaining amount sensor 142d is provided between the fuel cylinder 130 and the control valve 132a, the second remaining amount sensor 142d detects the pressure of the second fuel to be supplied from the fuel cylinder 130, that is, the remaining amount of the second fuel inside the fuel cylinder 130. On the other hand, when the second remaining amount sensor 142d is provided in the reserve fuel cylinder 132b, the second remaining amount sensor 142d detects the pressure of the second fuel to be supplied from the reserve fuel cylinder 132b, that is, the remaining amount of the second fuel inside the reserve fuel cylinder 132b.

The information acquisition unit 142 outputs information on the remaining amount of fuel, malfunctions or abnormalities of the electrical components, and malfunctions or abnormalities of the work device 20 as signals to the fuel changer 133.

As shown in FIG. 10, the plurality of indicators 143 are operably connected to the fuel changer 133, and change a display form based on the signal output from the fuel changer 133 to inform the operator of malfunctions or abnormalities. The plurality of indicators 143 are, for example, lamps whose display forms can be changed by switching between lighting and distinguishing. In this embodiment, the plurality of indicators 143 are lamps, but they may be display devices (monitors) that change the display image based on the input signal, and the display method is not limited to the above-mentioned configuration.

The plurality of indicators 143 includes an intake-air temperature indicator 143a, a fault indicator 143b, a first indicator 143c, a second indicator 143d, and a third indicator (display mechanism) 143e. The intake-air temperature indicator 143a turns on when the intake air temperature is equal to or higher than a predetermined value, and turns off when the intake air temperature is below the predetermined value.

The fault indicator 143b is an indicator 143 configured to indicate a fault or abnormality of an electrical component, a fault or abnormality of the work device 20, and/or the like. The fault indicator 143b lights up when the fault diagnosis unit 142b diagnoses that there is a fault or abnormality of an electrical component, a fault or abnormality of the work device 20, and/or the like, and turns off when the fault diagnosis unit 142b diagnoses that there is no fault or abnormality of an electrical component, a fault or abnormality of the work device 20, and/or the like.

The first indicator 143c is an indicator 143 configured to indicate a remaining amount of the first fuel, and lights up when the remaining amount of the first fuel is less than a predetermined value, and turns off when the remaining amount of the first fuel is equal to the predetermined value or more.

The second indicator 143d is an indicator 143 of the remaining amount of the second fuel, and is lit when the remaining amount of the second fuel is less than a predetermined value, and is turned off when the remaining amount of the second fuel is equal to the predetermined value or more. That is, when the second remaining amount sensor 142d is provided between the fuel cylinder 130 and the control valve 132a, the second indicator 143d indicates the remaining amount of the second fuel inside the fuel cylinder 130.

When the swiveling work machine 1 is provided with the reserve fuel cylinder 132b and the second remaining amount sensor 142d is provided between the fuel cylinder 130 and the control valve 132a, the second indicator 143d indicates the remaining amount of the second fuel inside the fuel cylinder 130. Thus, when the second indicator 143d is lit, it can be recognized that the swiveling work machine 1 is being driven by the second fuel from the reserve fuel cylinder 132b.

Moreover, when the swiveling work machine 1 is provided with the reserve fuel cylinder 132b and the second remaining amount sensor 142d is provided between the reserve fuel cylinder 132b and the control valve 132a, the second indicator 143d indicates the remaining amount of the second fuel inside the reserve fuel cylinder 132b. Thus, when the second indicator 143d is lit, it is possible to recognize that the swiveling work machine 1 is driven by the second fuel in the reserve fuel cylinder 132b and/or recognize the remaining amount of the second fuel in the reserve fuel cylinder 132b.

The third indicator 143e is an indicator 143 that indicates whether the fuel being supplied to the prime mover 4 is the first fuel or the second fuel. The third indicator 143e is turned off when the first fuel is being supplied to the prime mover 4, and is turned on when the second fuel is being supplied to the prime mover 4. In other words, the third indicator 143e is turned off when the operation member 141 is set at the first position and is turned on when the operation member 141 is set at the second position.

Figure 11:
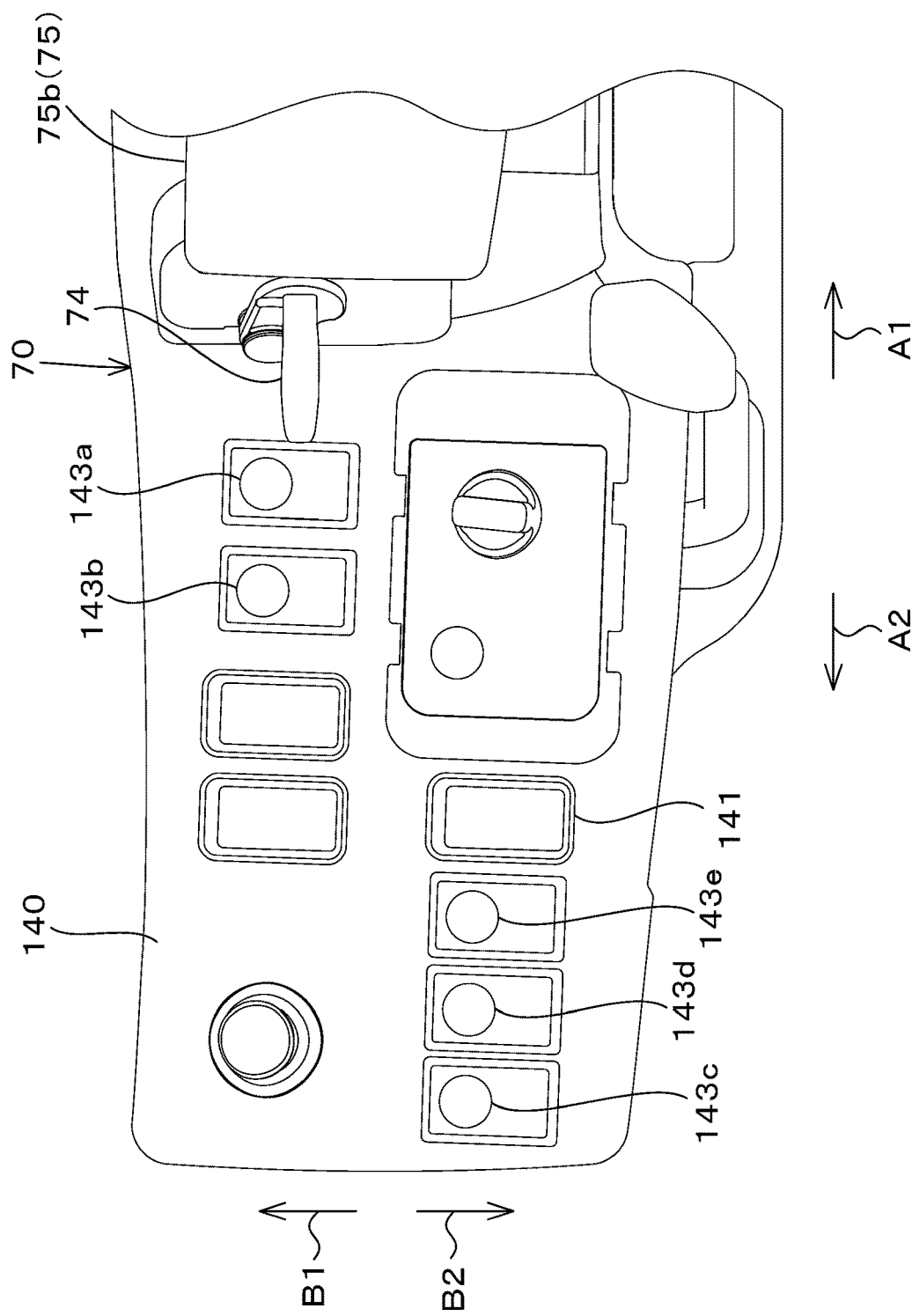
FIG. 11 is a plan view showing an operation tool and a plurality of indicators.

As shown in FIG. 11, the operation member 141 and the plurality of indicators 143 are provided on the same directional-side portion of the swivel base 2 with the refueling port 50b relative to the swivel center of the swivel base 2, and are located on the side portion of the operator seat 8 and behind the armrest 75. This allows the operator to operate the operation member 141 immediately after checking the fuel tank 50 and supplying the first fuel to the fuel tank 50. Accordingly, the convenience of operating the operation member 141 can be improved. In addition, the operator can continuously perform the works of replacing the fuel cylinder 130 and refueling the fuel tank 50 while checking the first indicator 143c and the second indicator 143d, thus enabling the operator to easily recognize the completion of the replacement work and the refueling work.

Specifically, the operation member 141 and the plurality of indicators 143 are extended rearwardly from the upper rear portion of the console box 70 and are provided in an operating portion 140 behind the armrest 75. Accordingly, when an operator seated on the operator seat 8 turns to the right, the worker can operate the operation members 141. In this way, the operation members 141 are disposed at a position convenient for an operator sitting on the operator seat 8. On the other hand, when the operator seated on the operator seat 8 is performing the operation with his elbow resting on the armrest 75, the operation member 141 is at a different height from the operator's arm and does not contact or interfere with the arm, thereby preventing the operator from incorrectly operating the operation member 141. Accordingly, the operator can be prevented from unintentionally changing the fuel to drive the prime mover 4.

The intake-air temperature indicator 143a and the fault indicator 143b are provided on one side (the left side) of the operating portion 140 in the machine width direction, and the intake-air temperature indicator 143a and the fault indicator 143b are arranged in this order from the front portion. The operation member 141, the first indicator 143c, the second indicator 143d, and the third indicator 143e are provided on the other side (the right side) of the operating section 140 in the machine width direction. In addition, the operation member 141, the first indicator 143c, the second indicator 143d, and the third indicator 143e are arranged in the order of the operation member 141, the third indicator 143e, the second indicator 143d, and the first indicator 143c from the front portion.

Figure 12A:
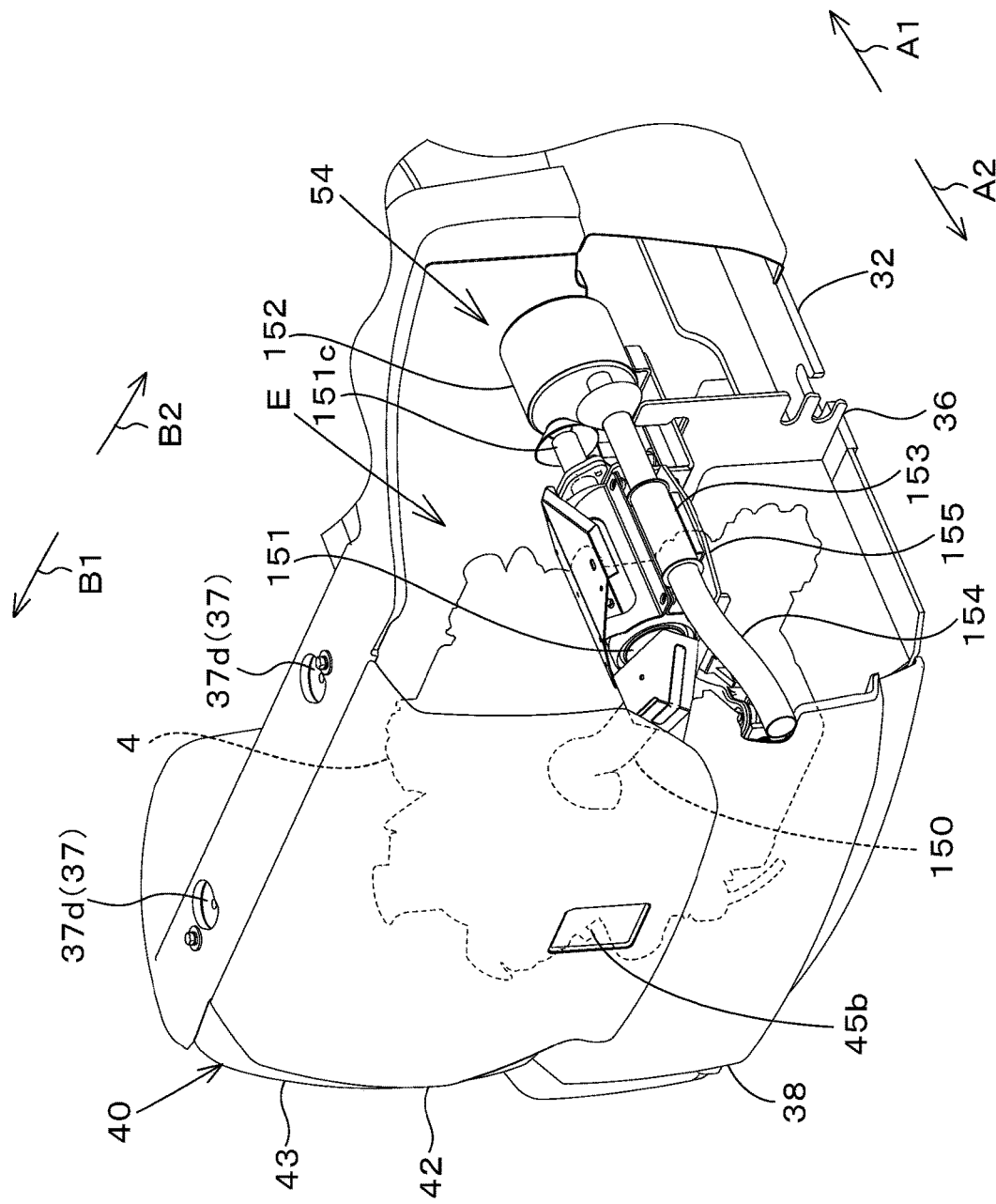
FIG. 12A is a right-rear perspective view showing an exhaust structure.

The exhaust structure 54 of the swiveling work machine 1 will be described in detail below. As shown in FIG. 12A, the exhaust structure 54 is arranged in the engine compartment E inside the hood 40, is connected to the exhaust manifold of the prime mover 4, makes the exhaust gas discharged from the exhaust manifold pass therethrough, and discharges the exhaust gas to the outside. The exhaust structure 54 of the swiveling work machine 1 includes a plurality of mufflers, and by making the exhaust gas exhausted by the prime mover 4 pass through the plurality of mufflers, the temperature and noise of the exhaust gas are reduced, and harmful substances are removed, thereby discharging the exhaust gas to the outside. Specifically, the exhaust structure 54 of the swiveling work machine 1 has an exhaust pipe 150, a first muffler 151, a first exhaust pipe (exhaust pipe) 151c, a second muffler 152, a second receiving portion 153b, a second exhaust pipe 153a, a third muffler 153, and a tail pipe 154.

As shown in FIG. 12A, the exhaust pipe 150 is a hollow tube and is connected to the exhaust manifold of the prime mover 4, and the exhaust gas is discharged by the prime mover 4 passes through the exhaust pipe 150. In this embodiment, the exhaust pipe 150 extends upward from the exhaust manifold, bends at an intermediate portion thereof, and then extends forward.

Figure 12B:
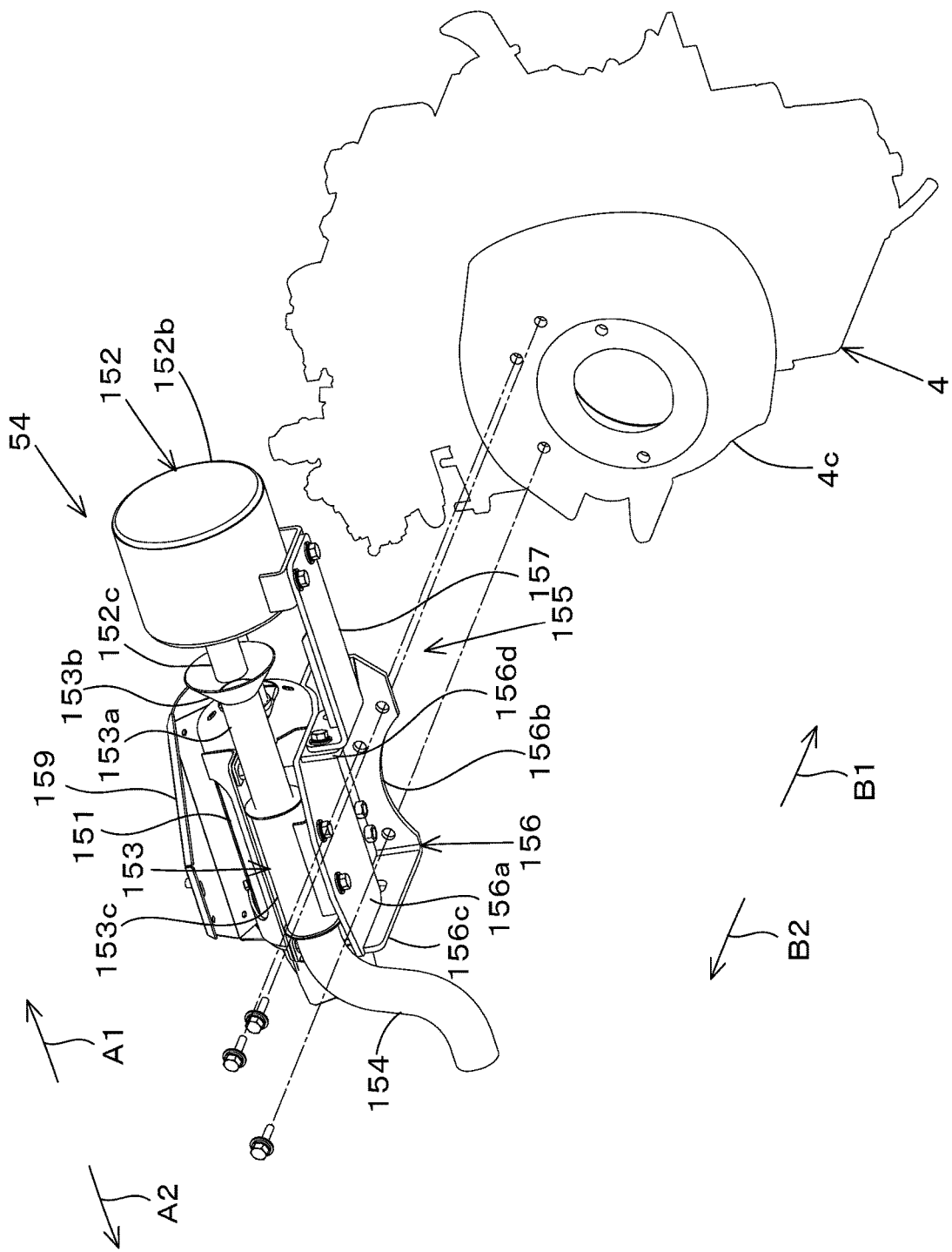
FIG. 12B is a right-front perspective view showing attachment of the exhaust structure.
Figure 12C:
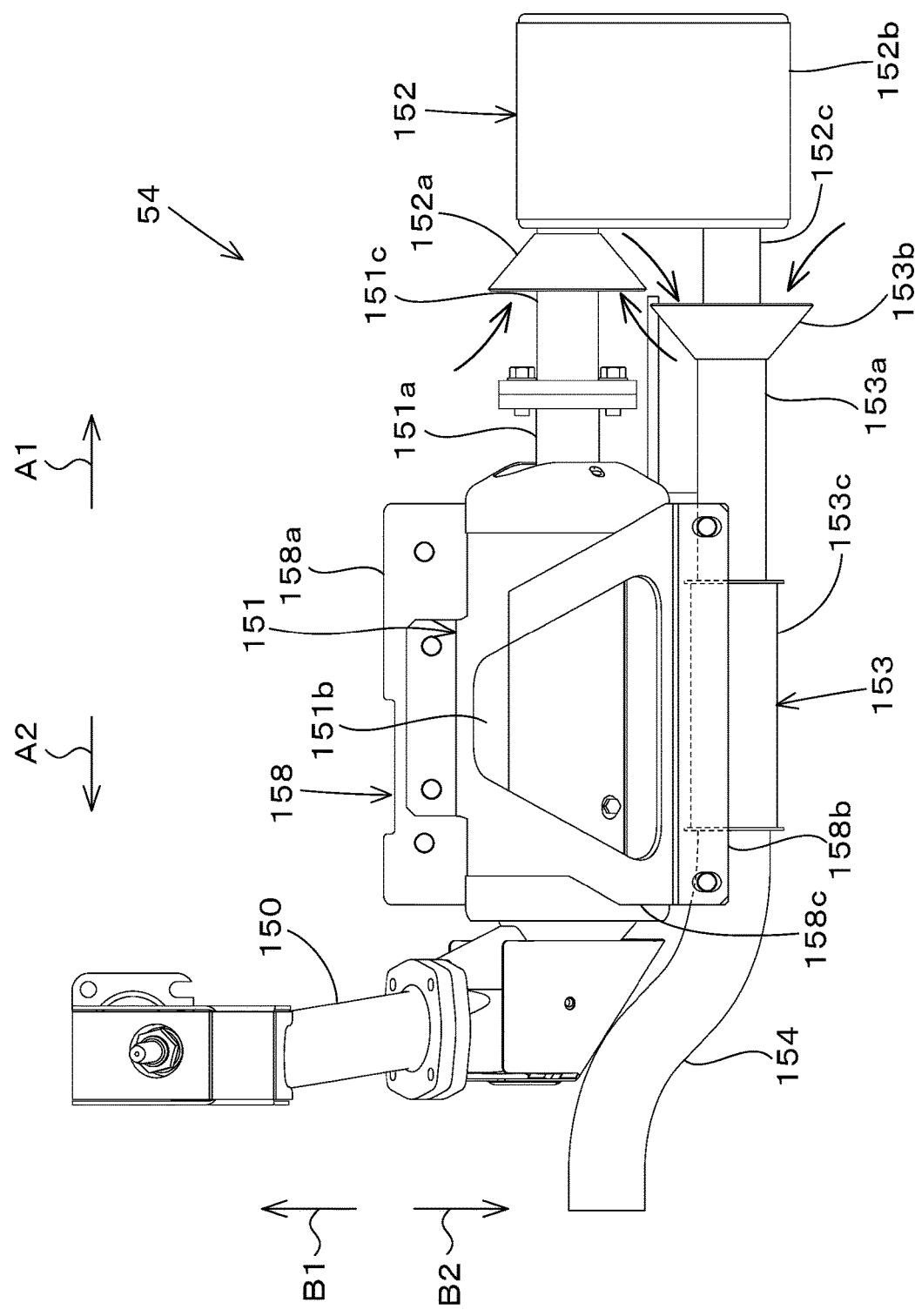
FIG. 12C is a plan view of the exhaust structure.

As shown in FIGS. 12A, 12C, and 12E, the first muffler 151 is connected to a portion between the prime mover 4 and the first exhaust pipe 151c. The first muffler 151 is connected at its first-side (rear) end thereof to the second-side (front) end of the exhaust pipe 150 and extends to the second-side end thereof. The first muffler 151 has an exhaust line 151a and a first muffler body 151b. The exhaust line 151a is a hollow cylindrical part, and extends from the other end thereof toward the first end. The exhaust path 151a has a first-side end connected to the inside of the exhaust pipe 150, i.e., connected to the prime mover 4 via the exhaust pipe 150, and allows exhaust gas discharged by the prime mover 4 to flow toward its second-side end. As shown in FIG. 12E, a plurality of connecting holes 151a1 are formed on the circumference of the first-side end of the exhaust line 151a to open the inside of the exhaust line 151a to the outside. In addition, a diametrically protruding flange is formed on the outer circumference of the second-side end of the exhaust line 151a. In this embodiment, the exhaust line 151a is connected to the prime mover 4 via the exhaust pipe 150. However, it is sufficient if the exhaust line 151a is connected to the prime mover 4 to allow the exhaust gas discharged by the prime mover 4 to flow toward the second-side end. Accordingly, the exhaust line 151a may be connected directly to the exhaust manifold of the prime mover 4 and may be connected to the exhaust manifold via a component other than the exhaust pipe 150.

As shown in FIG. 12E, the first muffler body 151b covers the outside of the exhaust line 151a and forms a double pipe with the exhaust line 151a. That is, the first muffler 151 forms a double pipe structure. The first muffler body 151b is arranged to cover the multiple connecting holes 151a1 formed in the exhaust line 151a. The space between the first muffler body 151b and the exhaust line 151a may be filled with a sound deadening material such as glass wool, and the structure of the first muffler 151 is not limited to the above-mentioned configuration, as conventional technique can be employed. The first muffler 151 may be integrally formed with the three-way catalytic converter (three-way catalytic converter). In other words, the first muffler 151 may have both a three-way catalytic converter function and a sound deadening function.

The first exhaust pipe (exhaust pipe) 151c allows the exhaust gas from the prime mover 4 to flow therein. Specifically, as shown in FIGS. 12A, 12C, and 12E, the first exhaust pipe 151c has a first-side (rear) end connected to the second-side (front) end of the first muffler 151 (exhaust line 151a) and extends to its second-side end. A diametrically protruding flange is formed on the outer circumference of the first-side end portion of the first exhaust pipe 151c, and is fastened to the flange of the exhaust line 151a by a fastening member such as a bolt. In this embodiment, the first exhaust pipe 151c is connected to the exhaust line 151a. However, it is sufficient if the first exhaust pipe 151c can allow the exhaust gas discharged by the prime mover 4 to flow therein. The first exhaust pipe 151c may be connected directly to the exhaust manifold of the prime mover 4, or may be connected to the exhaust manifold through a member other than the exhaust pipe 150.

As shown in FIGS. 12A, 12C, and 12E, the second muffler 152 has a first-side (rear) end connected to the second-side (front) end of the first exhaust pipe 151c, and is arranged on the second side of the first exhaust pipe 151c. The second muffler 152 has a first receiving portion 152a, a second muffler body (muffler main portion) 152b, and an exhaust pipe (exhaust portion) 152c. The first receiving portion 152a receives the exhaust gas discharged from the first exhaust pipe 151c. The first receiving portion 152a is provided at the first-side (rear) end portion of the muffler main portion 152b, and is connected to the inside of the muffler main portion 152b. The first receiving portion 152a has an expanded pipe structure in which the diameter expands as extending from the muffler main portion 152b side to the upstream side of the exhaust gas flowing through the first exhaust pipe 151c. That is, the first receiving portion 152a is a tapered section with a larger inner diameter on the upstream portion (first-side end) than on the downstream portion (second-side end). The inner diameter of the first receiving portion 152a in the upstream portion is at least larger than the outer diameter of the second-side end of the first exhaust pipe 151c.

As shown in FIG. 12E, the first receiving portion 152a forms a double-pipe structure by which the end portion of the first exhaust pipe 151c is inserted therein. Specifically, the second-side end of the first exhaust pipe 151c is inserted into the upstream portion of the first receiving portion 152a. The first receiving portion 152a overlaps the first exhaust pipe 151c in the exhaust direction. Specifically, the first-side (rear) end portion of the first receiving portion 152a overlaps with the second-side (front) end portion of the first exhaust pipe 151c.

As shown in FIG. 12E, the first receiving portion 152a introduces the exhaust gas discharged from the first exhaust pipe 151c and the outside air into the muffler main portion 152b. Specifically, a first introducing line 152b1 is formed between the first receiving portion 152a and the first exhaust pipe 151c to introduce the outside air into the exhaust pipe 152c. The first introducing line 152b1 is a clearance formed between the inner surface of the first receiving portion 152a and the outer surface of the first exhaust pipe 151c. The exhaust gas passing from the first exhaust pipe 151c to the first receiving portion 152a causes the air outside the first receiving portion 152a to pass through the first introducing line 152b1, and the air outside the first receiving portion 152a is introduced into the inside of the first receiving portion 152a through the first introducing line 152b1. In this manner, exhaust gas temperature and noise can be reduced efficiently with a simple configuration.

The muffler main portion 152b makes the exhaust gas received from the first receiving portion 152a flow therein. Specifically, as shown in FIG. 12E, the muffler main portion 152b has a hollow cylindrical shape extending from its first-side (rear) end to its second-side (front) end, and connects the first receiving portion 152a to the exhaust pipe 152c. That is, the muffler main portion 152b passes the exhaust gas received from the first receiving portion 152a to the exhaust pipe 152c. The muffler main portion 152b covers the outside of the second-side end of the first receiving portion 152a and forms a double pipe with the second-side end of the first receiving portion 152a. In addition, the muffler main portion 152b covers the outside of the second-side end portion of the exhaust pipe 152c and forms a double pipe with the second-side end portion of the exhaust pipe 152c.

The exhaust pipe 152c discharges the exhaust gas from the muffler main portion 152b. The exhaust pipe 152c is a hollow part, and as shown in FIG. 12E, the exhaust pipe 152c extends from its first-side end to its second-side end. The exhaust pipe 152c and the first receiving portion 152a are arranged at the same directional-side with respect to the muffler main portion 152b, and protrude from the muffler main portion 152b in a direction substantially parallel to each other and are opposed to each other. That is, the exhaust gas received from the first receiving portion 152a passes through the inside of the muffler main portion 152b and is discharged from the exhaust pipe 152c through a path that is formed to have a substantially U shape in plan view. For this reason, the exhaust gas received from the first receiving portion 152a is discharged from the exhaust pipe 152c in a direction opposite to the exhaust direction in which the first receiving portion 152a received the exhaust gas. This allows the exhaust structure 54 to be made compact, and the exhaust structure 54 can be arranged in a smaller space. The inside of the second muffler 152 may be filled with a sound deadening material such as glass wool, and the structure of the second muffler 152 is not limited to the above-mentioned configuration, as conventional techniques can be employed.

In this embodiment, the first receiving portion 152a is configured to introduce the exhaust gas discharged from the first exhaust pipe 151c and the outside air into the muffler main portion 152b. However, not limited to this configuration, the first exhaust pipe 151c and the second muffler 152 (the muffler main portion 152b or first receiving portion 152a) may be connected by welding or flange connection, so that only the exhaust gas discharged from the first muffler 151 is introduced into the second muffler 152 without introducing the outside air.

As shown in FIG. 12E, the second receiving portion 153b receives the exhaust gas discharged from the exhaust pipe 152c. The second receiving portion 153b is connected to the second exhaust pipe 153a, which will be described later, and has a pipe structure diametrically expanded as it approaches the second exhaust pipe 153a side (muffler main portion 152b side). In other words, the second receiving portion 153b is a tapered portion with an inner diameter that is larger on its upstream (second-side) portion than on its downstream (first-side) portion. The inner diameter of the upstream portion of the second receiving portion 153b is at least larger than the outer diameter of the first-side end portion of the exhaust pipe 152c.

As shown in FIG. 12E, the second receiving portion 153b forms a double-pipe structure by inserting an end portion of the exhaust pipe 152c therein. Specifically, the first-side end portion of the exhaust pipe 152c is inserted into the upstream portion of the second receiving portion 153b. The second receiving portion 153b overlaps the exhaust pipe 152c in the exhaust direction. Specifically, the second-side (front) end portion of the second receiving portion 153b overlaps the first-side (rear) end portion of the exhaust pipe 152c.

As shown in FIG. 12E, the second receiving portion 153b introduces the exhaust gas discharged from the exhaust pipe 152c and the outside air into the second exhaust pipe 153a. Specifically, a second introduction channel 153b1 is formed between the second receiving portion 153b and the exhaust pipe 152c to introduce the outside air into the second exhaust pipe 153a. The second introduction channel 153b1 is a clearance formed between the inner surface of the second receiving portion 153b and the outer surface of the exhaust pipe 152c. The exhaust gas passing from the exhaust pipe 152c to the second receiving portion 153b causes the air outside the second receiving portion 153b to pass through the second introduction channel 153b1 and to be introduced to the inside of the second receiving portion 153b. In this manner, an exhaust gas temperature and noise can be reduced efficiently with a simple configuration.

The second exhaust pipe 153a allows the exhaust gas received from the second receiving portion 153b to pass therethrough. The second exhaust pipe 153a extends from its first-side end to its second-side end. The second exhaust pipe 153*a* is a hollow cylindrical part and allows the exhaust gas that has passed through the exhaust pipe 152*c* to pass therethrough. A plurality of connecting holes 153*a*1 are formed on the outer circumference of the second exhaust pipe 153*a* to open the inside of the second exhaust pipe 153*a* to the outside.

As shown in FIGS. 12A, 12C, and 12E, the third muffler 153 has a second-side (front) end portion connected to the second exhaust pipe 153*a* and is arranged outward of the first muffler 151 in the machine width direction and on the first-side end portion of the second muffler 152. That is, the first muffler 151 and the third muffler 153 are positioned opposite to each other. As shown in FIG. 12E, the third muffler 153 has a third muffler body 153*c*.

As shown in FIG. 12E, a second exhaust pipe 153*a* is inserted into the third muffler body 153*c*, and the inside of the third muffler body 153*c* is connected to the second exhaust pipe 153*a*. In other words, the third muffler body 153*c* covers the outside of the second exhaust pipe 153*a* and forms a double pipe with the second exhaust pipe 153*a*. That is, the third muffler 153 forms a double-pipe structure. The third muffler body 153*c* is arranged to cover the plurality of connecting holes 153*a*1 formed in the second exhaust pipe 153*a*.

In the present embodiment, although the third muffler 153 includes the second exhaust pipe 153*a* inserted inside the third muffler body 153*c*, it is sufficient if the third muffler 153 is connected to the second exhaust pipe 153*a*. And, the third muffler 153 may have a pipe member that is arranged inside the third muffler body 153*c* separately from the second exhaust pipe 153*a*, and brings the inside of the third muffler body 153*c* into communication with the second exhaust pipe 153*a*, and allow the exhaust gas discharged from the second exhaust pipe 153*a* to flow therethrough. A clearance between the third muffler body 153*c* and the second exhaust pipe 153*a* may be filled with a sound-deadening material such as glass wool, and the structure of the third muffler 153 is not limited to the above-mentioned configuration, as conventional techniques can be employed.

As shown in FIGS. 12A, 12B, 12C and others, the tail pipe 154 emits the exhaust gas discharged from the third muffler 153. The tail pipe 154 is a hollow tube that extends from its second-side end to a first-side end. The second-side end portion of the tail pipe 154 is connected to the first-side end portion of the third muffler 153, and the inside of the tail pipe 154 is brought into communication with the second exhaust pipe 153*a*. Accordingly, as shown in FIG. 12E, at least a part of the exhaust gas passage extending from the prime mover 4 to the first receiving portion 152*a* via the first muffler 151 is positioned opposed to at least a part of the exhaust gas passage extending from the exhaust pipe 152*c* to the tail pipe 154 via the third muffler 153. As shown in FIGS. 1A, 1B, 12A and others, the first-side end portion of the tail pipe 154 extends rearwardly from the rear portion of the weight 38.

The positional relationship between the first receiving portion 152*a* and the second receiving portion 153*b* will be described below. As shown in FIGS. 12C and 12E, the first receiving portion 152*a* and the second receiving portion 153*b* are arranged adjacent to each other in a direction orthogonal to the extension direction of the first muffler 151 and the third muffler 153, that is, the machine width direction. Specifically, a direction of an opening of the first receiving portion 152*a*, that is, a direction in which the inner diameter increases, is opposite to a direction of opening of the second receiving portion 153*b*. The first-side end portion of the first receiving portion 152*a* and the second-side end portion of the second receiving portion 153*b* are separated from each other in the fore-and-aft direction. The right end portion of the first receiving portion 152*a* and the left end portion of the second receiving portion 153*b* are separated from each other in the machine width direction. In this manner, by arranging the first receiving portion 152*a* and the second receiving portion 153*b* adjacent to each other, the first introducing line 152*b*1 and the second introduction channel 153*b*1 are close to each other. In this manner, the space for introducing the outside air can be made compact.

Figure 12D:
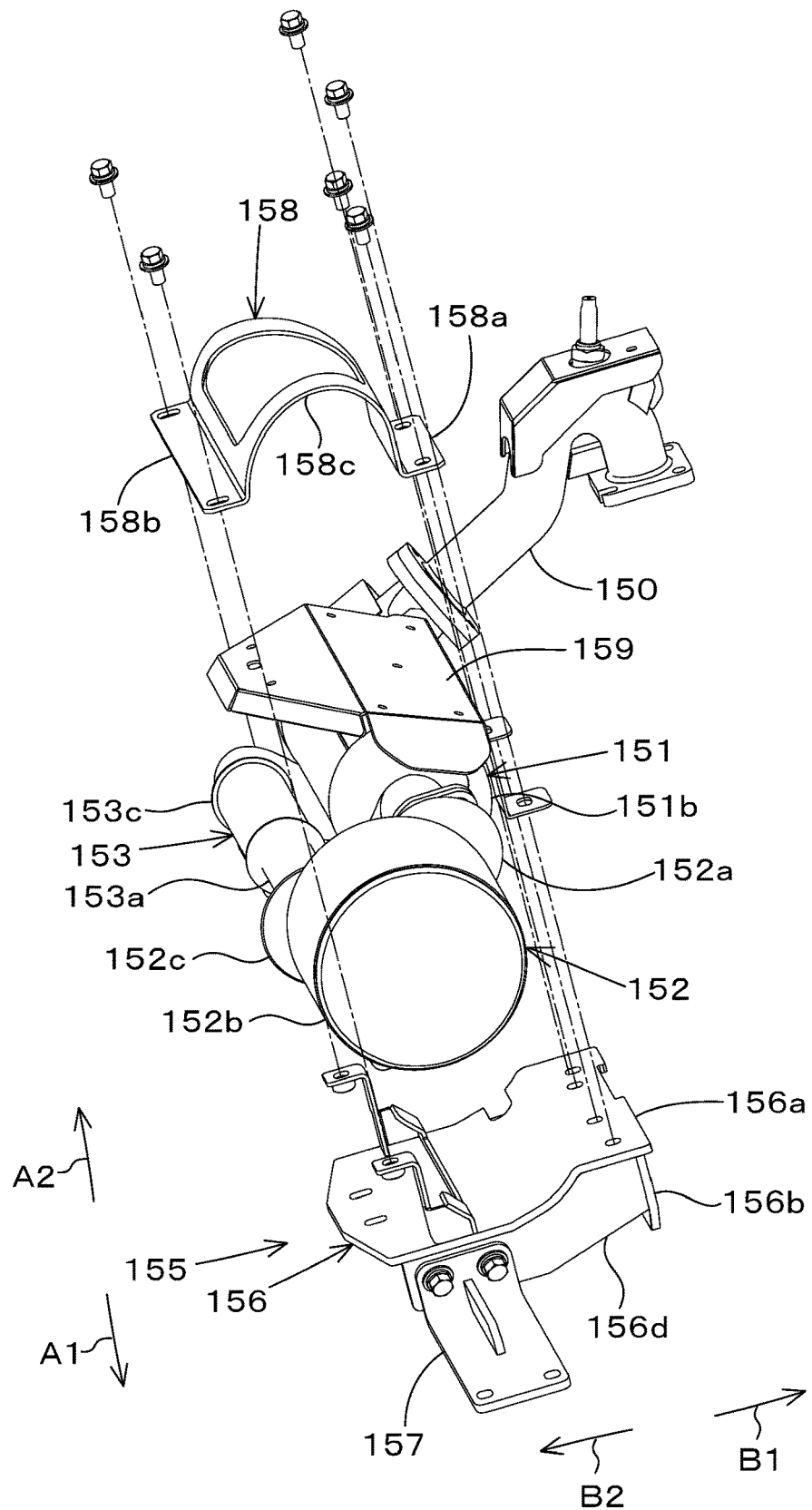
FIG. 12D is a right-front perspective view showing the attachment of the exhaust structure.

The installation of the first muffler 151, the second muffler 152, and the third muffler 153 will be described in detail below. As shown in FIGS. 12A, 12B, and 12D, the exhaust structure 54 of the swiveling work machine 1 is provided with a first fixing bracket 155. The first fixing bracket 155 fixes the first muffler 151, the second muffler 152, and the third muffler 153 to the prime mover 4. This allows a relative position between the first muffler 151, the second muffler 152, and the third muffler 153 to be fixed. In this manner, the first muffler 151, the second muffler 152, and the third muffler 153 can be prevented from contacting each other.

As shown in FIGS. 12B and 12D, the first fixing bracket 155 has a muffler attaching portion 156, an extension part 157, a fastening part 158, and an upper cover 159. The muffler attaching portion 156, the extension part 157, the fastening part 158, and the upper cover 159 are formed, for example, of bending thick steel plates. The muffler attaching portion 156 includes an upper plate 156*a*, a side plate 156*b*, a rear plate 156*c*, and a front plate 156*d*. The upper plate 156*a* is a plate-like portion that is arranged with its plate surfaces facing up and down, has lengths in the machine width direction and the fore-and-aft direction that are longer than a length in the vertical direction, and defines an upper portion of the muffler attaching portion 156.

As shown in FIGS. 12B and 12D, the first muffler 151 and the third muffler 153 are attached to an upper surface of the upper plate 156*a* by bolts or other fasteners. Specifically, the first muffler 151 is attached to a first-side (left) portion of the upper plate 156*a*, and the second muffler 152 is attached to second-side (right) portion of the upper plate 156*a*.

As shown in FIG. 12B, the side plate 156*b* is a part extending downward from the inside (left) end portion of the upper plate 156*a* in the machine width direction, and is fixed, by bolts or other fasteners, to the outside (right) side portion of the prime mover 4 in the machine width direction, i.e., the flywheel 4*c*.

As shown in FIG. 12B, the rear plate 156*c* is a portion extending downward from a rear end portion of the upper plate 156*a*, and is a rib connecting the upper plate 156*a* to the side plate 156*b*. The front plate 156*d* is a portion extending downward from a front end portion of the upper plate 156*a*, and is a rib connecting the upper plate 156*a* to the side plate 156*b*.

As shown in FIGS. 12B and 12D, the extension part 157 is a part provided on the other end (the front side) of the muffler attaching portion 156, and the third muffler 153 is attached to the upper front portion of the muffler attaching portion 156 by bolts or other fasteners. The extension part 157 is an substantially L-shaped member in left-side view, and one end side (the rear side) is fastened to the front plate 156*d* by bolts or other fasteners.

As shown in FIGS. 12C and 12D, the fastening part 158 is a part that fastens the first muffler 151 to the muffler attaching portion 156 by sandwiching the first muffler 151 in cooperation with the muffler attaching portion 156. The fastening part 158 includes a first attached portion 158*a*, a second attached portion 158*b*, and a curved portion 158*c*.

The first attached portion 158a and the second attached portion 158b are portions that are fastened to the upper portion of the muffler attaching portion 156 by bolts or other fasteners. The curved portion 158c is connected at a first-side (left) end thereof in the machine-width direction to the first attached portion 158a and connected at a second-side (right) end thereof in the machine width direction to the second attached portion 158b, and is convexly curved upward at the intermediate portion. That is, the curved portion 158c fits the upper portion of the first muffler 151 onto a concave surface (a lower-side surface) of the curved portion 158c, and the first muffler 151 is sandwiched between the recessed portion 84a and the upper portion of the muffler attaching portion 156.

As shown in FIGS. 12B and 12D, the upper cover 159 is a member that covers the upper portion of the first muffler 151, with the plate surfaces thereof facing up and down, and is arranged at the upper portion of the muffler attaching portion 156. The upper cover 159 is attached to the muffler attaching portion 156 by bolts or other fasteners.

Figure 13A:
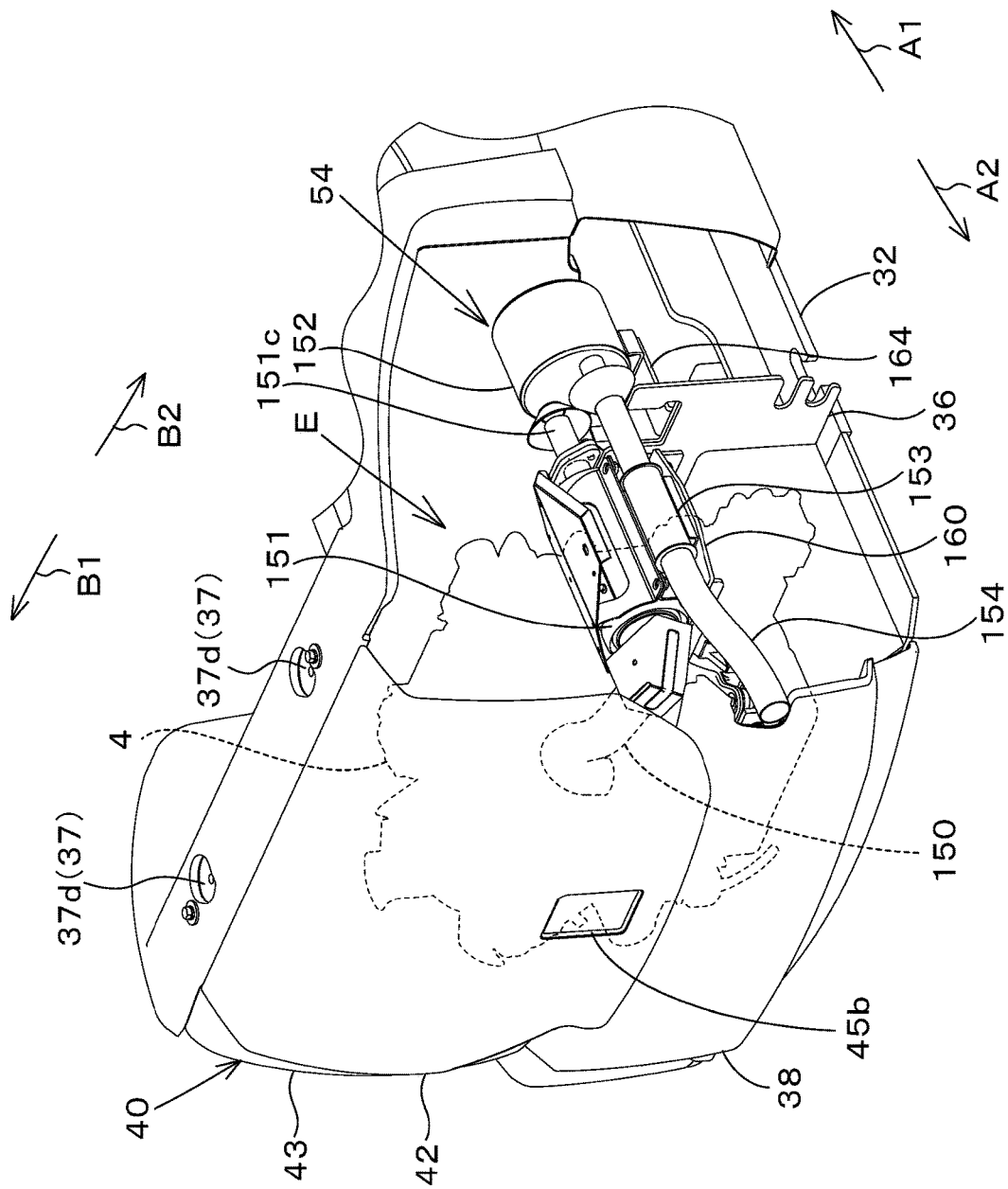
FIG. 13A is a right-rear perspective view showing an exhaust structure according to a modified example.
Figure 13B:
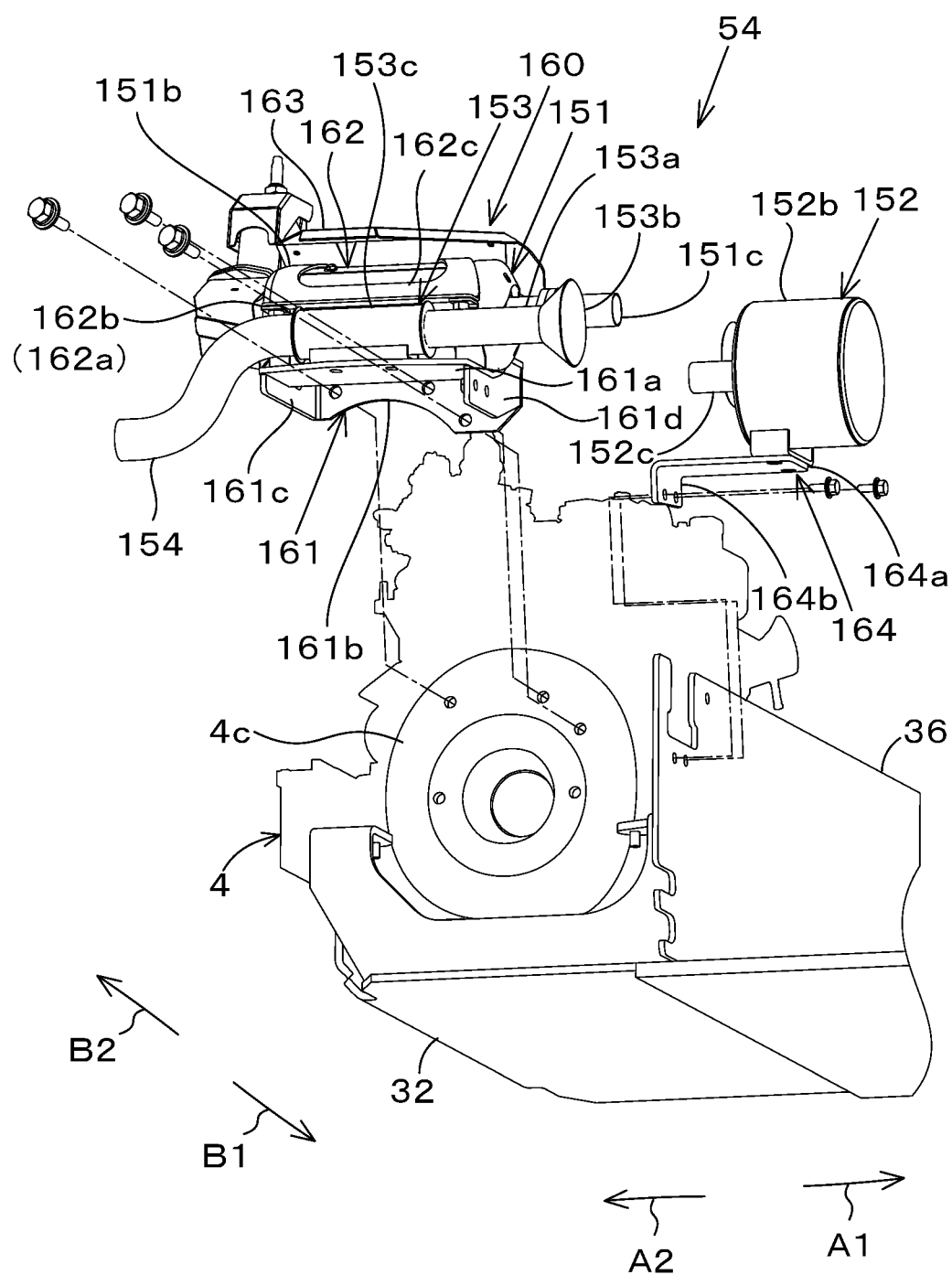
FIG. 13B is a right-front perspective view showing attachment of the exhaust structure according to the modified example.

The above-mentioned first fixing bracket 155 fixes the first muffler 151, the second muffler 152, and the third muffler 153 to the prime mover 4. However, the first muffler 151, the second muffler 152, and the third muffler 153 may be separately fixed to separate structures. For example, as shown in FIGS. 13A and 13B, the exhaust structure 54 of the swiveling work machine 1 has a second fixing bracket 160 and a third fixing bracket 164. The second fixing bracket 160 fixes the first muffler 151 and the third muffler 153 to the prime mover 4, and the third fixing bracket 164 fixes the second muffler 152 to the swivel base (machine body) 2. This allows the first muffler 151 and the third muffler 153 to be attached to the prime mover 4 and the second muffler 152 to be separately attached to the swivel base 2, so that the second muffler 152 can be easily installed even when the space for installing the exhaust structure 54 is relatively small.

As shown in FIG. 13B, the second fixing bracket 160 has a muffler attaching part 161, a fastening part 162, and an upper cover 163. The muffler attaching part 161, the fastening part 162, and the upper cover 163 are formed, for example, of bending thick steel plates. The muffler attaching part 161 includes an upper plate 161a, a side plate 161b, a rear plate 161c, and a front plate 161d.

As shown in FIG. 13B, the upper plate 161a is a plate-like portion that is arranged so that its plate surfaces face up and down, has lengths in the machine width direction and the fore-and-aft direction that are longer than a length in the vertical direction, and defines an upper portion of the muffler attaching part 161. The first muffler 151 and the third muffler 153 are attached to an upper surface of the upper plate 161a by bolts or other fasteners. Specifically, the first muffler 151 is attached to a first-side (left) end portion of the upper plate 161a, and the second muffler 152 is attached to a second-side (right) end portion of the upper plate 161a. The side plate 161b is a portion extending downward from the inside (left) end portion of the upper plate 161a in the machine width direction, and is fixed, by bolts or other fasteners, to the outside (right) of the prime mover 4 in the machine width direction, i.e., the flywheel 4c.

As shown in FIG. 13B, a rear plate 161c is a portion extending downwardly from a rear end portion of the upper plate 161a, and is a rib connecting the upper plate 161a to the side plate 161b.

As shown in FIG. 13B, the front plate 161d is a portion extending downward from a front end portion of the upper plate 161a, and is a rib connecting the upper plate 161a to the side plate 161b.

As shown in FIG. 13B, the fastening part 162 is a portion that fastens the first muffler 151 to the muffler attaching part 161 by sandwiching the first muffler 151 together with the muffler attaching part 161. The fastening part 162 includes a first attached portion 162a, a second attached portion 162b, and a curved portion 162c. The first attached portion 162a and the second attached portion 162b are portions that are fastened to the upper portion of the muffler attachment part 161 by bolts or other fasteners. The curved portion 162c is connected to the first attached portion 162a at one side thereof in the machine width direction and connected to the second attached portion 162b at the other side thereof in the machine width direction, and is convexly curved upward at the intermediate portion. That is, the curved portion 162c fits the upper portion of the first muffler 151 into a concave surface (a lower surface) of the curved portion 162c, and the first muffler 151 is sandwiched between the recessed portion 84a and the upper portion of the muffler attachment part 161.

As shown in FIG. 13B, the upper cover 163 is a member that covers the upper portion of the first muffler 151 and is arranged above the muffler attaching part 161. The upper cover 163 is attached to the muffler attaching part 161 by bolts or other fasteners.

As shown in FIGS. 13A and 13B, the third fixing bracket 164 is a member that attaches the second muffler 152 to the vehicle body. For example, the third fixing bracket 164 is attached to the partition plate 36 and supports the second muffler 152 on the vehicle body via the partition plate 36. The third fixing bracket 164 is formed, for example, of a bending thick steel plate. The third fixing bracket 164 has an attachment tab 164a and a supporting portion 164b. The attachment tab 164a is a plate-like portion whose lengths in the machine width direction and vertical direction are longer than a length in the fore-and-aft direction, and is attached to the partition plate 36. Specifically, the attachment tab 164a is fastened, by bolts or other fasteners, to the other side (the right side) of the front surface of the partition plate 36.

As shown in FIG. 13B, the support portion 164b is a portion that supports the second muffler 152. The support portion 164b is extended forward from the front upper portion of the attachment tab 164a and is a plate-shaped portion whose lengths in the fore-and-aft direction and the machine width direction are longer than its length in the vertical direction. The second muffler 152 is fastened to an upper surface of the front portion of the supporting portion 164b by bolts or other fasteners.

Figure 16:
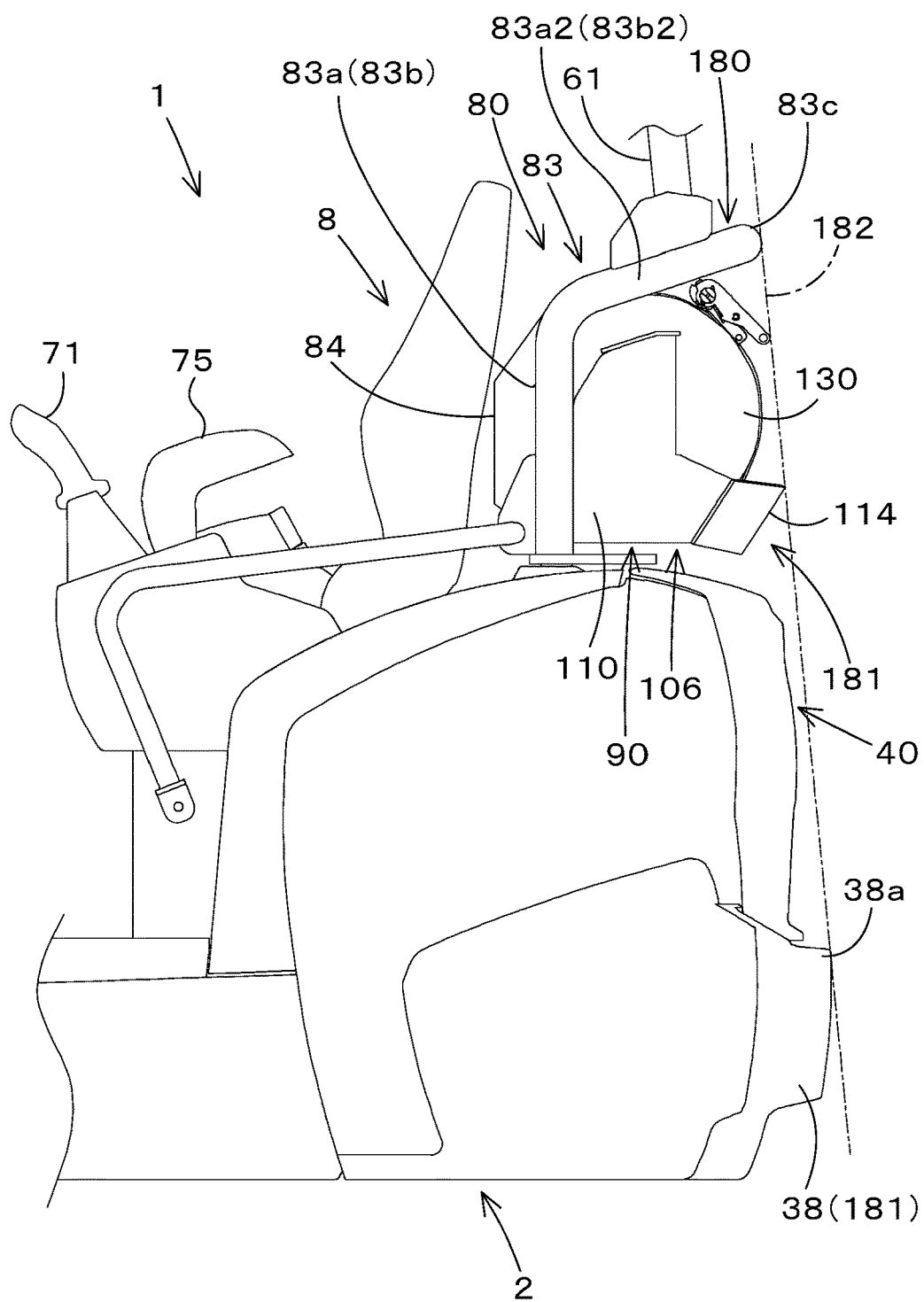
FIG. 16 is a side view showing a rear portion of the working machine.
Figure 17:
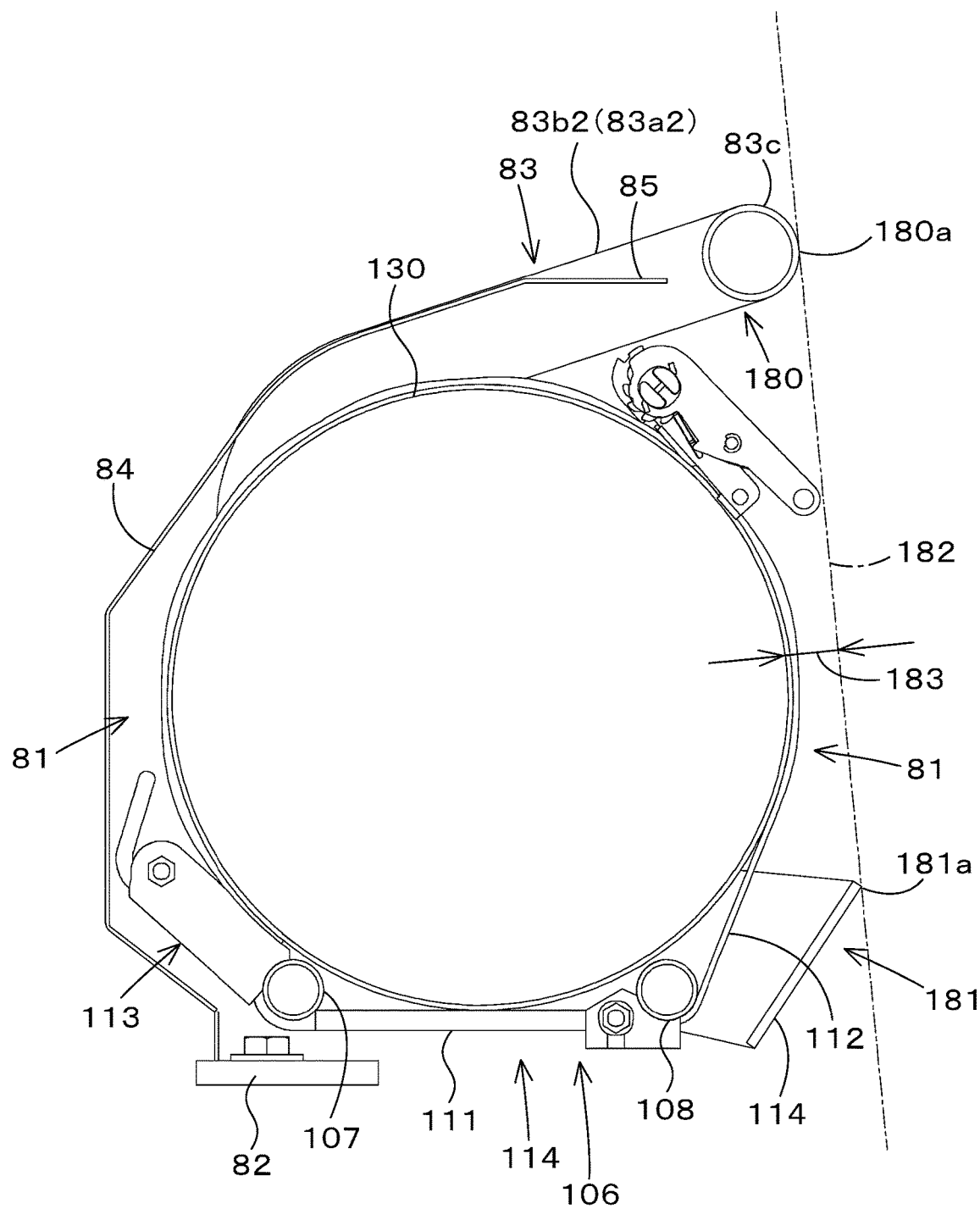
FIG. 17 is a side cross-sectional view of an accommodating portion.

FIG. 16 shows a side view of the rear portion of the swiveling work machine 1, and FIG. 17 shows a side cross-sectional view of a portion housing the fuel cylinder 130.

As shown in FIGS. 16 and 17, the fuel cylinder 130 is arranged, in the accommodating portion 81, inside from a virtual surface 182 in contact with an upper member 180 arranged above the fuel cylinder 130 and a lower member 181 arranged below the upper member 180.

As shown in FIGS. 16 and 17, the upper member 180 is, for example, an upper portion of the frame body 83. Specifically, the upper member 180 is a portion constituted of a rear portion of the second portion 83a2 of the first strut 83a, a rear portion of the second portion 83b2 of the second strut 83b, and the connecting rod 83c. The upper member 180 is arranged above the rear portion of the fuel cylinder 130. The upper member 180 (the upper portion of the frame body 83)

protrudes rearward from the fuel cylinder 130. That is, a rear end 180a (a rear end portion in the fore-and-aft direction of the machine body) of the upper member 180 is located rearward from the fuel cylinder 130.

The lower member 181 is, for example, the installation part 106 in which the fuel cylinder 130 is installed. Specifically, the lower member 181 is the extension part 114 provided at the rear portion of the installation part 106. The rear portion of the lower member 181 (extension part 114) protrudes rearward from the fuel cylinder 130. That is, a rear end 181a of the lower member 181 (extension part 114) is located rearward from the fuel cylinder 130.

As shown in FIG. 17, the virtual surface 182 is a surface in contact with the rear end 180a of the upper member 180 and the rear end 181a of the lower member 181. Since the rear end 180a of the upper member 180 and the rear end 181a of the lower member 181 protrude rearward from the fuel cylinder 130, the fuel cylinder 130 is arranged forward from the virtual surface 182, i.e., on the inner portion that is the further inside portion of the accommodating portion 81.

As a portion of the lower member 181 with which the virtual surface 182 is in contact, the portion may be a hinge unit provided on a back side of the extension part 114, the hinge unit being configured to support a lower portion of the cover 87 so that the lower portion can be opened and closed, when the cover 87 is provided. As for the portion of the lower member 181 with which the virtual surface 182 is in contact, when another member is provided on the back side of the extension part 114, the portion may be the other member.

As shown in FIG. 17, the lower member 181 may be the weight 38. The rear portion of the weight 38 protrudes rearward from the fuel cylinder 130. That is, the upper rear end 38a, which is the upper-rear portion of the weight 38, is located rearward from the fuel cylinder 130. In this case, the virtual surface 182 is in contact with the rear end 180a of the upper member 180 and the upper rear end 38a of the weight 38, and the fuel cylinder 130 is arranged on the inner portion that is the further inside portion of the accommodating portion 81 than the virtual surface 182.

The lower member 181 may be both the installation part 106 (such as the extension part 114 or the hinge unit) and the weight 38. In addition, in the present embodiment, the virtual surface 182 is a surface in contact with the upper member 180, the installation part 106 (such as the extension part 114 or the hinge unit), and the weight 38. However, the virtual surface 182 may be a surface in contact with the upper member 180 and one of the installation part 106 and the weight 38. That is, the virtual surface 182 need not contact to the weight 38 when the virtual surface 182 contacts to the upper member 180 and the installation part 106, and need not contact to the installation part 106 when the virtual surface 182 contacts to the upper member 180 and the weight 38.

As shown in FIG. 17, a gap 183 is formed between the virtual surface 182 and the fuel cylinder 130 because the fuel cylinder 130 is arranged on the inner portion that is the further inside (forward, deep inside) portion of the accommodating portion 81 than the virtual surface 182. This allows the fuel cylinder 130 to be protected. That is, when the rear portion of the swiveling work machine 1 contacts to a contacting portion such as a wall parallel to the virtual plane 182, the upper member 180 and the lower member 181 contact to the contacting portion before the fuel cylinder 130 contacts to the contacting portion, thereby protecting the fuel cylinder 130.

The swiveling work machine 1 described above includes the swivel base 2, the prime mover 4 mounted on the swivel base 2, the work device 20 provided on the swivel base 2, and the support mechanism 90 to support the fuel cylinder 130, the fuel cylinder 130 being configured to store fuel for the prime mover 4. According to the above-mentioned configuration, the swiveling work machine 1 can be driven with the fuel stored in the fuel cylinder 130.

In addition, the swiveling work machine 1 includes the hood 40 forming the engine compartment E that houses the prime mover 4, and the support mechanism 90 supports the fuel cylinder 130 at a position above the hood 40. According to the above-mentioned configuration, by arranging the fuel cylinder 130 at the position above the hood 40, the space above the hood 40 can be effectively utilized.

In addition, the hood 40 is openable and closable, and the support mechanism 90 supports the fuel cylinder 130 movably between the installation position K1 above the hood 40 and the retracting position K2 where the fuel cylinder 130 does not interfere with the hood 40 in opening and closing the hood 40. According to the above-mentioned configuration, since the fuel cylinder 130 will interfere with the hood 40 when the fuel cylinder 130 is placed above the hood 40, the fuel cylinder 130 can be prevented from interfering with the opening and closing of the hood 40. Thus, both effective use of the space above the hood 40 and convenience in opening and closing the hood 40 can be achieved.

In addition, the support mechanism 90 has the first pivotal shaft 94 supporting the fuel cylinder 130 rotatably in the horizontal direction. According to the above-mentioned configuration, arrangement of the fuel cylinder 130 can be easily changed between the installation position K1 and the retracting position K2 by a simple operation of rotating the fuel cylinder 130 around the first pivotal shaft 94.

In addition, the support mechanism 90 supports the fuel cylinder 130 at the installation position K1, inside from the rotating locus C2 of the swivel base 2. According to the above-mentioned configuration, the fuel cylinder 130 is within the rotating locus C2 of the swivel base 2 while the swivel base 2 is turning, and thus the fuel cylinder 130 can be prevented from contacting to surrounding obstacles.

In addition, the support mechanism 90 has the second pivotal shaft 101 supporting the fuel cylinder 130 rotatably downward from the retracting position K2. According to the above-mentioned configuration, the fuel cylinder 130 can be placed below the retracting position K2 by a simple operation of rotating the fuel cylinder 130 downwardly around the second pivotal shaft 101.

In addition, the support mechanism 90 includes the base 91 supporting the first pivotal shaft 94, the first pivotal bracket 95 connecting the first pivotal shaft 94 to the second pivotal shaft 101 and rotating around the first pivotal shaft 94, and the second pivotal bracket 102 connecting the second pivotal shaft 101 to the installation part 106 and rotating around the second pivotal shaft 101. The base 91 has the notch 93b configured to be engaged with the second pivotal bracket 102 when the first pivotal bracket 95 is rotated around the first pivotal shaft 94 and to limit a rotation range of the first pivotal bracket 95. According to the above-mentioned configuration, it is possible to prevent the fuel cylinder 130 from unintentionally rotating around the first pivotal shaft 94.

In addition, the swiveling work machine 1 includes the upper member 85 configured to cover the upper portion of the fuel cylinder 130 arranged at the installation position K1 above the hood 40. The support mechanism 90 is provided with the extension part 114 facing, in the machine outward direction, the lower portion of the fuel cylinder 130 arranged at the installation position K1. The clearance between the extension part 114 and the upper member 85 is smaller than the diameter of the fuel cylinder 130. According to the above-mentioned configuration, the upper portion of the fuel cylinder 130 is prevented from contacting to the outside environment, and the fuel cylinder 130 can stay in the upper portion of the hood 40 by surrounding the fuel cylinder 130 with the upper member 85 and the extension part 114.

In addition, the support mechanism 90 has the fastener 112 that fixes the fuel cylinder 130. According to the above-mentioned configuration, the support mechanism 90 can firmly support and fix the fuel cylinder 130 with the fastener 112.

In addition, the fuel is natural gas or petroleum gas, and is stored in the fuel cylinder 130 in the state of compressed gas or liquid. According to the above-mentioned configuration, when the second fuel is the natural gas, the gas exhausted from the prime mover 4 includes less black smoke, NOx, SOx, and the like than those in the case of a conventional gasoline engine or diesel engine to be driven with gasoline or diesel oil. In addition, when the second fuel is petroleum gas, little black smoke is emitted, and PM and NOx are low. Accordingly, the swing work machine 1 can have less impact on the environment while maintaining work efficiency.

In addition, the swiveling work machine 1 includes the reserve cylinder (reserve tank) 132b to supply the fuel to the prime mover 4 when the remaining amount of the fuel in the fuel cylinder 130 falls below a predetermined amount. According to the above-mentioned configuration, even when the remaining amount of fuel in the fuel cylinder 130 becomes low, the swiveling work machine 1 can continue work without immediately stopping the work.

In addition, the swiveling work machine (work machine) 1 includes the swivel base 2 provided with the operator seat 8, the work device 20 provided at the front portion of the swivel base 2, the hood 40 provided at the rear portion of the swivel base 2 and forming the engine compartment E, and the protection mechanism 60 having the struts 61 arranged above the hood 40 and protecting the operator seat 8. The accommodating portion 81 is formed between the hood 40 and the struts 61 to house the accommodated object. According to the above-mentioned configuration, the space between the hood 40 and the struts 61 can be effectively utilized to provide the space to house the accommodated object.

In addition, the swinging work machine 1 includes the supporter 80 that supports the struts 61 and forms the accommodating portion 81. The supporter 80 has the vertical member 84 extending upward from the front portion of the hood 40, and the upper member 85 extending rearward from the upper portion of the vertical member 84 and positioned above the hood 40. The struts 61 are attached to the upper member 85, and the accommodating portion 81 is formed in the space surrounded by the hood 40, the vertical member 84, and the upper member 85. According to the above-mentioned configuration, the accommodating portion 81 not only can form the space for housing the accommodated object, but also can firmly support the struts 61.

The protection mechanism 60 has a pair of the struts 61 spaced apart in the machine width direction. The upper member 85 extends from one side to the other side in the machine width direction, and the pair of the struts 61 are attached to one side of the upper member 85 in the machine width direction and to the other side. According to the above-mentioned configuration, the weight applied by the roof 62 can be distributed to one side of the upper member 85 in the machine width and to the other side.

In addition, one of the struts 61 has the first portions 83a1 and 83b1 extending upward from the front portion of the hood 40, the second portions 83a2 and 83b2 curving backward from the upper end portions of the first portions 83a1 and 83b1 and arranged above the hood 40, and the third portion 61b extending upwardly from the upper portions of the second portions 83a2 and 83b2. The accommodating portion 81 is formed in a space surrounded by the hood 40, the first portions 83a1 and 83b1, and the second portions 83a2 and 83b2. According to the above-mentioned configuration, the accommodating portion 81 can be not only easily configured between the struts 61 and the hood 40, but also the accommodating portion 81 can be firmly configured.

In addition, the vertical member 84 separates the accommodating portion 81 from the space closer to the operator seat 8 than the accommodating portion 81. According to the above-mentioned configuration, it is possible to separate the operator seat 8 side from the portion where the accommodated object is stored.

In addition, the swiveling work machine 1 includes the cover 87 to cover the rear portion of the accommodating space. According to the above-mentioned configuration, it is possible to prevent the accommodated objects from being exposed to the external environment, and to prevent the accommodated objects from coming into direct contact to some objects when, for example, work is performed while swiveling.

In addition, the swinging work machine 1 includes the support mechanism 90 for supporting the accommodated object. The hood 40 is openable and closable. The support mechanism 90 supports the accommodated objects movably between the installation position K1 where the accommodated object is housed in the accommodating portion 81 and the retracting position K2 where the accommodated object does not interfere with the hood 40 in opening and closing the hood 40. According to the above-mentioned configuration, in the accommodating position K1, the accommodated object is placed above the hood 40, and in the retracting position K2, the interference between the accommodated object and the hood 40 can be avoided. In this manner, since the accommodating portion 81 and the hood 40 are arranged in the vertical direction with no interference of the opening and closing of the hood 40, it is possible to improve workability and to effectively utilize the space.

In addition, the swiveling work machine 1 includes the prime mover 4 mounted on the swivel base 2. The accommodated object is the fuel cylinder 130 that store fuel for the prime mover 4. According to the above-mentioned configuration, the swiveling work machine 1 can be driven with the fuel contained in the fuel cylinder 130.

In addition, the swiveling work machine 1 includes the swivel base 2, the work device 20 provided on the swivel base 2, the prime mover 4 configured to be driven by selectively using either the first fuel or the second fuel, the fuel tank 50 configured to store the first fuel, the support mechanism 90 configured to support the fuel cylinder 130 that stores the second fuel, and the fuel changer 133 for changing the fuel to be supplied to the prime mover 4 to either the first fuel or the second fuel. According to the above-mentioned configuration, when the remaining amount of one of the fuel tank 50 and the fuel cylinder 130 becomes low, the prime mover 4 can be driven using the fuel of the other, and thus the work can be continued.

In addition, the swiveling work machine 1 includes the operation member 141 configured to perform a changing operation to change the fuel to be supplied to the prime mover 4. According to the above-mentioned configuration, an operator can easily change the fuel to drive the prime mover 4 according to the work scene, environment, and/or the like.

In addition, the support mechanism 90 detachably supports the fuel cylinder 130. According to the above-mentioned configuration, when the swiveling work machine 1 is driven with the first fuel stored in the fuel tank 50, the fuel cylinder 130 can be removed during the driving with the first fuel. This makes it possible to carry out work more flexibly, such as continuing the work during the replacement of the fuel cylinder 130 when the remaining amount of the fuel cylinder 130 is low.

In addition, the swiveling work machine 1 includes the first indicator 143c indicating the remaining amount of the first fuel stored in the fuel tank 50, and the second indicator 143d indicating the remaining amount of the second fuel stored in the fuel cylinder 130. According to the above-mentioned configuration, an operator can easily recognize the remaining amount of the first fuel and the remaining amount of the second fuel by checking the first indicator 143c and the second indicator 143d.

In addition, the swiveling work machine 1 includes the operator seat 8 provided on the swivel base 2. The operation member 141 is arranged at a position where the operation member 141 can be operated by the operator seated in the operator seat 8. According to the above-mentioned configuration, when the remaining amount of one of the fuel tank 50 and the fuel cylinder 130 becomes low during operation of the swiveling work machine 1, the operator can easily change the fuel to be supplied to the prime mover 4 between the first fuel and the second fuel even when the operator does not get off the swiveling work machine 1.

In addition, the swiveling work machine 1 includes the display mechanism (third indicator) 143e that indicates whether the fuel being supplied to the prime mover 4 is the first fuel or the second fuel. According to the above-mentioned configuration, the operator can easily know whether the fuel being supplied to the prime mover 4 is the first fuel or the second fuel.

In addition, the second fuel is stored in the fuel cylinder 130 in the form of compressed gas or liquid. According to the above-mentioned configuration, the swiveling work machine 1 can be driven with the fuel stored in the fuel cylinder 130.

In addition, the exhaust structure 54 for the swiveling work machine (work machine) 1 includes the first muffler 151 to which the exhaust gas discharged from the prime mover 4 is introduced, the second muffler 152 including the first receiving portion 152a to receive the exhaust gas discharged from the first muffler 151, the muffler main portion 152b through which the exhaust gas received from the first receiving portion 152a passes, and the exhaust pipe (exhaust portion) 152c to exhaust the exhaust gas from the muffler main portion 152b, the third muffler 153 to which the exhaust gas discharged from the second muffler 152 is introduced, and the tail pipe 154 to exhaust the exhaust gas discharged from the third muffler 153. The first receiving portion 152a and the exhausting portion 152c are arranged on a directional one-side relative to the muffler main portion 152b, and is arranged at a position where at least a part of the exhaust gas passage from the prime mover 4 to the first receiving portion 152a via the first muffler 151 faces at least a part of another exhaust gas passage from the exhausting portion 152c to the tail pipe 154 via the third muffler 153. According to the above-mentioned configuration, the exhaust gas received by the second muffler 152 from the first receiving portion 152a is discharged from the exhaust pipe 152c in a direction opposite to the direction of the exhaust gas received by the first receiving portion 152a. In this manner, at least a part of the exhaust gas passage from the prime mover 4 to the first receiving portion 152a via the first muffler 151 and at least a part of the exhaust gas passage from the exhaust pipe 152c to the tail pipe 154 via the third muffler 153 can be arranged opposed to each other, so that the exhaust structure 54 can be made compact. Accordingly, the exhaust structure 54 can be arranged in a smaller space.

In addition, the exhaust structure 54 includes the first fixing bracket 155 to fix the first muffler 151, the second muffler 152, and the third muffler 153 to the prime mover 4. According to the above-mentioned configuration, the first muffler 151, the second muffler 152, and the third muffler 153 can be fixed to the same vibration system.

In addition, the exhaust structure 54 may include the second fixing bracket 160 to fix the first muffler 151 and the third muffler 153 to the prime mover 4, and the third fixing bracket 164 to fix the second muffler 152 to the swivel base 2. According to the above-mentioned configuration, since the first muffler 151 and the third muffler 153 can be attached to the prime mover 4, and the second muffler 152 can be attached to the swivel base 2, the first to third mufflers 151 to 153 can be easily attached even when the space for installing the exhaust structure 54 is relatively small.

In addition, the first muffler 151 is integrated with the three-way catalytic converter. According to the above-mentioned configuration, the harmful components in the exhaust gas can be purified.

In addition, the exhaust pipe 152c has the exhaust pipe through which the exhaust gas discharged from the muffler main portion 152b passes. The third muffler 153 is connected to the second receiving portion 153b configured to receive the exhaust gas discharged from the exhaust pipe 152c and introduces the gas into the third muffler 153. The second receiving portion 153b introduces the exhaust gas discharged from the exhaust pipe 152c and the outside air into the third muffler 153. For example, the second receiving portion 153b has an expanded pipe structure with a diameter being expanded as extending toward the muffler main portion 152b, and the end portion of the exhaust pipe 152c is inserted into the expanded pipe structure. According to the above-mentioned configuration, an exhaust temperature and noise can be efficiently reduced with a simple configuration.

In addition, the exhaust structure 54 includes the first exhaust pipe (exhaust pipe) 151c to allow the exhaust gas discharged from the first muffler 151 passes. The first receiving portion 152a introduces the exhaust gas discharged from the first exhaust pipe 151c and the outside air into the muffler main portion 152b. For example, the first receiving portion 152a has an expanded pipe structure with a diameter being expanded as extending away from the muffler main portion 152b, and the end portion of the first exhaust pipe 151c is inserted into the expanded pipe structure. According to the above-mentioned configuration, an exhaust temperature and noise can be efficiently reduced with a simple configuration.

In addition, the swiveling work machine 1 includes the exhaust structure 54. According to the above-mentioned configuration, the swiveling work machine 1 having the excellent effects described above can be realized.

In addition, the prime mover 4 is an engine of spark ignition type. According to the above-mentioned configuration, an exhaust temperature and noise of the exhaust gas emitted by burning the fuel can be further reduced.

In addition, the swiveling work machine 1 includes the accommodating portion 81 configured to house the fuel cylinder 130, the upper member 180 provided above the fuel cylinder 130, and the lower member 181 arranged below the upper member 180. The fuel cylinder 130 is arranged in the accommodating portion 81 further inside from the virtual surface 182 contacting to the upper member 180 and the lower member 181.

According to the above-mentioned configuration, the fuel cylinder 130 can be protected by the upper member 180 and the lower member 181.

In addition, the support mechanism 90 has the installation part 106 in which the fuel cylinder 130 is installed, and the lower member 181 is the installation part 106.

According to the above-mentioned configuration, the upper member 180 and the installation part 106 can protect the fuel cylinder 130.

In addition, the swivel base 2 has the weight 38 arranged on the opposite side to the work device 20, and the lower member 181 is the weight 38.

According to the above-mentioned configuration, the upper member 180 and the weight 38 can protect the fuel cylinder 130.

In the above description, the embodiment of the present invention has been explained. However, all the features of the embodiment disclosed in this application should be considered just as examples, and the embodiment does not restrict the present invention accordingly. A scope of the present invention is shown not in the above-described embodiment but in claims, and is intended to include all modifications within and equivalent to a scope of the claims.

For example, in the above-described embodiment, the fuel cylinder 130 is housed in the accommodating portion 81, but various accommodated objects such as tools and maintenance parts may be housed in the accommodating portion 81 in addition to or instead of the fuel cylinder 130.

In addition, although the above-described embodiment describes an example of applying the present invention to a backhoe, which is a swiveling work machine, the present invention is not limited thereto and can be applied to a variety of work machines, such as various construction machines, civil engineering machines, agricultural machines, and the like.

In the above-described embodiment, the swiveling work machine 1 includes the fuel tank 50 and the fuel cylinder 130 to enable changing of the fuel to be supplied to the prime mover 4, but the configuration is not limited thereto. For example, the fuel tank 50 may be omitted, and only the fuel supplied from the fuel cylinder 130 may be used to be supplied to the prime mover. In this case, the refueling port 50*b* may also be omitted, and the area where the refueling port 50*b* is located may be covered with an outer cover. In such a case, the exterior cover may be a mesh-like cover, for example, that connects the outside of the hood 40 with the inside of the engine compartment E. The shape and structure of the cover are not limited.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A swiveling work machine comprising:
    a swivel base;
    a prime mover provided on the swivel base;
    a work device provided on the swivel base;
    a support mechanism to support a fuel cylinder storing fuel for the prime mover; and
    a hood defining an engine compartment incorporating the prime mover, wherein
    the hood is openable and closable,
    the support mechanism is configured to support the fuel cylinder shiftably between an installation position where the fuel cylinder is supported above the hood and a retracting position where the fuel cylinder is prevented from interfering with the hood when being opened or closed, and
    the support mechanism includes a first pivotal shaft for pivoting the fuel cylinder horizontally rotatably and a second pivotal shaft for pivoting the fuel cylinder rotatably downward from the retracting position,
    the support mechanism includes:
        a base supporting the first pivotal shaft;
        an installation part to install the fuel cylinder thereon;
        a first pivotal bracket joining the first pivotal shaft and the second pivotal shaft to each other and being rotatable around the first pivotal shaft; and
        a second pivotal bracket joining the second pivotal shaft and the installation part to each other and being rotatable around the second pivotal shaft, and
    the base is formed with a notch such that, when the first pivotal bracket is rotated around the first pivotal shaft, the second pivotal bracket is engaged to the notch so as to limit a rotation range of the first pivotal bracket.

2. The swiveling work machine according to claim 1, further comprising:
    an upper member provided above the hood to cover the fuel cylinder set at the installation position from thereabove, wherein
    the support mechanism includes an extended portion extending outward of the machine body from the lower portion of the fuel cylinder set at the installation position so as to face the lower portion of the fuel cylinder set at the installation position, and
    an interval between the upper member and the extended portion is less than a diameter of the fuel cylinder.

3. The swiveling work machine according to claim 1, wherein
    the support mechanism includes a fastener to fix the fuel cylinder.

4. The swiveling work machine according to claim 1, wherein
    natural gas or petroleum gas serving as the fuel is compressed or liquefied and is stored in the fuel cylinder.

5. The swiveling work machine according to claim 1, further comprising:
    a reserve cylinder to supply fuel to the prime mover when a residual quantity of fuel in the fuel cylinder is reduced and becomes a predetermined quantity or less.

6. The swiveling work machine according to claim 1, further comprising:
    an accommodating portion to accommodate the fuel cylinder;
    an upper member provided above the fuel cylinder; and
    a lower member provided below the upper member, wherein
    the fuel cylinder set in the accommodating portion is arranged inward from a virtual plane touching the upper member and the lower member.

7. The swiveling work machine according to claim 6, wherein
the support mechanism includes an installation part to install the fuel cylinder thereon, and
the lower member serves as the installation part.

8. The swiveling work machine according to claim 6, wherein
the swivel base includes a weight opposite to the work device, and
the lower member serves as the weight.

9. The swiveling work machine according to claim 1, wherein
the support mechanism is configured to support the fuel cylinder at the installation position inward from an outer edge of a rotating locus of the swivel base at swiveling thereof.

10. The swiveling work machine according to claim 1, further comprising:
a fuel tank storing first fuel; and
a fuel changer to change the fuel to be supplied to the prime mover, wherein
the fuel cylinder stores, as the fuel, a second fuel,
the prime mover is driven selectively by either the first fuel or the second fuel, and
the fuel changer changes the fuel to be supplied to the prime mover from one of the first fuel and the second fuel to the other.

11. The swiveling work machine according to claim 10, further comprising:
an operation member operable to change the fuel to be supplied to the prime mover.

12. A swiveling work machine comprising:
a swivel base;
a prime mover provided on the swivel base;
a work device provided on the swivel base;
a support mechanism to support a fuel cylinder storing fuel for the prime mover;
a hood provided on a rear portion of the swivel base to define an engine compartment;
a protection mechanism to protect an operator seat provided on the swivel base, the protection mechanism including a strut above the hood; and
a supporter supporting the strut and forming an accommodating portion to accommodate the fuel cylinder, wherein
the hood is openable and closable,
the support mechanism is configured to support the fuel cylinder shiftably between an installation position where the fuel cylinder is supported above the hood and a retracting position where the fuel cylinder is prevented from interfering with the hood when being opened or closed,
the work device is provided on a front portion of the swivel base,
the supporter includes:
a vertical member extended upward from a front portion of the hood; and
an upper member extended rearward from an upper portion of the vertical member and provided above the hood,
the strut of the protection mechanism is paired so that the pair of struts are arranged with a space therebetween in a machine-width direction,
the upper member extends to have one and the other end portions in the machine-width direction,
the strut is attached to the upper member,
the pair of struts are attached to the one and the other end portions of the upper member, respectively, and
the accommodating portion is defined as a space between the hood and the strut, the space being surrounded by the hood, the vertical member and the upper member, the accommodating portion being capable of accommodating the fuel cylinder that the support mechanism supports in a state where the support mechanism is in the installation position.

13. The swiveling work machine according to claim 12, wherein
the strut includes:
a first portion extended upward from a front portion of the hood;
a second portion curved rearward from an upper end of the first portion and provided above the hood, and
a third portion extended upward from an upper portion of the second portion, and
the accommodating portion is defined as a space surrounded by the hood, the first portion and the second portion.

* * * * *